United States Patent
Aso et al.

(10) Patent No.: US 12,530,861 B2
(45) Date of Patent: Jan. 20, 2026

(54) COMPUTER-READABLE RECORDING MEDIUM STORING SHAPE IDENTIFICATION PROGRAM, SHAPE IDENTIFICATION METHOD, AND INFORMATION PROCESSING APPARATUS

(71) Applicant: FUJITSU LIMITED, Kawasaki (JP)

(72) Inventors: Noriyasu Aso, Isehara (JP); Masatoshi Ogawa, Zama (JP)

(73) Assignee: FUJITSU LIMITED, Kawasaki (JP)

( * ) Notice: Subject to any disclaimer, the term of this patent is extended or adjusted under 35 U.S.C. 154(b) by 533 days.

(21) Appl. No.: 17/698,478

(22) Filed: Mar. 18, 2022

(65) Prior Publication Data

US 2022/0351488 A1    Nov. 3, 2022

(30) Foreign Application Priority Data

Apr. 26, 2021   (JP) .................................... 2021-74327

(51) Int. Cl.
G06V 10/44       (2022.01)
G06F 18/241      (2023.01)
G06V 20/64       (2022.01)

(52) U.S. Cl.
CPC ............ G06V 10/44 (2022.01); G06F 18/241 (2023.01); G06V 20/64 (2022.01)

(58) Field of Classification Search
CPC ...... G06V 10/44; G06V 20/64; G06V 10/422; G06V 10/50; G06V 10/757; G06V 10/759; G06V 10/82; G06F 18/241
See application file for complete search history.

(56) References Cited

U.S. PATENT DOCUMENTS 5,265,197 A     11/1993  Kondo
2004/0032408 A1   2/2004  Doi et al.
(Continued)

FOREIGN PATENT DOCUMENTS

JP      3-206564          9/1991
JP      03206564 A   *   9/1991
(Continued)

OTHER PUBLICATIONS

"L. Li et. al., A Reverse Engineering System for Rapid Manufacturing of Complex Objects, Feb. 2002, Robotics and Computer-Integrated Manufacturing, vol. 18, pp. 53-67" (Year: 2002).*
(Continued)

Primary Examiner — Chineyere Wills-Burns
Assistant Examiner — Phuong Hau Cai
(74) Attorney, Agent, or Firm — STAAS & HALSEY LLP

(57) ABSTRACT

A shape identification program causes a computer to execute a process including acquiring a third shape dataset and a fourth shape dataset, respectively generated by changing sizes of a first shape dataset and a second shape dataset in each of directions of a plurality of coordinate axes according to a specific rule, and generating a first plurality of images and a second plurality of images by capturing the third shape dataset and the fourth shape dataset, respectively, from both directions of the respective plurality of coordinate axes. The process further includes identifying a second portion in the second shape dataset corresponding to a first portion in the first shape dataset by aligning orientations of the first shape dataset and the second shape dataset based on a result of comparison between the first plurality of images and the second plurality of images.

10 Claims, 33 Drawing Sheets

(56) References Cited

U.S. PATENT DOCUMENTS

2009/0040225 A1   2/2009  Wang et al.
2009/0138468 A1   5/2009  Kurihara
2019/0340198 A1  11/2019  Hamada et al.

FOREIGN PATENT DOCUMENTS

| | | | |
|---|---|---|---|
| JP | 9-179892 | 7/1997 | |
| JP | 09179892 A * | 7/1997 | |
| JP | H09179892 A * | 7/1997 | ............. G06F 17/50 |
| JP | 2004-21773 | 1/2004 | |
| JP | 2006-139486 | 6/2006 | |
| JP | 2009-80796 | 4/2009 | |
| JP | 2009-129337 | 6/2009 | |
| JP | 2019-46243 | 3/2019 | |
| WO | WO2017/217032 | 12/2017 | |

OTHER PUBLICATIONS

"Sebastian Koch et. al. (ABC: A Big CAD Model Model Dataset for Geometric Deep Learning, 2019, Proceedings of the IEEE/CVF Conference on Computer Vision and Pattern Recognition CVPR, pp. 9601-9611" (Year: 2019).*
"Michael Potmesil, Synthetic Image Generation with a Lens and Aperture Camera Model, 1982, ACM Transactions on Graphics, vol. 1, No. 2, pp. 85-108" (Year: 1982).*
Japanese Office Action dated Nov. 26, 2024 for Japanese Application No. 2021-074327.

* cited by examiner

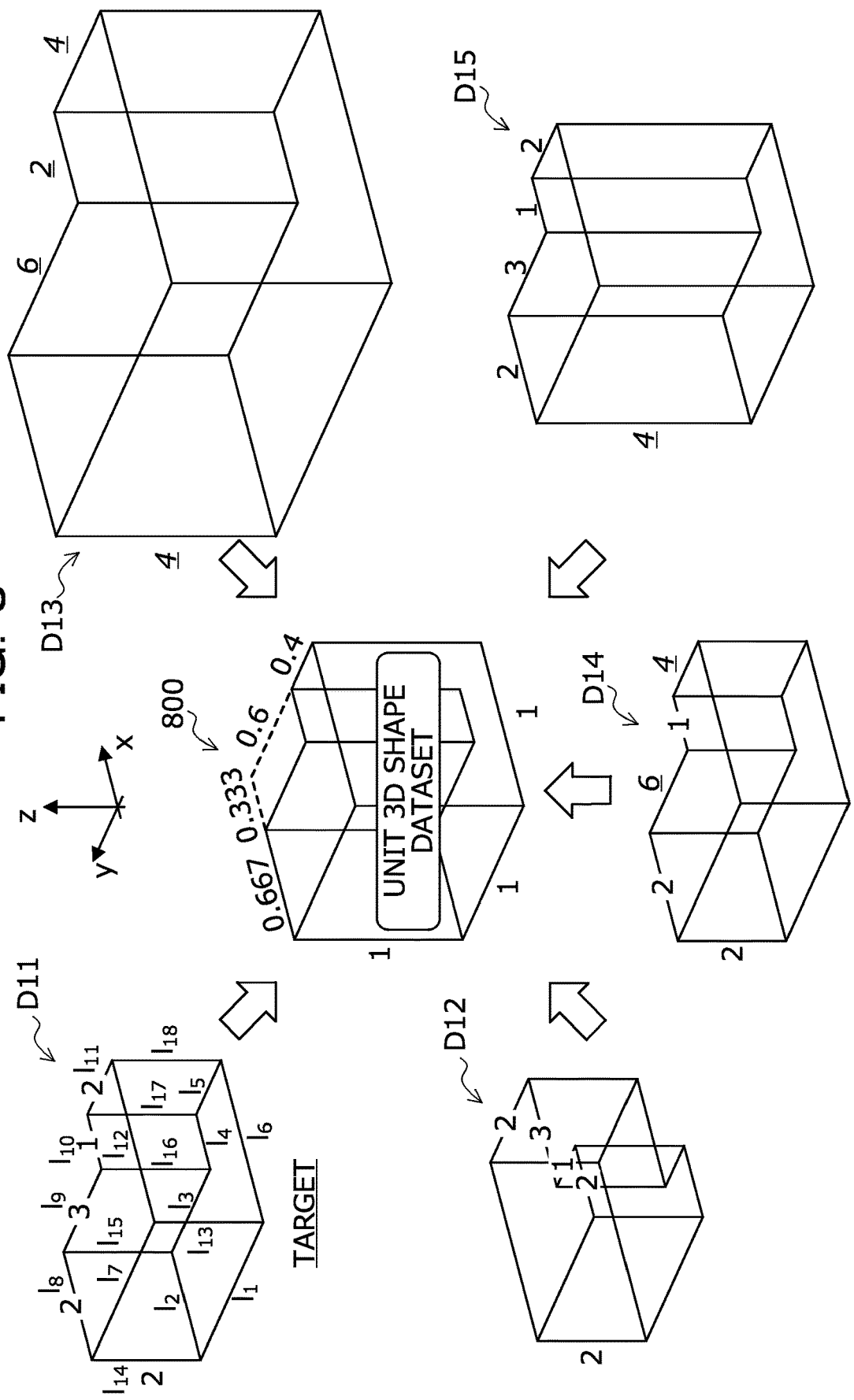

FIG. 9B

DIMENSION TABLE (N = 18), reference 900

| GROUP Ga | $I_{i1}$ | $I_{i2}$ | $I_{i3}$ | $I_{i4}$ | $I_{i5}$ | $I_{i6}$ | ... | $I_{iN}$ |
|---|---|---|---|---|---|---|---|---|
| DG1 | 5 | 4 | 3 | 2 | 2 | 6 | | |
| DG2 | 10 | 6 | 6 | 3 | 4 | 9 | | |
| DG3 | 3 | 5 | 1.8 | 2.5 | 1.2 | 7.5 | | |
| DG4 | 5 | 4 | 3 | 2 | 2 | 6 | | |
| ... | ... | | | | | | | |
| DGM | 10 | 6 | 5 | 4 | 15 | | | |

COLUMN VECTOR: $v_1$, $v_2$, ...

$v_1 = v_3 + v_5$
$v_3 = \dfrac{3}{2} \cdot v_5$
$v_6 = v_2 + v_4$
$v_2 = 2 \cdot v_4$
$v_{13} = v_{14} = v_{15} = v_{16} = v_{17} = v_{18}$

FIG. 18

UNIT 3D SHAPE DATASET A

1800
| c | a | d |
|---|---|---|
|   | b |   |
|   | f |   |
|   | e |   |

1801
| c' | a' | d' |
|---|---|---|
|   | b' |   |
|   | f' |   |
|   | e' |   |

1802
| c' | e' | d' |
|---|---|---|
|   | a' |   |
|   | b' |   |
|   | f' |   |

1824
| a' | b' | f' |
|---|---|---|
|   | c' |   |
|   | e' |   |
|   | d' |   |

UNIT 3D SHAPE DATASET B

FIG. 32

|   | 1 | 2 | 3 | 4 | 5 | ... |
|---|---|---|---|---|---|---|
| A | 50 | 34 | 5 | 10 | 64 | ... |
| B | 50 | 34 | 5 | 10 | 64 | ... |
| C | 50 | 34 | 5 | 10 | 96 | ... |
| D | 50 | 34 | 5 | 10 | 96 | ... |

3200

COMPUTER-READABLE RECORDING MEDIUM STORING SHAPE IDENTIFICATION PROGRAM, SHAPE IDENTIFICATION METHOD, AND INFORMATION PROCESSING APPARATUS

CROSS-REFERENCE TO RELATED APPLICATION

This application is based upon and claims the benefit of priority of the prior Japanese Patent Application No. 2021-74327, filed on Apr. 26, 2021, the entire contents of which are incorporated herein by reference.

FIELD

The embodiment discussed herein is related to a computer-readable recording medium storing a shape identification program, a shape identification method, and an information processing apparatus.

BACKGROUND

Heretofore, designing and drafting of a three-dimensional (3D) shape have been made by diversion design using past 3D shape datasets due to the necessity of a large number of man-hours. However, classifications of past 3D shape datasets are often improper and there are so many similar shapes. For this reason, in order to newly design a shape similar to an existing product, it is desirable to appropriately classify past 3D shape datasets and standardize designed objects.

As the related art, for example, there is a technique of searching for a standard component having an attribute value range and shape feature data matching the attribute value of the shape feature data of a design target component, searching for a standard component having an attribute value range similar to the attribute value of the design target component and having shape feature data similar to the shape feature data of the design target component, and searching for a case component having an attribute value similar to the attribute value of the design target component and having shape feature data similar to the shape feature data of the design target component.

There is a technique of searching for a similar component model number associated with an extracted model number by referring to similar component data, transmitting component data of the extracted model number and component data of all the searched-out similar component model numbers to a user terminal, and displaying a single-component search result detailed screen on which the model number of each component is displayed. There is a technique of finding a design process directly associated with extracted relationship information and a design process associated with different relationship information to which a design parameter in the former relationship information is further related, and changing the design parameter specifying a component shape based on the multiple design processes associated with the relationship information and the different relationship information, thereby generating the shape of the component.

There is a technique of using labels applied to faces and edges of a recognition model to determine the topology of the recognition model such as the convexity and concavity of edges or convexity and concavity of vertices within faces to generate an objective function and constraint conditions, and thereby carrying out shape recognition of the recognition model by restricting the shape recognition. There is a technique which allows an operator to input a two- or three-dimensional shape to a computer or the like to produce the shape and a scale thereof, and then make a change (such as deletion, addition, or correction) in the shape or scale.

Japanese Laid-open Patent Publication Nos. 9-179892, 2006-139486, 2004-21773, and 3-206564 and International Publication Pamphlet No. WO 2017/217032 are disclosed as related art.

SUMMARY

According to an aspect of the embodiments, a non-transitory computer-readable recording medium storing an identification program causing a computer to execute a process including: acquiring, for a first shape dataset and a second shape dataset, a third shape dataset and a fourth shape dataset, respectively, generated by changing sizes of the first shape dataset and the second shape dataset in each of directions of a plurality of coordinate axes according to a specific rule; generating a first plurality of images of the third shape dataset and a second plurality of images of the fourth shape dataset captured from both directions of the plurality of coordinate axes; and identifying a second portion in the second shape dataset corresponding to a first portion in the first shape dataset by aligning orientations of the first shape dataset and the second shape dataset based on a result of comparison between the first plurality of images and the second plurality of images.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an explanatory diagram illustrating an example of classification of 3D shape datasets;

FIG. 9B is an explanatory diagram illustrating an example of construction of relational expressions specifying dimensional relationships among parts;

FIG. 18 is an explanatory diagram illustrating an example of development diagrams;

FIG. 32 is an explanatory diagram illustrating a specific example of a dimension table.

DESCRIPTION OF EMBODIMENTS

In the related art, in order to standardize a designed object, it is difficult to derive dimensional relationships among parts such as edges and holes by appropriately classifying design data designed in the past. For example, there is a case where a failure to identify parts having a correspondence relationship in 3D shape datasets results in a failure to derive a dimensional relationship between the parts.

According to an aspect, the present disclosure aims to identify parts having a correspondence relationship in shape datasets.

Hereinafter, an embodiment of an identification program, an identification method, and an information processing apparatus according to the present disclosure will be described in detail with reference to the drawings.

EMBODIMENT

Figure 1:
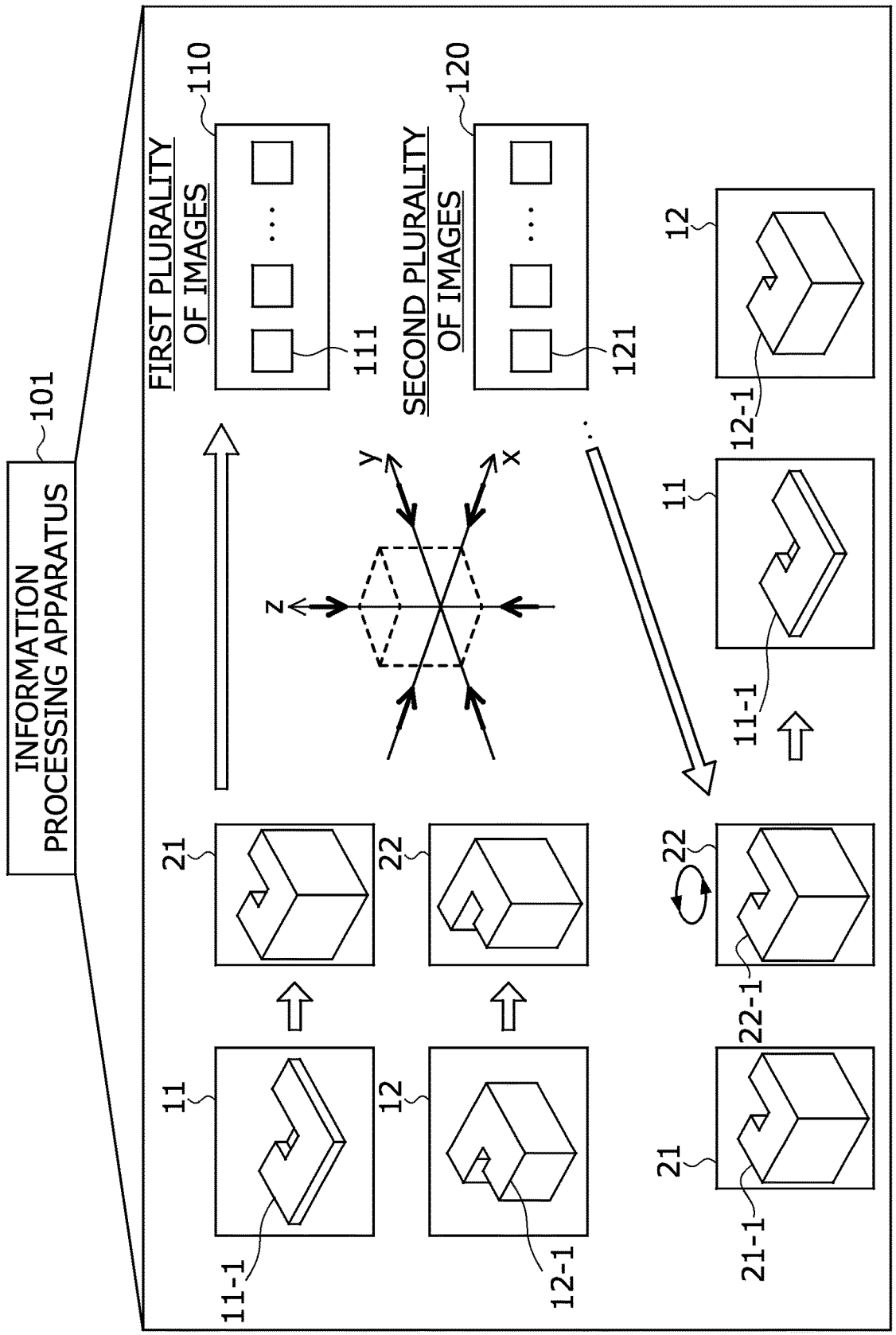
FIG. 1 is an explanatory diagram illustrating an example of an identification method according to an embodiment.

FIG. 1 is an explanatory diagram illustrating an example of an identification method according to an embodiment. In FIG. 1, an information processing apparatus 101 is a computer that assists designing of a target object. The target object is a design target, and is, for example, a three-dimensional object such as a component, a product, a construction member, or a building.

Since the designing of a 3D shape requests a large number of man-hours, diversion design using past 3D shape datasets is very helpful, if possible. On the other hand, since the classifications of past 3D shape datasets are often improper and there are so many similar shapes, it takes time and effort to manually search for a 3D shape dataset suitable for a design intention.

For this reason, in order to newly design a shape similar to an existing product, it is desirable to appropriately classify past 3D shape datasets and standardize the designed objects. For example, if it is possible to appropriately classify past 3D shape datasets and derive dimensional relationships (parametric model) among parts in 3D shapes, it is possible to make design that defines a 3D shape by setting various dimensions in a model (so-called parametric design).

As a method for classifying past 3D shape datasets, there is a method in which 3D shape datasets are compared with each other to obtain a similarity, and the 3D shape datasets are classified based on the similarity. For example, in a conceivable method, a target 3D shape dataset is designated and a search for 3D shape datasets to be classified into the same group is performed based on the similarities to the target 3D shape dataset.

The target 3D shape dataset is, for example, a 3D shape dataset for designating a design intention for a target object. Examples of the design intention include a rough shape (a shape whose detailed dimensions are not designated) of a target object, a dimensional ratio among some parts, a relative positional relationship among some parts, and the like.

A target 3D shape dataset is designated, for example, by selecting any of 3D shape datasets designed in the past. The target 3D shape dataset designated from among the past 3D shape datasets is, for example, a 3D shape dataset that is different in detailed dimensions from a target object, but was created with the same design intention as the target object.

This classification method searches for a 3D shape dataset having a shape that is the same as or geometrically similar to the target. However, among shapes even similar in 3D shape datasets, some shapes have dimensional relationships among parts or other some shapes have no dimensional relationships among parts depending on the design intentions. For this reason, only 3D shape datasets having the same shape or similar shapes are not necessarily 3D shape datasets desired to be classified into the same group.

It is also conceivable to classify past 3D shape datasets in consideration of their design intentions by manually checking the past 3D shape datasets one by one. However, there is a problem that it takes time and effort to manually classify an enormous number of 3D shape datasets, which leads to an increase in the number of man-hours for designing a target object. It is difficult for a person other than a designer to determine the design intentions from the 3D shape datasets.

To address this, it is conceivable to construct a parametric model by classifying multiple 3D shape datasets based on unit 3D shape datasets obtained by normalizing the 3D shape datasets, and identifying dimensional relationships among parts in the 3D shape datasets groped based on the unit 3D shape datasets. According to this method, for example, a unit 3D shape dataset is created by normalizing a 3D shape dataset in each of the components in the coordinate axis directions.

To normalize a 3D shape dataset in each of the components in the coordinate axis directions means to convert the 3D shape dataset while maintaining the dimensional relationship among parts in each of the coordinate axis directions (for example, an x-axis, a y-axis, and a z-axis directions). By determining the similarity based on the unit 3D shape datasets, it is possible to group shapes having the same ratio among edges in each of the coordinate axis directions and therefore classify not only the same shapes as or shapes similar to the target but also shapes partially different in length from the target into the same group.

However, in computer-aided design (CAD) datasets of 3D shapes, a reference face may differ among creators, and the orientations of objects created may differ there among. For this reason, even when similar 3D shape datasets are identified, it may be still difficult to identify parts having a correspondence relationship in the 3D shape datasets.

In order to align the orientations of the 3D shape datasets with each other, it is conceivable to identify corresponding portions in the similar 3D shape datasets by a method such as principal component analysis based on the feature values of the 3D shape datasets and determine the directions of the axes. However, in a similar shape search based on the parametric relationships using the unit 3D shape datasets, there is a case where the images of 3D shape datasets compared are not recognized as similar shapes in the related art.

Unless the images of 3D shape datasets compared are recognized as similar shapes in the related art, the corresponding portions may not be identified based on the feature values of the images, and therefore the orientations of the 3D shape datasets may not be aligned with each other. Even if the orientations of the 3D shape datasets are somehow aligned, it is still difficult to identify corresponding portions in the multiple 3D shape datasets different in dimensions.

To address this, in the present embodiment, description will be given of an identification method for identifying corresponding portions in 3D shape datasets by aligning the orientations of the 3D shape datasets based on, for example, parametric relationships. Hereinafter, a processing example of the information processing apparatus 101 will be described.

(1) The information processing apparatus 101 acquires a third shape dataset and a fourth shape dataset for a first shape dataset and a second shape dataset, respectively. The third shape dataset and the fourth shape dataset are generated by changing the sizes of the first shape dataset and the second shape dataset in each of directions of multiple axes according to a specific rule. The shape dataset is information specifying the shape of a designed object, and contains, for example, position information, face information, hole information, and so on of each feature point in the designed object. Examples of the feature points include a vertex, a center point of a hole, and so on in a designed object.

The position information of a feature point specifies, for example, the coordinates of the feature point in an orthogonal coordinate system. The face information of a feature point is, for example, information specifying a face to which the feature point belongs. The hole information of a feature point is, for example, information specifying a shape, a size, and so on of a hole to which the feature point belongs. For example, the shape dataset may contain color information, material information, and so on of each face.

For example, the shape dataset is a three-dimensional shape dataset. In more detail, for example, the shape dataset is design data designed in the past by using a three-dimensional computer-aided design (CAD). Instead, the shape dataset may be a two-dimensional shape dataset.

The first shape dataset and the second shape dataset are shape datasets to be compared. For example, the first shape dataset is a target shape dataset. For example, the second shape dataset is a shape dataset classified as similar to the first shape dataset based on parametric relationships, Specific processing details for classifying shape datasets based on parametric relationships (unit shape datasets) will be described later.

The multiple axes are axes that serve as references for determining the position of the shape dataset, and are, for example, an x axis, a y axis, and a z axis in a three-dimensional coordinate system. To change the size in each of the directions of the multiple axes according to the specific rule means, for example, to normalize the shape dataset in each of the components in the coordinate axis directions.

For example, the third shape dataset is a unit shape dataset created by normalizing the first shape dataset in each of the components in the coordinate axis directions. The fourth shape dataset is, for example, a unit shape dataset created by normalizing the second shape dataset in each of the components in the coordinate axis directions.

An example in FIG. 1 assumes that a third shape dataset 21 and a fourth shape dataset 22 generated by changing the sizes of a first shape dataset 11 and a second shape dataset 12 in each of the directions of the multiple axes according to a specific rule are acquired for the first shape dataset 11 and the second shape dataset 12, respectively.

(2) The information processing apparatus 101 generates a first plurality of images and a second plurality of images of the third shape dataset and the fourth shape dataset, respectively, captured from both directions of the multiple axes. The first plurality of images are, for example, a set of 2D images of the third shape dataset captured from the positive and negative directions of the x axis, the y axis, and the z axis.

For example, the second plurality of images are a set of 2D images of the fourth shape dataset captured from the positive and negative directions of the x axis, the y axis, and the z axis. A cube depicted by dotted lines in FIG. 1 represents the third shape dataset or the fourth shape dataset captured from the positive and negative directions of the x axis, the y axis, and the z axis.

In the example in FIG. 1, for example, the information processing apparatus 101 generates a first plurality of images 110 of the third shape dataset 21 captured from the positive and negative directions of the x axis, the y axis, and the z axis. For example, an image 111 included in the first plurality of images 110 is a 2D image of the third shape dataset 21 captured from the positive direction of the x axis.

The information processing apparatus 101 generates a second plurality of images 120 of the fourth shape dataset 22 captured from the positive and negative directions of the x axis, the y axis, and the z axis. For example, an image 121 included in the second plurality of images 120 is a 2D image of the fourth shape dataset 22 captured from the positive direction of the y axis.

(3) The information processing apparatus 101 aligns the orientations of the first shape dataset and the second shape dataset based on a result of comparison between the first plurality of images and the second plurality of images, and identifies a second portion in the second shape dataset corresponding to a first portion in the first shape dataset. For example, the information processing apparatus 101 compares each of the first plurality of images with each of the second plurality of images, and calculates a similarity between the images.

Based on the calculated similarities between the images, the information processing apparatus 101 identifies correspondence relationships between images included in the first plurality of images and images included in the second plurality of images. The information processing apparatus 101 aligns the orientations of the first shape dataset and the second shape dataset based on the identified correspondence relationships and thereby identifies the second portion corresponding to the first portion.

In the example in FIG. 1, for example, the information processing apparatus 101 searches the second plurality of images 120 for an image a having the highest similarity to an image 1 (for example, the image 111) included in the first plurality of images 110 and thereby identifies the correspondence relationship between the image 1 included in the first plurality of images and the image a (for example, the image 121) included in the second plurality of images.

The information processing apparatus 101 searches the second plurality of images 120 for an image b (except for the image a) having the highest similarity to an image 2 included in the first plurality of images 110 and thereby identifies the correspondence relationship between the image 2 included in the first plurality of images 110 and the image b included in the second plurality of images 120.

The information processing apparatus 101 searches the second plurality of images 120 for an image c (except for the images a and b) having the highest similarity to an image 3 included in the first plurality of images 110 and thereby identifies the correspondence relationship between the image 3 included in the first plurality of images 110 and the image c included in the second plurality of images 120.

The information processing apparatus 101 aligns the dispositions of the images 1 and a, the dispositions of the images 2 and b, and the dispositions of the images 3 and c based on the respective correspondence relationships between the images 1, 2, and 3 and the images a, b, and c and thereby aligns the orientations of the third shape dataset 21 and the fourth shape dataset 22 with each other.

Part-to-part correspondence relationships between the first shape dataset 11 and the third shape dataset 21 are made identifiable by, for example, associating corresponding parts before and after the conversion with each other. Part-to-part correspondence relationships between the second shape dataset 12 and the fourth shape dataset 22 are made identifiable by, for example, associating corresponding parts before and after the conversion with each other.

The information processing apparatus 101 aligns the orientation of the first shape dataset 11 with the orientation of the third shape dataset 21 by referring to the part-to-part correspondence relationships between the first shape dataset 11 and the third shape dataset 21. The information processing apparatus 101 aligns the orientation of the second shape dataset 12 with the orientation of the fourth shape dataset 22 by referring to the part-to-part correspondence relationships between the second shape dataset 12 and the fourth shape dataset 22.

Thus, the information processing apparatus 101 is capable of aligning the orientations of the first shape dataset 11 and the second shape dataset 12. The information processing apparatus 101 identifies part-to-part correspondence relationships between the third shape dataset 21 and the fourth shape dataset 22 whose orientations are aligned. For example, the information processing apparatus 101 identifies a correspondence relationship between an edge 21-1 in the third shape dataset 21 and an edge 22-1 in the fourth shape dataset 22.

The information processing apparatus 101 identifies part-to-part correspondence relationships between the first shape dataset 11 and the second shape dataset 12 whose orientations are aligned by referring to the part-to-part correspondence relationships between the third shape dataset 21 and the fourth shape dataset 22 whose orientations are aligned. Thus, the information processing apparatus 101 is capable of identifying a second portion (edge 12-1) in the second shape dataset 12 corresponding to a first portion (for example, edge 11-1) in the first shape dataset 11.

As described above, the information processing apparatus 101 is capable of identifying parts having a correspondence relationship in shape datasets grouped based on the parametric relationships. For example, in the example in FIG. 1, the information processing apparatus 101 is capable of identifying the correspondence relationship between the edge 11-1 in the first shape dataset 11 and the edge 12-1 in the second shape dataset 12. This makes it possible to obtain information for deriving dimensional relationships among different parts in the first shape dataset 11 and the second shape dataset 12.

(System Configuration Example of Information Processing System 200)

Next, a system configuration example of an information processing system 200 including the information processing apparatus 101 will be described. Here, the description will be given of an example in which the information processing apparatus 101 illustrated in FIG. 1 is applied to a model generation apparatus 201 in the information processing system 200. For example, the information processing system 200 is applied to a computer system that assists designing of 3D shapes related to products and buildings.

In the following description, a "three-dimensional (3D) shape dataset" will be described as an example of a shape dataset.

Figure 2:
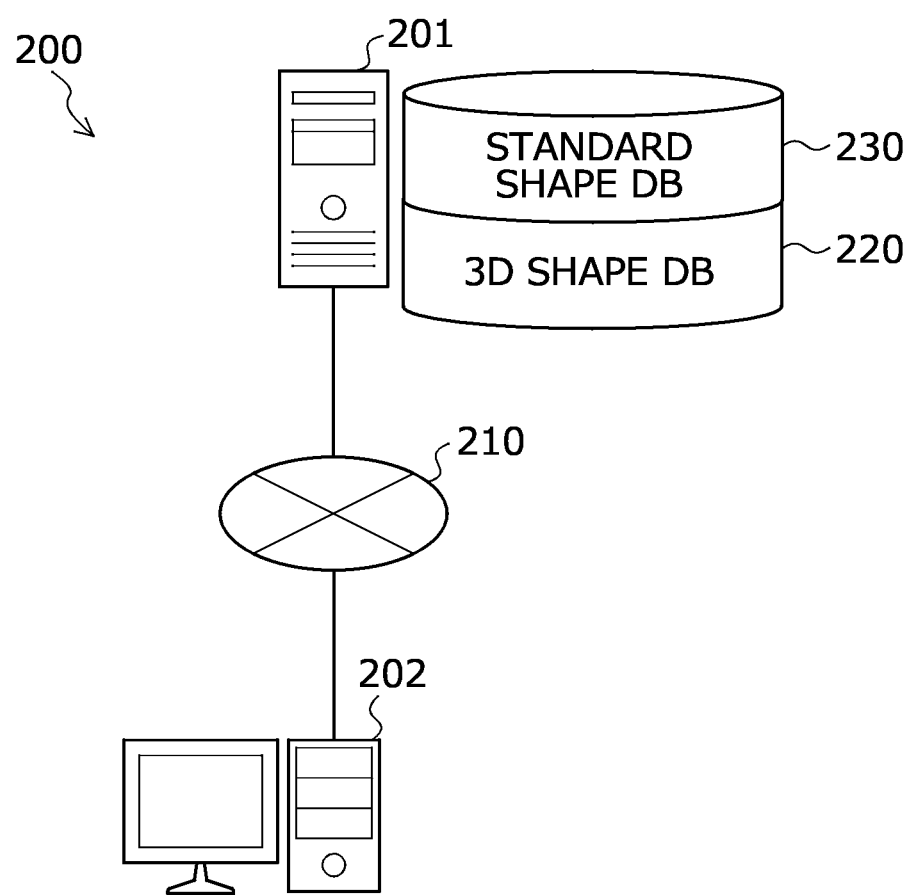
FIG. 2 is an explanatory diagram illustrating a system configuration example of an information processing system.

FIG. 2 is an explanatory diagram illustrating a system configuration example of the information processing system 200. In FIG. 2, the information processing system 200 includes the model generation apparatus 201 and a client apparatus 202. In the information processing system 200, the model generation apparatus 201 and the client apparatus 202 are coupled to each other via a wired or wireless network 210. The network 210 is, for example, the Internet, a local area network (LAN), a wide area network (WAN), or the like.

The model generation apparatus 201 has a 3D shape database (DB) 220 and a standard shape DB 230. For example, the model generation apparatus 201 is a server. The 3D shape DB 220 is a database that stores 3D shape datasets designed in the past. The standard shape DB 230 is a database that stores standard shape datasets. Information stored in the 3D shape DB 220 and the standard shape DB 230 will be described later with reference to FIGS. 4 and 5.

The client apparatus 202 is a computer to be used by a user. The client apparatus 202 is, for example, a personal computer (PC), a tablet PC, or the like. The user is, for example, a designer in charge of designing of a target object.

Although only one client apparatus 202 is illustrated in the example in FIG. 2, the system configuration is not limited thereto. For example, the information processing system 200 may include multiple client apparatuses 202. Although the model generation apparatus 201 is provided separately from the client apparatus 202, the system configuration is not limited thereto. For example, the model generation apparatus 201 may be implemented by the client apparatus 202.

(Hardware Configuration Example of Model Generation Apparatus 201)

Figure 3:
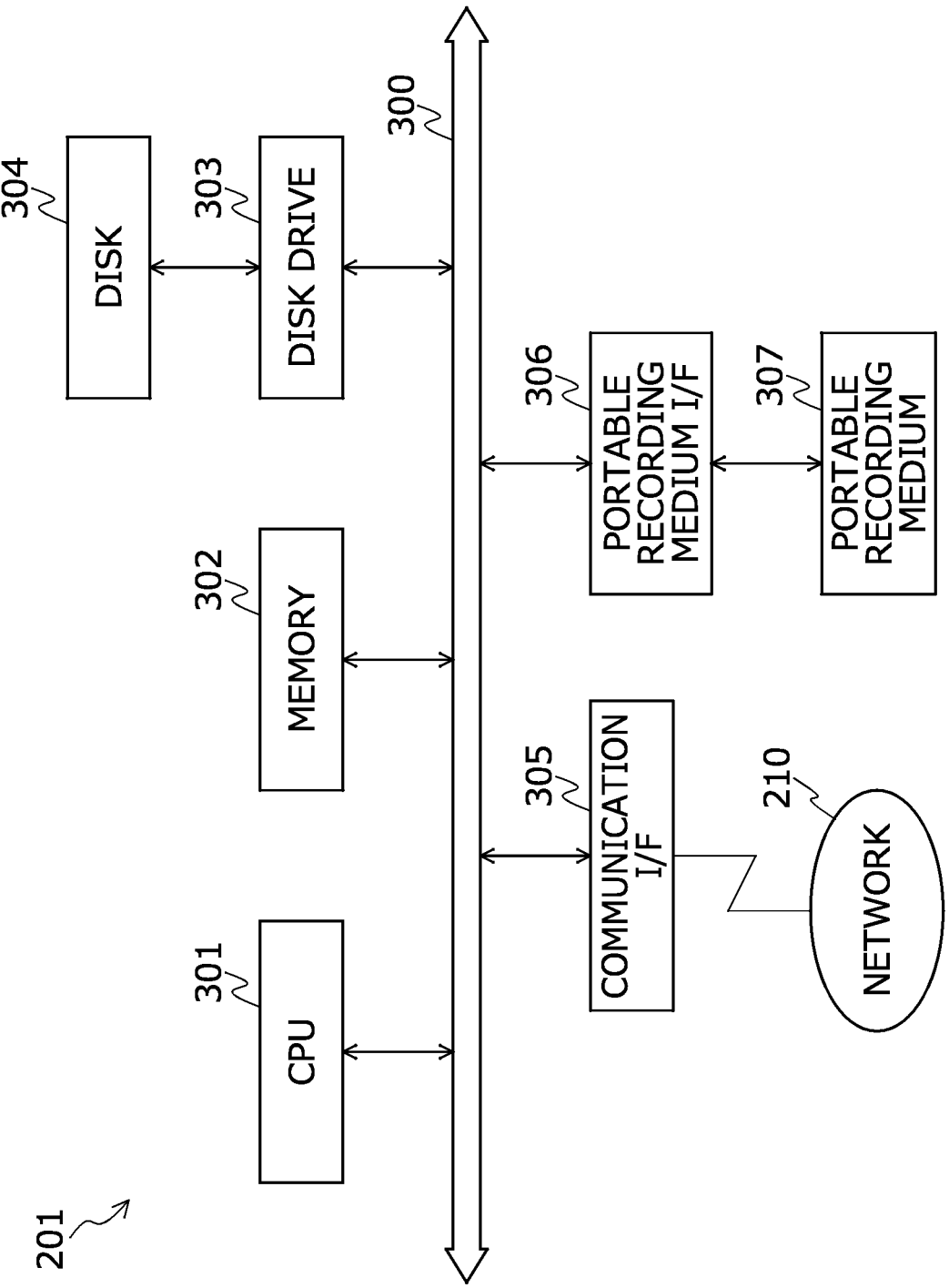
FIG. 3 is a block diagram illustrating a hardware configuration example of a model generation apparatus.

FIG. 3 is a block diagram illustrating a hardware configuration example of the model generation apparatus 201. In FIG. 3, the model generation apparatus 201 includes a central processing unit (CPU) 301, a memory 302, a disk drive 303, a disk 304, a communication interface (I/F) 305, a portable recording medium I/F 306, and a portable recording medium 307. These components are coupled to one another through a bus 300.

In this configuration, the CPU 301 controls the entire model generation apparatus 201. The CPU 301 may include multiple cores. The memory 302 includes, for example, a read-only memory (ROM), a random-access memory (RAM), a flash ROM, and the like. For example, the flash ROM stores an operating system (OS) program, the ROM stores application programs, and the RAM is used as a work area of the CPU 301. The programs stored in the memory 302 are loaded by the CPU 301, thereby causing the CPU 301 to execute coded processing.

The disk drive 303 controls reading and writing of data from and to the disk 304 in accordance with the control of the CPU 301. The disk 304 stores data written under the control of the disk drive 303. Examples of the disk 304 include a magnetic disk, an optical disk, and the like.

The communication I/F 305 is coupled to the network 210 via a communication line, and is coupled to an external computer (for example, the client apparatus 202 illustrated in FIG. 2) via the network 210. The communication I/F 305 functions as an interface between the network 210 and the inside of the model generation apparatus 201 and controls input and output of data from and to the external computer. As the communication I/F 305, for example, a modem, a LAN adapter, or the like may be used.

The portable recording medium I/F 306 controls reading and writing of data from and to the portable recording medium 307 in accordance with the control of the CPU 301. The portable recording medium 307 stores data written under the control of the portable recording medium I/F 306. Examples of the portable recording medium 307 include a compact disk (CD)-ROM, a Digital Versatile Disk (DVD), a Universal Serial Bus (USB) memory, and the like.

The model generation apparatus 201 does not have to include, for example, the disk drive 303, the disk 304, the portable recording medium I/F 306, and the portable recording medium 307 among the aforementioned components. The model generation apparatus 201 may include, for example, a display, an input device, and the like, in addition to the aforementioned components. The client apparatus 202 illustrated in FIG. 2 may be also implemented by the same hardware configuration as the model generation apparatus 201.

(Information Stored in DBs 220 and 230)

The information stored in the DBs 220 and 230 included in the model generation apparatus 201 will be described with reference to FIGS. 4 and 5. Each of the DBs 220 and 230 is implemented, for example, by a storage device such as the memory 302 or the disk 304 illustrated in FIG. 3.

Figure 4:
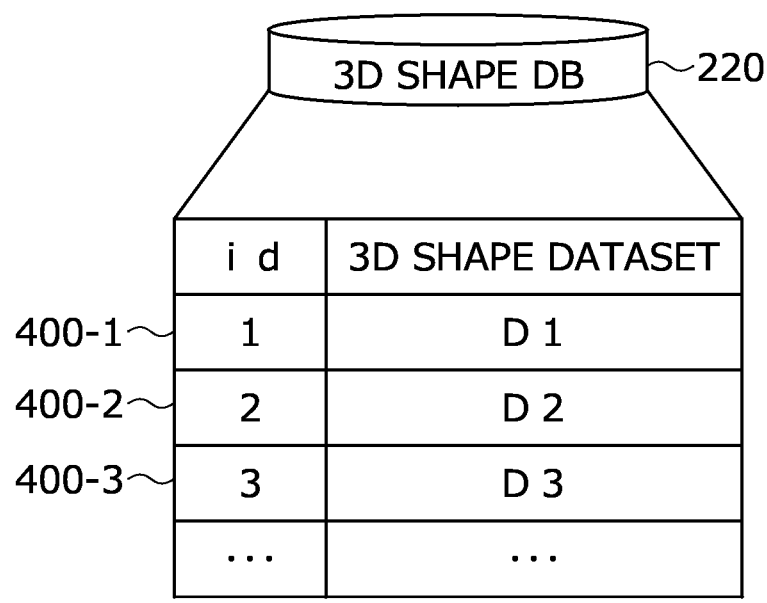
FIG. 4 is an explanatory diagram illustrating an example of information stored in a 3D shape database (DB)

FIG. 4 is an explanatory diagram illustrating an example of the information stored in the 3D shape DB 220. In FIG. 4, the 3D shape DB 220 has fields named id and 3D shape dataset and stores 3D shape management information (for example, 3D shape management information 400-1 to 400-3) as records by setting information in these fields.

In this DB, id is an identifier for uniquely identifying each 3D shape dataset. The 3D shape dataset is a 3D shape dataset designed in the past. Here, for convenience of explanation, 3D shape datasets are expressed as "D1, D2, D3, . . . ", respectively. For example, the 3D shape management information 400-1 specifies the 3D shape dataset D1 with id "1".

Figure 5:
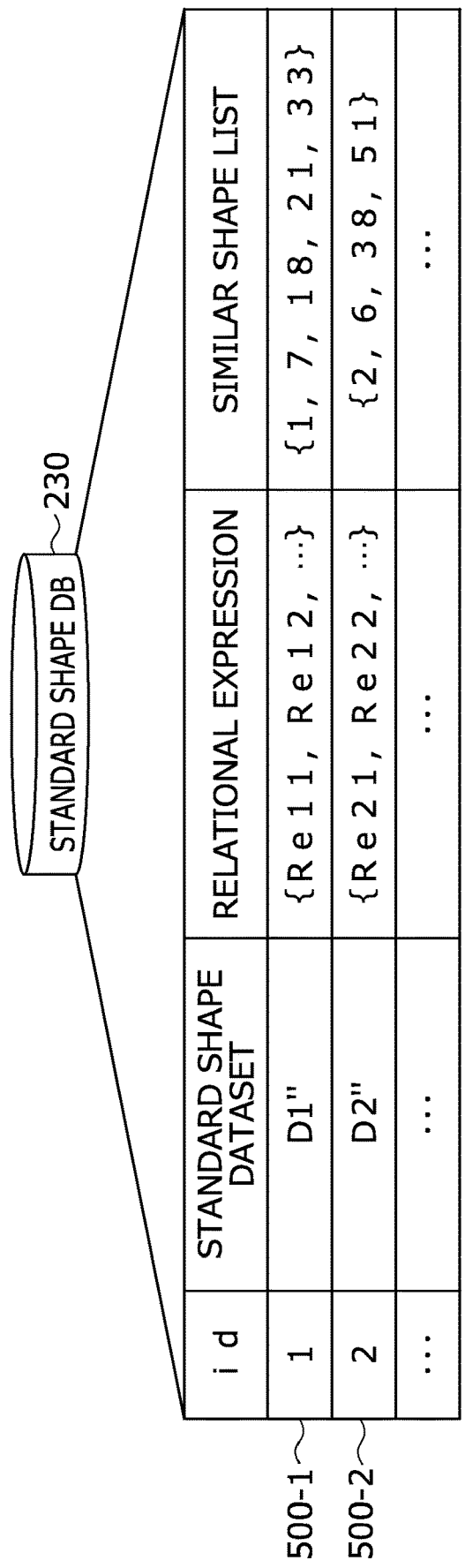
FIG. 5 is an explanatory diagram illustrating an example of information stored in a standard shape DB (part 1)

FIG. 5 is an explanatory diagram illustrating an example of the information stored in the standard shape DB 230 (part 1). In FIG. 5, the standard shape DB 230 has fields named id, standard shape dataset, relational expression, and similar shape list, and stores standard shape management information (for example, standard shape management information 500-1 and 500-2) as records by setting information in these field.

In this DB, id is the id of a 3D shape dataset based on which each standard shape dataset is created. The standard shape dataset is a unit 3D shape dataset registered as a standard shape dataset. The relational expression is a mathematical expression specifying a dimensional relationship among different parts (for example, edges) in the 3D shape dataset based on which the standard shape dataset is created.

In this DB, each Re ## (## is a number) represents a different mathematical expression. Each mathematical expression specifies, for example, a dimensional relationship among different edges in a 3D shape dataset. The similar shape list is a list of id of the 3D shape datasets classified into the same group based on the standard shape datasets (unit 3D shape datasets).

For example, the standard shape management information 500-1 specifies a standard shape dataset D1", the relational expressions {Re11, Re12, . . . }, and the similar shape list {1, 7, 18, 21, 33} for the 3D shape dataset D1 with id "1". Variables representing parts in the standard shape dataset (unit shape dataset) correspond to variables in the relational expressions. Thus, it is possible to identify which part in the standard shape dataset (unit shape dataset) corresponds to which variable in the relational expressions.

(Functional Configuration Example of Model Generation Apparatus 201)

Figure 6:
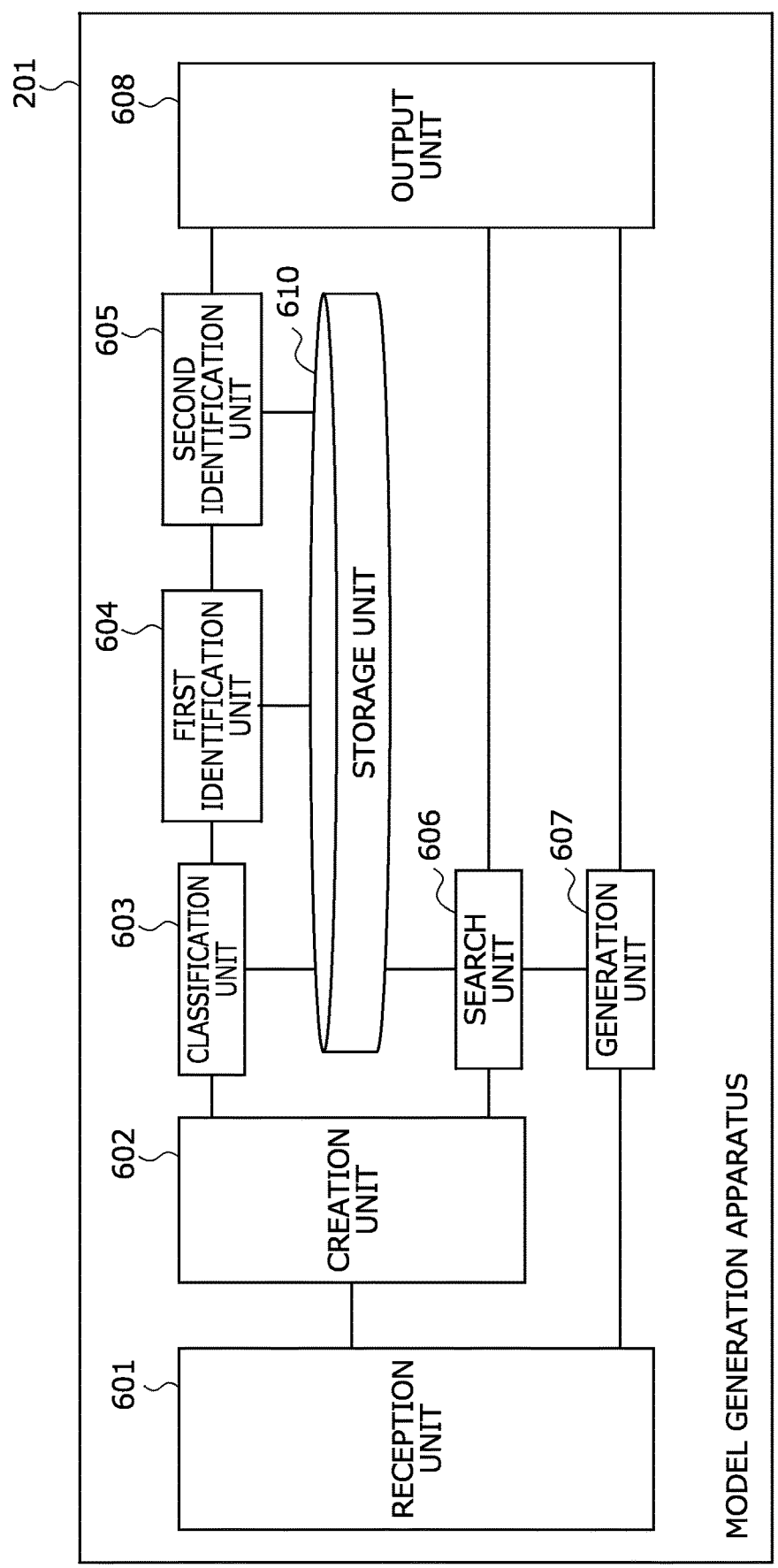
FIG. 6 is a block diagram illustrating a functional configuration example of the model generation apparatus.

FIG. 6 is a block diagram illustrating a functional configuration example of the model generation apparatus 201. In FIG. 6, the model generation apparatus 201 includes a reception unit 601, a creation unit 602, a classification unit 603, a first identification unit 604, a second identification unit 605, a search unit 606, a generation unit 607, an output unit 608, and a storage unit 610. The reception unit 601 to the output unit 608 are functions constituting a control unit. For example, the functions are implemented by causing the CPU 301 to execute a program stored in a storage device such as the memory 302, the disk 304, or the portable recording medium 307 illustrated in FIG. 3 or by using the communication I/F 305. The processing results obtained by these functional units are stored, for example, in a storage device such as the memory 302 or the disk 304, The storage unit 610 is implemented by a storage device such as the memory 302 or the disk 304. For example, the storage unit 610 stores the 3D shape DB 220 illustrated in FIG. 4 and the standard shape DB 230 illustrated in FIG. 5.

The reception unit 601 receives designation of a target 3D shape dataset. For example, the target 3D shape dataset is a 3D shape dataset for designating the design intention of a target object, and is designated from among the 3D shape datasets stored in the 3D shape DB 220. Instead, the target 3D shape dataset may be a 3D shape dataset in a state where basic design (designed with rough dimensions) for the target object is finished.

For example, the reception unit 601 receives designation of a target 3D shape dataset by receiving designation of the id of any of the 3D shape datasets stored in the 3D shape DB 220 from the client apparatus 202. Instead, the reception unit 601 may receive a target 3D shape dataset as a whole from the client apparatus 202.

The creation unit 602 generates a unit 3D shape dataset for each of the multiple 3D shape datasets by changing the size of the 3D shape dataset in each of the directions of the multiple axes according to a specific rule. For example, the creation unit 602 normalizes each of the multiple 3D shape datasets in each of the components in the coordinate axis directions to create a unit 3D shape dataset. For example, the creation unit 602 extracts the minimum value in each coordinate axis direction from the coordinates of the feature points in each 3D shape dataset. Examples of the feature points include a vertex, a center point of a hole, and so on in a designed object.

The creation unit 602 subtracts the extracted minimum value in each coordinate axis direction from the corresponding value of the coordinates of each of the feature points. Next, the creation unit 602 extracts the maximum value in each coordinate axis direction from the coordinates of the feature points after the subtraction. The creation unit 602 creates the unit 3D shape dataset for each 3D shape dataset by dividing each value of the coordinates of each of the feature points after the subtraction by the extracted maximum value in the corresponding coordinate axis direction.

An example of creation of a unit 3D shape dataset will be described with reference to FIG. 7. In the following description, a given one of the multiple 3D shape datasets will be referred to as a "3D shape dataset Di" (where i is a natural number of 1 or more) in some cases.

Figure 7:
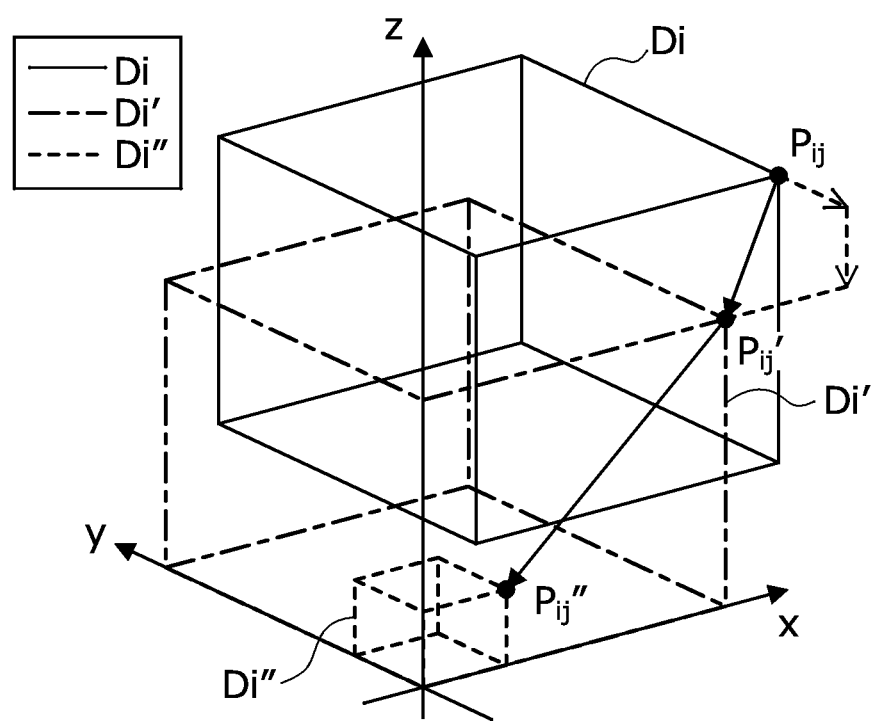
FIG. 7 is an explanatory diagram illustrating an example of creation of a unit 3D shape dataset.

FIG. 7 is an explanatory diagram illustrating an example of creation of a unit 3D shape dataset. In FIG. 7, coordinates of each vertex j in a 3D shape dataset Di (solid lines in FIG. 7) are expressed as $P_{ij}(x_{ij}, y_{ij}, z_{ij})$ (where j=1, 2, . . . , J). Here, a case where the 3D shape dataset Di is a "rectangular parallelepiped" will be described as an example. "Vertices" are used as feature points in the 3D shape dataset Di.

First, the creation unit 602 extracts the minimum value in each coordinate axis direction from the coordinates of the vertices j in the 3D shape dataset Di. The creation unit 602 subtracts the extracted minimum value in each of the coordinate axis directions from the corresponding value of the coordinates $P_{ij}$ of each vertex j and thereby translates the 3D shape dataset Di. A new 3D shape dataset (dashed-dotted lines in FIG. 7) obtained here is denoted by Di', and the coordinates of each vertex are denoted by $P_{ij}'(x_{ij}', y_{ij}', z_{ij}')$.

Then, $x_{ij}'$, $y_{ij}'$, and $z_{ij}'$ are expressed by the following formulas (1) to (3), Here, "i, j, J ∈ natural numbers" and "$x_{ij}$, $y_{ij}$, $z_{ij}$>0".

$$x_{ij}'=x_{ij}-\text{Min}([x_{i1}, x_{i2}, \ldots, x_{i,J}]) \quad (1)$$

$$y_{ij}'=y_{ij}-\text{Min}([y_{i1}m\ y_{i2}, \ldots, y_{i,J}]) \quad (2)$$

$$z_{ij}'=z_{ij}-\text{Min}([z_{i}, z_{i2}, \ldots, z_{i,J}]) \quad (3)$$

Then, the creation unit 602 extracts the maximum value in each coordinate axis direction from the coordinates $P_{ij}'$ of the vertices. The creation unit 602 divides each value of the coordinates $P_{ij}'$ of each vertex by the extracted maximum value in the corresponding coordinate axis direction, thereby creating a unit 3D shape dataset by the normalization. The unit 3D shape dataset (dotted lines in FIG. 7) obtained here is denoted by Di", and the coordinates of each vertex are denoted by $P_{ij}''(x_{ij}'', y_{ij}'', z_{ij}'')$.

Then, $x_{ij}''$ $y_{ij}''$, and $z_{ij}''$) are expressed by the following formulas (4) to (6).

$$x_{ij}''=x_{ij}'/\text{Max}([x_{i1}', x_{i2}', \ldots, x_{i,J}']) \quad (4)$$

$$y_{ij}''=y_{ij}'/\text{Max}([y_{i1}', y_{i2}', \ldots, y_{i,J}']) \quad (5)$$

$$z_{ij}''=z_{ij}'/\text{Max}([z_{i1}', z_{i2}', \ldots, z_{i,J}']) \quad (6)$$

Returning to the description of FIG. 6, the classification unit 603 classifies multiple 3D shape datasets based on the created unit 3D shape datasets for the respective 3D shape datasets. For example, the classification unit 603 calculates a similarity between the unit 3D shape datasets for the respective 3D shape datasets. Next, the classification unit 603 identifies a combination of unit 3D shape datasets between which the calculated similarity is equal to or higher than a threshold.

The classification unit 603 classifies the multiple 3D shape datasets such that the 3D shape datasets respectively corresponding to the unit 3D shape datasets included in the identified combination of the unit 3D shape datasets belong to the same group. The threshold may be arbitrarily set. For example, the threshold is set to such a value that unit 3D shape datasets may be determined to match each other if the similarity therebetween is equal to or higher than the threshold.

In more detail, for example, the classification unit 603 compares the unit 3D shape dataset of the designated target 3D shape dataset with the unit 3D shape dataset for each of the 3D shape datasets in the 3D shape DB 220, and calculates the similarity between the unit 3D shape datasets. For example, the classification unit 603 compares images of unit 3D shape datasets captured from each of the multiple directions between the unit 3D shape datasets, and calculates a similarity between the images. Any existing technique may be used to calculate the similarity between the images.

Next, the classification unit 603 calculates the similarity between the unit 3D shape datasets by summing up the calculated similarities between the images. The classification unit 603 classifies the 3D shape datasets corresponding to the combination of the unit 3D shape datasets between which the calculated similarity is equal to or higher than the threshold into the same group. Thus, it is possible to extract the 3D shape datasets whose unit 3D shape datasets are similar to that of the target 3D shape dataset from the 3D shape DB 220.

An example of classification of 3D shape datasets will be described with reference to FIG. 8.

FIG. 8 is an explanatory diagram illustrating an example of classification of 3D shape datasets. FIG. 8 illustrates 3D shape datasets D11 to D15. The 3D shape dataset D11 is a target 3D shape dataset. The 3D shape dataset D12 is a 3D shape dataset different in orientation from the target 3D shape dataset D11.

The 3D shape dataset D13 is a 3D shape dataset having a similarity relationship with the target 3D shape dataset D11. Each of the 3D shape datasets D14 and D15 is a 3D shape dataset partially different in length from the target 3D shape dataset D11. In FIGS. 8, $I_1$ to $I_{18}$ in the 3D shape dataset D11 denote edges in the 3D shape dataset D11. A numerical value in each 3D shape dataset D11 to D15 indicates a dimension of each edge.

When the 3D shape datasets D11 to D15 are normalized in each of the components in the coordinate axis directions as described with reference to FIG. 7, unit 3D shape datasets 800 (equivalent to the 3D shape datasets D11" to D15") having the same shape are generated, respectively. In this case, the 3D shape datasets D11 to D15 are classified into the same group.

The determination of the similarity based on the unit 3D shape datasets (parametric relationships) as described above makes it possible to group together shapes having the same ratio among edges in each of the coordinate axis directions. As a result, not only shapes same as or similar to the target but also shapes partially different in length from the target may be classified into the same group.

Returning to the description of FIG. 6, the first identification unit 604 identifies a second portion in a second 3D shape dataset corresponding to a first portion in a first 3D shape dataset. The first 3D shape dataset and the second 3D shape dataset are 3D shape datasets classified into a group. For example, the first 3D shape dataset is a target 3D shape dataset.

For example, the second 3D shape dataset is a 3D shape dataset whose unit 3D shape dataset is similar to that of the target 3D shape dataset. The first portion is a shape (part) of a portion expressed by the first 3D shape dataset, and is, for example, an edge, a hole, or the like. The second portion is a shape (part) of a portion expressed by the second 3D shape dataset, and is, for example, an edge, a hole, or the like. For example, for each edge (first portion) in the first 3D shape dataset, the first identification unit 604 identifies an edge (second portion) in the second 3D shape dataset corresponding to the edge (first portion) in the first 3D shape dataset.

For example, the first identification unit 604 acquires a third 3D shape dataset and a fourth 3D shape dataset for the first 3D shape dataset or the second 3D shape dataset, respectively, the third and fourth 3D shape datasets generated by changing the sizes of the first and second 3D shape datasets in each of the directions of the multiple axes according to the specific rule. The third 3D shape dataset is, for example, a unit 3D shape dataset created by normalizing the first 3D shape dataset in each of the components in the coordinate axis directions. The fourth 3D shape dataset is, for example, a unit 3D shape dataset created by normalizing the second 3D shape dataset in each of the components in the coordinate axis directions.

Next, the first identification unit 604 generates a first plurality of images of the third 3D shape dataset and a second plurality of images of the fourth 3D shape dataset captured from both directions of the multiple axes, respectively. The first plurality of images are, for example, a set of 2D images of the third 3D shape dataset captured from both directions of the x axis, the y axis, and the z axis. The second plurality of images are, for example, a set of 2D images of the fourth 3D shape dataset captured from both directions of the x axis, the y axis, and the z axis.

In the following description, a set of views composed of six images (2D images) of a 3D shape dataset captured from the positive and negative directions of the x axis, the y axis, and the z axis may be referred to as a "six-face view". Any of the faces in the six-face view corresponds to one of the images of the 3D shape dataset captured from the positive and negative directions of the x axis, the y axis, and the z axis.

In more details, for example, the first identification unit 604 generates the first plurality of images by capturing images of the third 3D shape dataset from each of both directions (positive and negative directions) of each of the x axis, the y axis, and the z axis, while rotating the third 3D shape dataset around the above axis by a predetermined angle α. The predetermined angle α may be arbitrarily set, and be set, for example, to a value such as 45 degrees, 90 degrees, or 180 degrees.

The first identification unit 604 generates the second plurality of images by capturing images of the fourth 3D shape dataset from each of both directions (positive and negative directions) of each of the x axis, the y axis, and the z axis, while rotating the fourth 3D shape dataset around the above axis by the predetermined angle α.

For example, in a case where a 3D shape dataset (the third 3D shape dataset or the fourth 3D shape dataset) is imaged from each of the positive and negative directions of each of the x axis, the y axis, and the z axis while being rotated around the above axis by 90 degrees, 24 (6×4) images are generated. An example of generation of the first plurality of images and the second plurality of images will be described later with reference to FIG. 11.

The first identification unit 604 aligns the orientations of the first 3D shape dataset and the second 3D shape dataset based on a result of comparison between the first plurality of images and the second plurality of images, and thereby identifies the second portion in the second 3D shape dataset corresponding to the first portion in the first 3D shape dataset.

The orientations of the first 3D shape dataset and the second 3D shape dataset are aligned, for example, by aligning the orientations of the third 3D shape dataset (unit 3D shape dataset) and the fourth 3D shape dataset (unit 3D shape dataset). Methods (methods 1 to 3) for aligning the orientations of the third 3D shape dataset and the fourth 3D shape dataset based on a result of comparison between the first plurality of images and the second plurality of images will be described later.

The first identification unit 604 aligns the orientations of the third 3D shape dataset and the fourth 3D shape dataset, and identifies part-to-part correspondence relationships between the third 3D shape dataset and the fourth 3D shape dataset. For example, each part in each unit 3D shape dataset is an edge. Each edge is expressed by a vector in which a start point ($x_{start}$, $y_{start}$, $z_{start}$) and an end point ($x_{end}$, $y_{end}$, $z_{end}$) of a part in a three-dimensional space are included as elements.

In this case, for each edge in the third 3D shape dataset, the first identification unit 604 compares the vector of the above edge with the vector of each edge in the fourth 3D shape dataset to calculate the distance between the vectors. For each edge in the third 3D shape dataset, the first identification unit 604 identifies the edge whose calculated distance is the shortest among the edges in the fourth 3D shape dataset, as an edge corresponding to the above edge in the third 3D shape dataset.

Thus, the edge-to-edge correspondence relationship between the third 3D shape dataset and the fourth 3D shape dataset may be identified. The part-to-part correspondence relationships between the first 3D shape dataset and the third 3D shape dataset are made identifiable by, for example, associating the corresponding parts before and after the conversion with each other. The part-to-part correspondence relationships between the second 3D shape dataset and the fourth 3D shape dataset are made identifiable by, for example, associating the corresponding parts before and after the conversion with each other.

For this reason, the first identification unit 604 is capable of identifying the second portion in the second 3D shape dataset corresponding to the first portion in the first 3D shape dataset from the part-to-part correspondence relationships between the third 3D shape dataset and the fourth 3D shape dataset. For example, the first identification unit 604 determines the same locations in the 3D shape datasets before the conversion based on the part-to-part correspondence relationships between the third 3D shape dataset and the fourth 3D shape dataset.

If the first identification unit 604 is capable of aligning the orientations of the third 3D shape dataset and the fourth 3D shape dataset as described above, the first identification unit 604 is capable of identifying the second portion in the second 3D shape dataset corresponding to the first portion in the first 3D shape dataset. Description will be given of the methods (methods 1 to 3) for aligning the orientations of the third 3D shape dataset and the fourth 3D shape dataset based on a result of comparison between the first plurality of images and the second plurality of images.

First, description will be given of the method 1 for aligning the orientations of the third 3D shape dataset and the fourth 3D shape dataset based on a result of comparison between the first plurality of images and the second plurality of images.

The first identification unit 604 compares each of the first plurality of images with each of the second plurality of images, and calculates a similarity between the images. The similarity between the images is calculated based on feature values of the respective images, for example. The first identification unit 604 identifies correspondence relationships between images included in the first plurality of images and images included in the second plurality of images based on the calculated similarities between the images. The first identification unit 604 aligns the orientations of the third 3D shape dataset and the fourth 3D shape dataset based on the identified correspondence relationships.

In more detail, for example, the first identification unit 604 uses the first plurality of images (for example, 24 images) and the second plurality of images (for example, 24 images) to calculate the image similarities between the third 3D shape dataset and the fourth 3D shape dataset in a round-robin manner. The first identification unit 604 identifies three image pairs (faces) between which the calculated similarities are the first to third highest, and thereby acquires the information specifying the orientations of the third 3D shape dataset and the fourth 3D shape dataset.

Thus, the first identification unit 604 is capable of identifying the second portion in the second 3D shape dataset corresponding to the first portion in the first 3D shape dataset by aligning the orientations of the first 3D shape dataset and the second 3D shape dataset.

A specific example of the method 1 for aligning the orientations of the third 3D shape dataset and the fourth 3D shape dataset will be described later with reference to FIGS. 12 and 13.

Next, description will be given of the method 2 for aligning the orientations of the third 3D shape dataset and the fourth 3D shape dataset based on a result of comparison between the first plurality of images and the second plurality of images.

The first identification unit 604 selects a first reference image from the first plurality of images. The reference image is an image to serve as a reference for comparing the first plurality of images and the second plurality of images with each other in consideration of a disposition pattern of the images (faces) in the six-face view, and is, for example, the image having the greatest feature among the first plurality of images. An example of selection of the reference image will be described later with reference to FIG. 14.

Next, the first identification unit 604 identifies a second reference image from the second plurality of images based on a result of comparison between the selected first reference image and each of the second plurality of images. For example, the first identification unit 604 identifies, as the second reference image, an image having the highest similarity to the first reference image among the second plurality of images.

Next, the first identification unit 604 identifies, among the first plurality of images, a combination (referred to as a "first combination") of images of the third 3D shape dataset in the orientation where the first reference image is captured, the first combination of images captured from other respective directions different from the direction from which the first reference image is captured. For example, the first combination is a combination of images captured from the other respective directions adjacent to the direction from which the first reference image is captured.

As an example, when a direction from which the first reference image is captured is the negative direction of the x axis, the other directions adjacent to the above direction are at most four directions which are the positive and negative directions of the y axis and the positive and negative directions of the z axis. In more detail, for example, the first combination is a combination of images of the respective four faces adjacent to the face for the first reference image. However, the first combination may be an image of at least one face among the four faces adjacent to the face for the first reference image.

The first identification unit 604 identifies, among the second plurality of images, a combination (referred to as a "second combination") of images of the fourth 3D shape dataset in the orientation where the second reference image is captured, the second combination of images captured from other respective directions different from the direction from which the second reference image is captured. For example, the second combination is a combination of images captured from the other respective directions adjacent to the direction from which the second reference image is captured.

As an example, when a direction from which the second reference image is captured is the negative direction of the x axis, the other directions adjacent to the above direction are at most four directions which are the positive and negative directions of the y axis and the positive and negative directions of the z axis. In more detail, for example, the second combination is a combination of images of the respective four faces adjacent to the face for the second reference image. However, the second combination may be an image of at least one of the four faces adjacent to the face for the second reference image.

The first identification unit 604 aligns the orientations of the third 3D shape dataset and the fourth 3D shape dataset based on a result of comparison between the identified first combination of images and the identified second combination of images. As described above, in the method 2, the first identification unit 604 identifies, for example, the face (reference image) having the greatest feature, and then aligns the orientations of the third 3D shape dataset and the fourth 3D shape dataset with each other by using the four faces adjacent to the above face.

Thus, the first identification unit 604 is capable of identifying the second portion in the second 3D shape dataset corresponding to the first portion in the first 3D shape dataset by aligning the orientations of the first 3D shape dataset and the second 3D shape dataset.

A specific example of the method 2 for aligning the orientations of the third 3D shape dataset and the fourth 3D shape dataset will be described later with reference to FIGS. 14 and 15.

Next, description will be given of the method 3 for aligning the orientations of the third 3D shape dataset and the fourth 3D shape dataset based on a result of comparison between the first plurality of images and the second plurality of images.

The first identification unit 604 identifies, among the first plurality of images, a combination (hereafter, referred to as a "third combination") of images of the third 3D shape dataset captured from the both directions of the multiple axes while the third 3D shape dataset is fixed. The first identification unit 604 identifies, among the second plurality of images, a combination (hereafter referred to as a "fourth combination") of images of the fourth 3D shape dataset in each of orientations rotated around each of the multiple axes by the predetermined angle α, the fourth combination of images captured from both directions of the multiple axes.

The first identification unit 604 aligns the orientations of the third 3D shape dataset and the fourth 3D shape dataset based on a result of comparison between the identified third combination of images and the identified fourth combinations of images. For example, the first identification unit 604 simultaneously compares the six faces of the third 3D shape dataset with the six faces of the fourth 3D shape dataset and identifies a pattern with the highest comprehensive evaluation.

Thus, the first identification unit 604 is capable of identifying the second portion in the second 3D shape dataset corresponding to the first portion in the first 3D shape dataset by aligning the orientations of the first 3D shape dataset and the second 3D shape dataset.

A specific example of the method 3 for aligning the orientations of the third 3D shape dataset and the fourth 3D shape dataset will be described later with reference to FIG. 17.

The second identification unit 605 identifies the dimensional relationships among the different parts in the 3D shape datasets classified in a group based on the dimensions of the parts in the 3D shape datasets in the group. A part in a 3D shape dataset is a part of a designed object expressed by the 3D shape dataset, and is, for example, a part expressing a feature of the designed object such as an edge or a hole. Examples of the dimension of a part include the length of an edge, the diameter of a hole, and the like.

For example, the second identification unit 605 extracts the dimension of the first portion from the first 3D shape dataset. The second identification unit 605 extracts, from the second 3D shape dataset, the dimension of the second portion identified as corresponding to the first portion by the first identification unit 604. The first 3D shape dataset and the second 3D shape dataset are 3D shape datasets classified into the same group. For example, the first 3D shape dataset is a target 3D shape dataset. The second 3D shape dataset is each of 3D shape datasets other than the first 3D shape dataset in the group.

For example, the second identification unit 605 may create a dimension table 900 as illustrated in FIG. 9B to be described later by associating the extracted dimension of the first portion with the extracted dimension of the second portion. For example, in the dimension table 900, a value "5" of an edge in a 3D shape dataset DG1 is equivalent to the dimension of the first portion (part) in the first 3D shape dataset. A value "10" of an edge in a 3D shape dataset DG2 is equivalent to the dimension of the second portion (part) in the second 3D shape dataset.

The second identification unit 605 identifies the dimensional relationships among the different parts in the 3D shape datasets in the group based on the extracted dimension of the first portion and the extracted dimension of the second portion. In more detail, for example, the second identification unit 605 refers to the dimension table 900 as illustrated in FIG. 9B to be described later and creates a vector for each part in the 3D shape datasets in the group, the vector having, as elements, the dimensions of the part in the respective 3D shape datasets.

The second identification unit 605 uses any one of the multiple parts in the 3D shape datasets as an objective variable and other parts as explanatory variables to create a relational expression specifying a dimensional relationship among the different parts based on the created vectors for the respective parts. The dimensional relationship among different parts may be constructed by, for example, a method such as linear regression analysis, nonlinear regression analysis, or machine learning using a neural network.

The second identification unit 605 may set, as an objective variable, a part where the variance of the elements in the created vector is relatively high among the multiple parts in the 3D shape datasets. This makes it possible to construct relational expressions by excluding, from the objective variables, a part where the dimension is unchanged among the 3D shape datasets in the group. The second identification unit 605 may obtain a correlation coefficient between variables, and exclude a variable having a relatively low correlation.

The second identification unit 605 may set, as an explanatory variable, a part having a relatively high rate of contribution to the objective variable among the multiple parts in the 3D shape datasets. The rate of contribution (coefficient of determination) is a value indicating how much an explanatory variable may explain an objective variable. In more detail, for example, when constructing a relational expression, the second identification unit 605 selects a variable having a high rate of contribution to an objective variable as an explanatory variable by the stepwise method.

An example of construction of relational expressions specifying dimensional relationships among different parts in 3D shape datasets will be described with reference to FIGS. 9A and 9B.

Figure 9A:
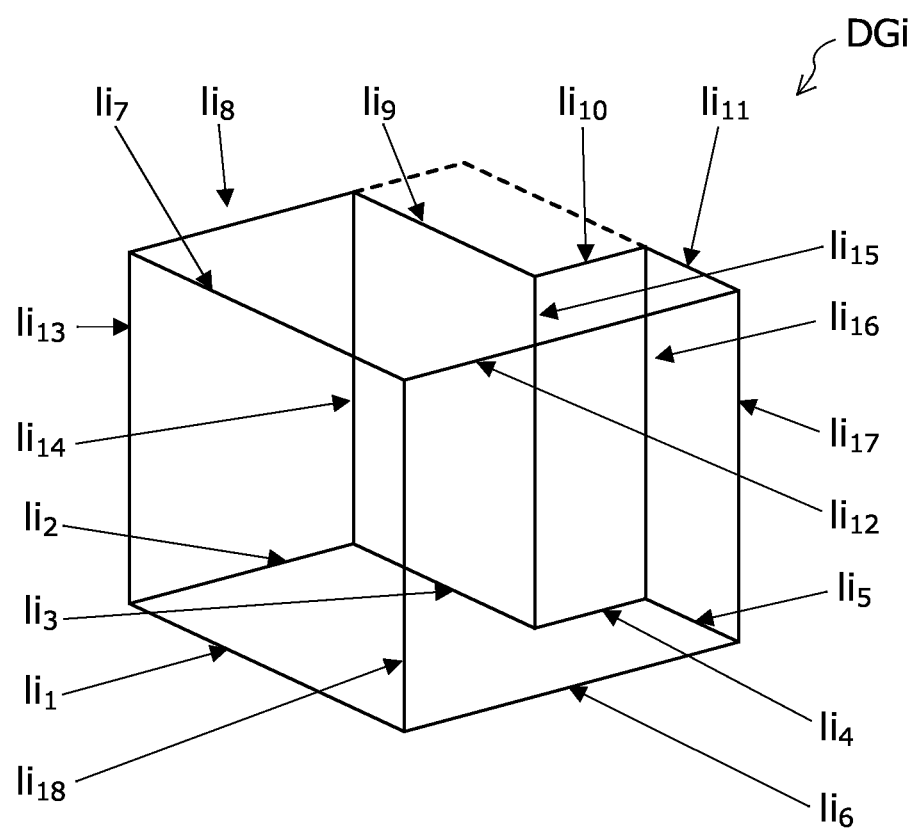
FIG. 9A is an explanatory diagram illustrating an example of a 3D shape dataset.

FIG. 9A is an explanatory diagram illustrating an example of a 3D shape dataset. FIG. 9B is an explanatory diagram illustrating an example of construction of relational expressions specifying dimensional relationships among parts. Here, 3D shape datasets classified into the same group Ga based on the unit 3D shape datasets are referred to as "3D shape datasets DG1 to DGM". M is the total number of the 3D shape datasets in the group Ga.

In FIG. 9A, a 3D shape dataset DGi is any of the 3D shape datasets DG1 to DGM (i=1, 2, ... , M). Reference sings Ii1 to Ii18 in the 3D shape dataset DGi denote edges (parts) in the 3D shape dataset DGi.

First, the second identification unit 605 aligns the orientations of unit 3D shape datasets of the 3D shape datasets DG1 to DGM classified into the group Ga by aligning the directions of the x axis, the y axis, and the z axis thereof. The second identification unit 605 aligns the orientations of the 3D shape datasets DG1 to DGM in the group Ga based on the unit 3D shape datasets whose orientations are aligned, thereby ensuring consistency of vertices identified as the same part or dimensions thereof to create the dimension table 900 of the parts (here, edges) as illustrated in FIG. 9B.

In FIG. 9B, the dimension table 900 specifies the dimensions of the edges $I_{i1}$ to $I_{iN}$ in the 3D shape datasets DG1 to DGM. Here, $I_{ij}$ denotes the j-th edge in the 3D shape dataset DGi. Then, N denotes the number of edges in the 3D shape dataset DGi. In the example of the 3D shape dataset DGi illustrated in FIG. 9A, N is "N=18".

Next, the second identification unit 605 refers to the created dimension table 900 to analyze the dimensional relationships among the edges by regression analysis or the like, and thereby derives relational expressions specifying the dimensional relationships among the edges. For example, for each edge in the 3D shape datasets DGi, the second identification unit 605 creates a column vector v (for example, v1, v2, . . . ) having, as elements, the dimensions of the concerned edge in the respective 3D shape datasets DG1 to DGM.

By using variables v [v1, v2, . . . , vN], the second identification unit 605 obtains relational expressions specifying the dimensional relationships among the edges. For example, the second identification unit 605 constructs a regression model by dividing the variables v into an objective variable y and explanatory variables x. For example, when a regression model is constructed by using vN as an objective variable y and the remaining variables as explanatory variables xk, the regression model is expressed by the following formula (7). Here, β0, β1, β2, . . . are regression parameters.

$$y = \beta_0 + \sum_{k=1}^{N-1} \beta_k x_k \quad (7)$$

In the case of the 3D shape datasets DGi illustrated in FIG. 9A, relational expressions (regression model) of the following formulas (8) to (12) are obtained. Here, since the upper face and the lower face have the same shape, the relationships of v7 to v12 are omitted herein.

$$v_1 = v_3 + v_5 \quad (8)$$

$$v_3 = \frac{3}{2} \cdot v_s \quad (9)$$

$$v_6 = v_2 + v_4 \quad (10)$$

$$v_2 = 2 \cdot v_4 \quad (11)$$

$$v_{13} = v_{14} = v_{15} = v_{16} = v_{17} = v_{18} \quad (12)$$

Thus, it is possible to generate a parametric model (the above formulas (8) to (12)) of the shapes (the 3D shape datasets DG1 to DGM) grouped based on the unit 3D shape datasets DGi" of the 3D shape datasets DGi.

Returning to the description of FIG. 6, the output unit 608 outputs information specifying the identified dimensional relationships among the parts in association with the unit shape datasets of the shape datasets classified into the group. Examples of an output method by the output unit 608 include storing the information in a storage device such as the memory 302 or the disk 304, transmitting the information to another computer via the communication I/F 305 (for example, the client apparatus 202 illustrated in FIG. 2), displaying the information on a not-illustrated display, and the like.

For example, the output unit 608 may store the information specifying the identified dimensional relationships among the parts in the storage unit 610 in association with the unit 3D shape datasets of the 3D shape datasets in the group. The information specifying the dimensional relationships among the parts is, for example, relational expressions like the above formulas (8) to (12).

In more detail, for example, the output unit 608 may store the unit 3D shape datasets of the 3D shape datasets in the group as the standard shape datasets in the standard shape DB 230 illustrated in FIG. 5 in association with the relational expressions specifying the identified dimensional relationships among the parts in the 3D shape datasets in the group. In this process, together with the information stored above, the output unit 608 may also store information with which the 3D shape datasets classified into the same group based on the standard shape datasets (unit 3D shape datasets) are identifiable, for example, a similar shape list, in the standard shape DB 230.

Thus, the unit 3D shape datasets and the parametric model (relational expressions) of the 3D shapes grouped based on the unit 3D shape datasets may be together accumulated as knowledge.

The creation unit 602 normalizes a designated target 3D shape dataset in each of the components in the coordinate axis directions to create a target unit 3D shape dataset.

By referring to the storage unit 610, the search unit 606 searches for a first unit 3D shape dataset similar to the created target unit 3D shape dataset. For example, the search unit 606 refers to the standard shape DB 230 to calculate the similarity between the target unit 3D shape dataset and each of the standard shape datasets. The search unit 606 searches for the standard shape dataset to which the calculated similarity is equal to or higher than a threshold.

The output unit 608 outputs the searched-out first unit 3D shape dataset and the information specifying the dimensional relationships among the different parts stored in association with the first unit 3D shape dataset in the storage unit 610. For example, the output unit 608 outputs the searched-out standard shape dataset and the relational expressions stored in association with the standard shape dataset in the standard shape DB 230.

The standard shape dataset and the relational expressions are output to, for example, the client apparatus 202. Thus, when making a new design, a designer may design a target object in accordance with the relational expressions (parametric relationship) based on the standard shape dataset.

The reception unit 601 receives designation of design requirements for a target object. A design requirement for the target object herein specifies a condition to be satisfied in the designing of the target object, and specifies, for example, a dimension of a specific part.

The generation unit 607 generates design data on the target object based on the searched-out first unit 3D shape dataset and the designated design requirements in accordance with the information specifying the dimensional relationships among the different parts stored in association with the first unit 3D shape dataset in the storage unit 610. In this case, the output unit 608 outputs the generated design data on the target object.

For example, the generation unit 607 generates the design data on the target object based on the searched-out standard shape dataset and the designated design requirements in accordance with the relational expressions stored in association with the above standard shape dataset in the standard shape DB 230.

Thus, for example, when a designer designates a dimension of a specific edge in the standard shape dataset, it is possible to automatically generate design data on a target object by automatically changing the dimensions of other edges having the dimensional relationships with the specific edge in accordance with the relational expressions. When a design requirement that violates the relational expressions is designated, an error is returned as a requirement violation, for example.

The storage unit 610 may store the 3D shape datasets in the group in association with the unit 3D shape datasets of the 3D shape datasets in the group. In this case, the output unit 608 may output the 3D shape datasets in the group stored in association with the searched-out first unit 3D shape dataset in the storage unit 610.

For example, first, the output unit 608 identifies the similar shape list stored in association with the searched-out standard shape dataset in the standard shape DB 230. Next, the output unit 608 extracts the 3D shape datasets with id included in the identified similar shape list from the 3D shape DB 220. The output unit 608 outputs the extracted 3D shape datasets.

Thus, when making a new design, for example, a designer may design a target object by using 3D shape datasets designed in the past and classified into the same group as the target based on the unit 3D shape datasets.

The output unit 608 may output the 3D shape datasets in the group and the information specifying the dimensional relationships among the different parts, which are stored in association with the searched-out first unit 3D shape dataset in the storage unit 610. For example, first, the output unit 608 identifies the similar shape list stored in association with the searched-out standard shape dataset in the standard shape DB 230.

Next, the output unit 608 extracts the 3D shape datasets with id included in the identified similar shape list from the 3D shape DB 220. The output unit 608 outputs the extracted 3D shape datasets and the relational expressions stored in association with the searched-out standard shape dataset in the standard shape DB 230.

Thus, when making a new design, a designer may design a target object in accordance with the relational expressions (parametric relationship) based on the 3D shape datasets designed in the past. For example, when a designer designates a dimension of a certain edge in a 3D shape dataset designed in the past, it is possible to automatically generate design data on a target object by automatically changing the dimensions of other edges having the dimensional relationships with the certain edge in accordance with the relational expressions.

Although the unit 3D shape dataset of each of the 3D shape datasets classified into the same group is stored in the standard shape DB 230 in the above description, the configuration is not limited thereto. For example, in the standard shape DB 230, only the unit 3D shape dataset of any one of the 3D shape datasets classified into the same group may be registered as the standard shape dataset.

Figure 10:
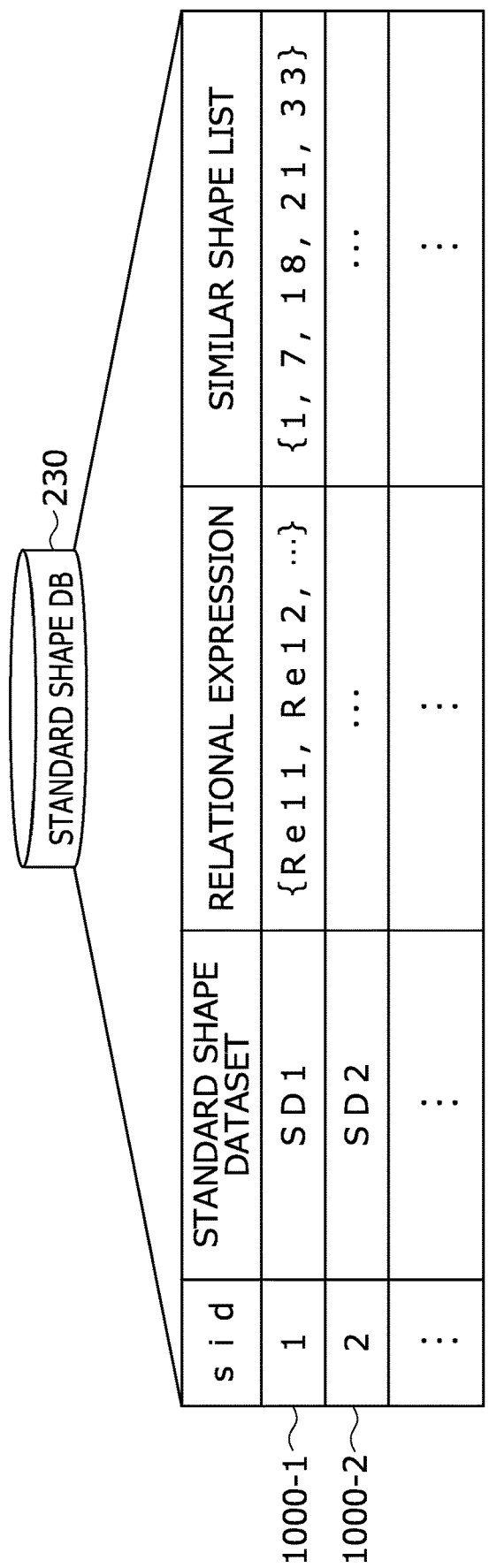
FIG. 10 is an explanatory diagram illustrating an example of information stored in the standard shape DB (part 2)

With reference to FIG. 10, description will be given of information stored in the standard shape DB 230 in a case where only the unit 3D shape dataset of any one of the 3D shape datasets classified into the same group is registered as the standard shape dataset.

FIG. 10 is an explanatory diagram illustrating an example of information stored in the standard shape DB 230 (part 2).

In FIG. 10, the standard shape DB 230 has fields named sid, standard shape dataset, relational expression, and similar shape list, and stores standard shape management information (for example, standard shape management information 1000-1 and 1000-2) as records by setting information in these field.

sid is an identifier for uniquely identifying a standard shape dataset. The standard shape dataset is a unit 3D shape dataset registered as a standard shape dataset. The standard shape dataset is the unit 3D shape dataset of any of the 3D shape datasets classified into the same group based on the unit 3D shape datasets.

The relational expression is a mathematical expression specifying a dimensional relationship among different parts in the 3D shape dataset based on which the standard shape dataset (unit 3D shape dataset) is created. The similar shape list is a list of sid of the 3D shape datasets classified into the same group based on the standard shape dataset (unit 3D shape dataset).

For example, the standard shape management information 1000-1 specifies a standard shape dataset SDI with sid "1", relational expressions {Re11, Re12, . . . }, and a similar shape list {1, 7, 18, 21, 33}. When only the unit 3D shape dataset of any of the 3D shape datasets classified into the same group is registered as the standard shape dataset as described above, it is possible to reduce a storage amount in the standard shape DB 230 as compared with the case illustrated in FIG. 5.

(Example of Generation of First Plurality of Images and Second Plurality of Images)

Next, an example of generation of a first plurality of images and a second plurality of images will be described with reference to FIG. 11. Here, an example of generation of a first plurality of images will be described by taking the third 3D shape dataset (unit 3D shape dataset) as an example. The predetermined angle $\alpha$ is set to "$\alpha$=90 [degrees]".

Figure 11:
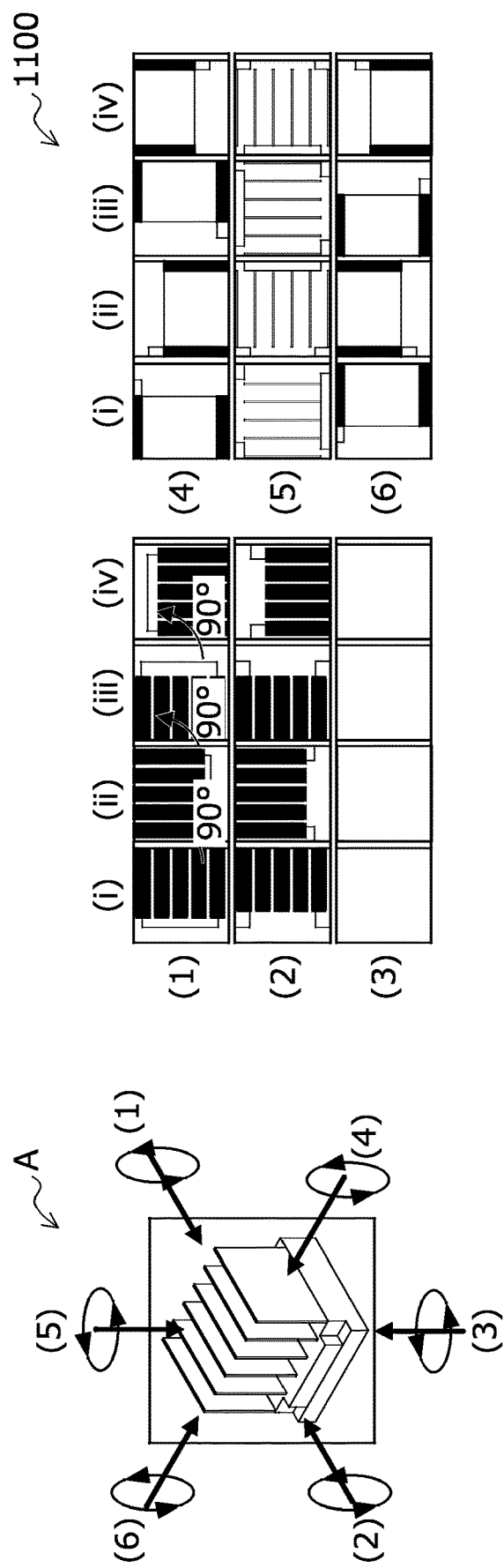
FIG. 11 is an explanatory diagram illustrating an example of generation of a first plurality of images.

FIG. 11 is an explanatory diagram illustrating an example of generation of a first plurality of images. In FIG. 11, a unit 3D shape dataset A is an example of the third 3D shape dataset (unit 3D shape dataset). The first identification unit 604 generates images of the unit 3D shape dataset A captured from each direction of each of the x, y, and z axes among both directions (positive and negative directions) (1) to (6) of the x, y, and z axes with the unit 3D shape dataset A rotated around the above axis by 90 degrees.

As a result, 2D images (4 images) rotated by 90 degrees are generated for each face, and 24 2D images (4 images×6 faces) in total are generated as a first plurality of images 1100, for example. The direction (1) denotes the positive direction of the x axis. The direction (2) denotes the negative direction of the x axis. The direction (3) denotes the negative direction of the z axis. The direction (4) denotes the positive direction of the y axis. The direction (5) denotes the positive direction of the z axis. The direction (6) denotes the negative direction of the y axis.

For example, an image (1)-(i) illustrates an image of the unit 3D shape dataset A in the initial state captured from the direction (1). An image (1)-(ii) illustrates an image of the unit 3D shape dataset A captured from the direction (1) with the unit 3D shape dataset A rotated around the x axis by 90 degrees. An image (1)-(iii) illustrates an image of the unit 3D shape dataset A captured from the direction (1) with the unit 3D shape dataset A further rotated around the x axis by 90 degrees. An image (1)-(iv) illustrates an image of the unit 3D shape dataset A captured from the direction (1) with the unit 3D shape dataset A further rotated around the x axis by 90 degrees.

Figure 12:
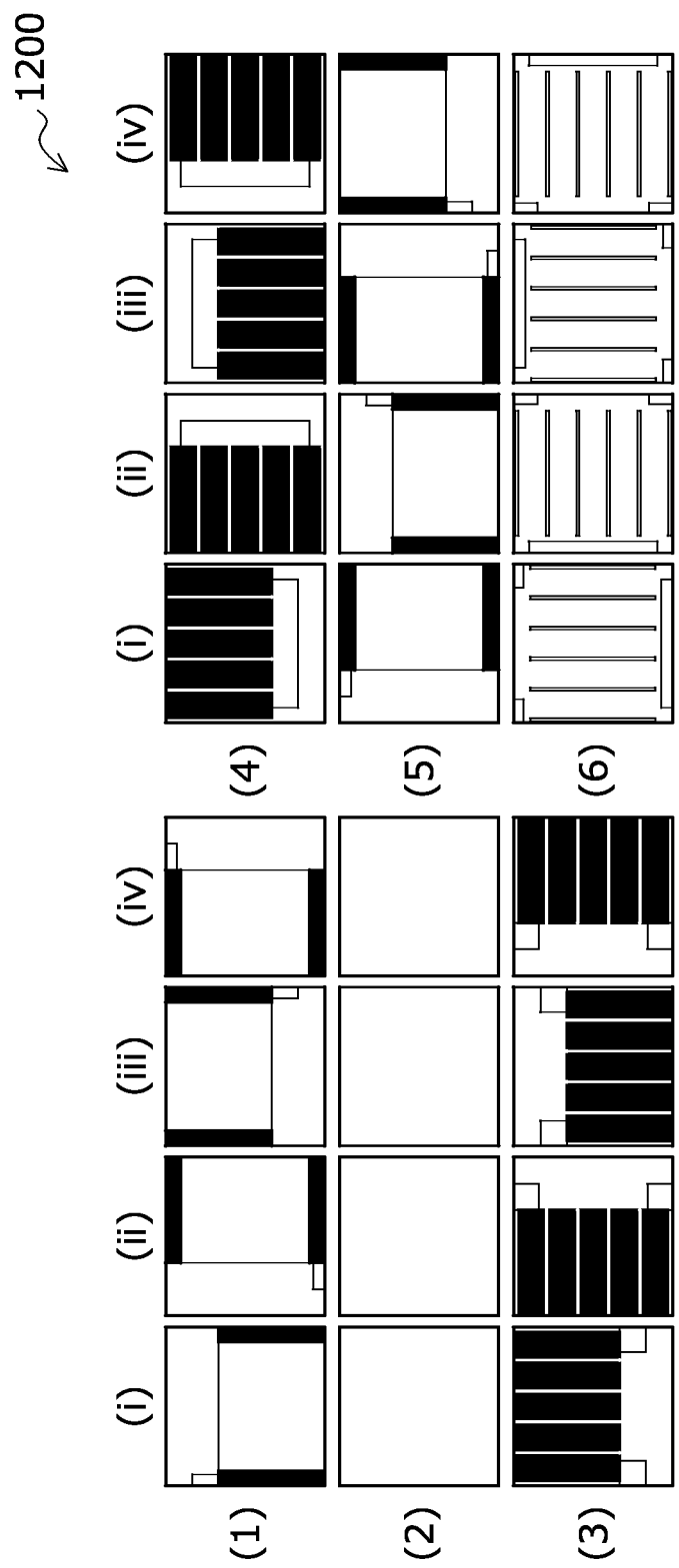
FIG. 12 is an explanatory diagram illustrating a specific example of a second plurality of images.

Here, although the example of generation of the first plurality of images is described by taking the third 3D shape dataset (unit 3D shape dataset) as an example, a second plurality of images as illustrated in FIG. 12 to be described later are also generated for the fourth 3D shape dataset (unit 3D shape dataset) in the same manner.

(Specific Example of Method 1 for Aligning Orientations of Unit 3D Shape Datasets)

Next, a specific example of the method 1 for aligning the orientations of the third 3D shape dataset and the fourth 3D shape dataset based on a result of comparison between the first plurality of images and the second plurality of images will be described with reference to FIGS. 12 and 13. First, a specific example of the second plurality of images will be described. The first plurality of images are the first plurality of images 1100 illustrated in FIG. 11. In the following description, an example of the fourth 3D shape dataset (unit 3D shape dataset) may be referred to as a "unit 3D shape dataset B".

FIG. 12 is an explanatory diagram illustrating a specific example of a second plurality of images. In FIG. 12, a second plurality of images 1200 include images of the unit 3D shape dataset B captured from each direction of each of the x, y, and z axes among both directions (positive and negative directions) (1) to (6) of the x, y, and z axes with the unit 3D shape dataset B rotated by 90 degrees around the above axis.

Figure 13:
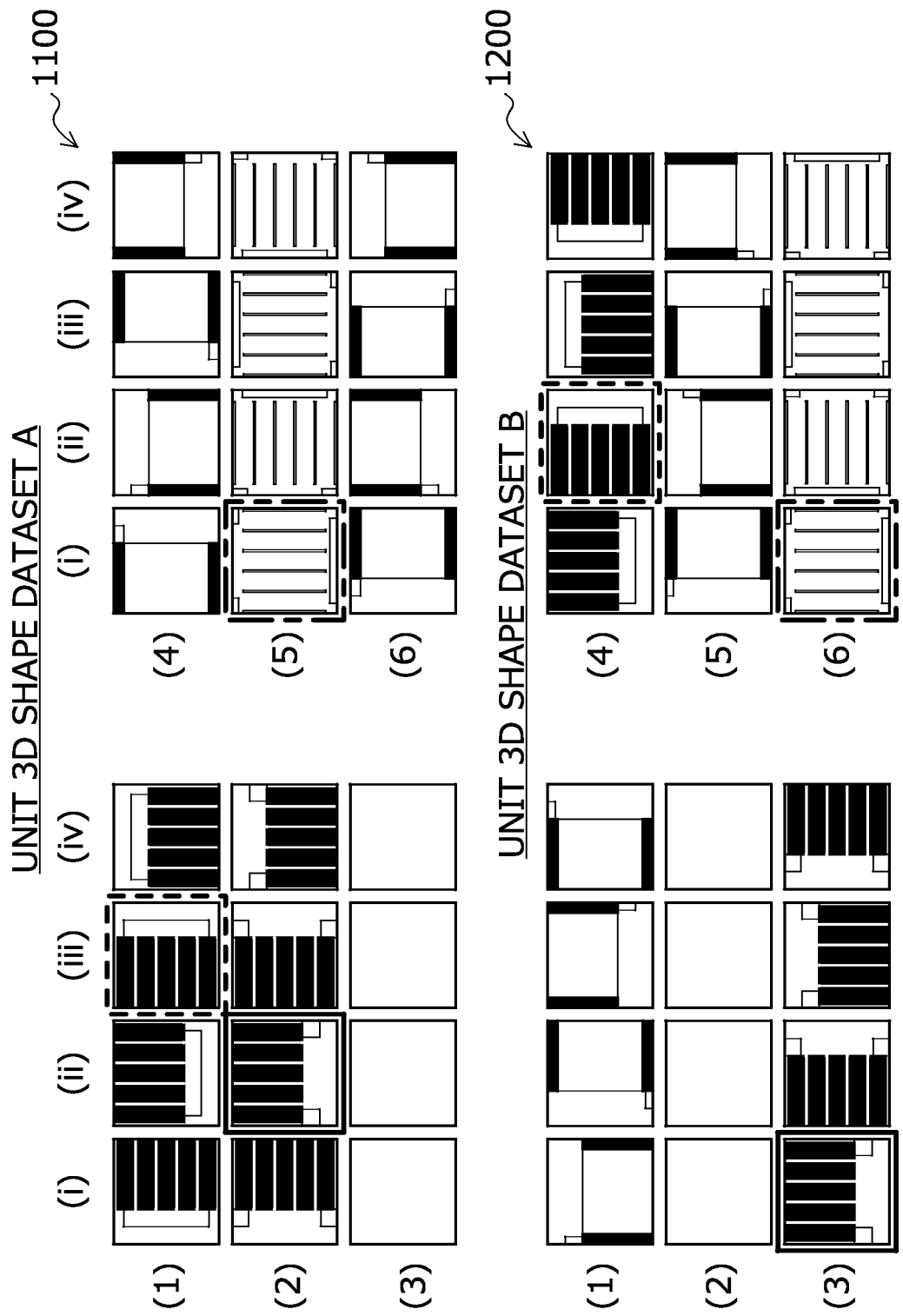
FIG. 13 is an explanatory diagram illustrating a first processing example of aligning the orientations of unit 3D shape datasets.

FIG. 13 is an explanatory diagram illustrating a first processing example of aligning the orientations of unit 3D shape datasets. In FIG. 13, the first identification unit 604 compares each of the first plurality of images 1100 with each of the second plurality of images 1200, and calculates a similarity between the images. For example, the first identification unit 604 calculates a similarity of a feature value of an image A (1)-(i) to a feature value of each of images B (1)-(i), B (1)-(ii), . . . , B (2)-(i), B (2)-(ii), B (6)-(iii), and B (6)-(iv).

For example, the image A (1)-(i) illustrates the image of the unit 3D shape dataset A in the initial state captured from the direction (1). For example, the image B (1)-(i) illustrates an image of the unit 3D shape dataset B in the initial state captured from the direction (1).

The first identification unit 604 calculates the similarity of a feature value of an image A (1)-(ii) to the feature value of each of the images B (1)-(i), B (1)-(ii), . . . , B (2)-(i), B (2)-(ii), . . . , B (6)-(iii), and B (6)-(iv).

The first identification unit 604 calculates the similarity of a feature value of an image A (1)-(iii) to the feature value of each of the images B (1)-(i), B (1)-(ii), . . . , B (2)-(i), B (2)-(ii), . . . , B (6)-(iii), and B (6)-(iv).

The first identification unit 604 calculates the similarity of a feature value of an image A (1)-(iv) to the feature value of each of the images B (1)-(i), B (1)-(ii), . . . , B (2)-(i), B (2)-(ii), . . . , B (6)-(iii), and B (6)-(iv).

As a result, it is possible to calculate the similarity of the image A (1)-(i) included in the first plurality of images 1100 to each of the images included in the second plurality of images 1200, Similarly, the first identification unit 604 calculates the similarity of each of the other images included in the first plurality of images 1100 to each of the images included in the second plurality of images 1200.

The first identification unit 604 identifies an image pair (faces) having the highest similarity based on the calculated similarities between the images. Here, it is assumed that an image pair 1 of the image A (2)-(iv) and the image B (3)-(I) is identified as the image pair having the highest similarity. In this case, from the identified image pair 1, the first identification unit 604 determines that the face in the direction (2) of the unit 3D shape dataset A rotated around the x axis by 270 degrees from the initial state matches the face in the direction (3) of the unit 3D shape dataset B in the initial state.

Then, the first identification unit 604 identifies an image pair (faces) having the second highest similarity based on the calculated similarities between the images. In this identification, the first identification unit 604 excludes the images of the unit 3D shape dataset A captured from the direction (2) and the images of the unit 3D shape dataset B captured from the direction (3). Here, it is assumed that an image pair 2 of the image A (1)-(iii) and the image B (4)-(ii) is identified as the image pair having the second highest similarity.

In this case, from the identified image pair 2, the first identification unit 604 determines that the face in the direction (1) of the unit 3D shape dataset A rotated around the x axis by 180 degrees from the initial state matches the face in the direction (4) of the unit 3D shape dataset B rotated around the y axis by 90 degrees from the initial state.

Next, the first identification unit 604 identifies an image pair (faces) having the third highest similarity based on the calculated similarities between the images. In this identification, the first identification unit 604 excludes the images of the unit 3D shape dataset A captured from the directions (1) and (2) and the images of the unit 3D shape dataset B captured from the directions (3) and (4). Here, it is assumed that an image pair 3 of the image A (5)-(i) and the image B (6)-(i) is identified as the image pair having the third highest similarity.

In this case, from the identified image pair 3, the first identification unit 604 determines that the face in the direction (5) of the unit 3D shape dataset A in the initial state matches the face in the direction (6) of the unit 3D shape dataset B in the initial state.

The first identification unit 604 aligns the orientations of the unit 3D shape dataset A and the unit 3D shape dataset B with each other based on the identified image pairs 1 to 3. For example, the first identification unit 604 aligns the orientation of the face in the direction (2) of the unit 3D shape dataset A with the orientation of the face in the direction (3) of the unit 3D shape dataset B. The first identification unit 604 aligns the orientation of the face in the direction (1) of the unit 3D shape dataset A with the orientation of the face in the direction (4) of the unit 3D shape dataset B. The first identification unit 604 aligns the orientation of the face in the direction (5) of the unit 3D shape dataset A with the orientation of the face in the direction (6) of the unit 3D shape dataset B.

Thus, it is possible to align the orientations of the unit 3D shape dataset A and the unit 3D shape dataset B. As a result, it is possible to align the orientations of the first 3D shape dataset based on which the unit 3D shape dataset A is created and the second 3D shape dataset based on which the unit 3D shape dataset B is created.

(Specific Example of Method 2 for Aligning Orientations of Unit D Shape Datasets)

Next, a specific example of the method 2 for aligning the orientations of the third 3D shape dataset and the fourth 3D shape dataset will be described with reference to FIGS. 14 and 15. Here, the third 3D shape dataset is referred to as a "unit 3D shape dataset A", and the first plurality of images are referred to as a "first plurality of images 1100". The fourth 3D shape dataset is referred to as a "unit 3D shape dataset B", and the second plurality of images are referred to as a "second plurality of images 1200".

In the method 1, three faces are independently selected. For this reason, in a case where there are faces having similar features, the alignment of the orientations of the unit 3D shape datasets A and B based on the three identified faces may result in an incorrect alignment of the orientations. In the method 2, a characteristic face is identified from each of the unit 3D shape datasets A and B, and then the orientations of the unit 3D shape datasets A and B are aligned by using four faces adjacent to the characteristic face.

Figure 14:
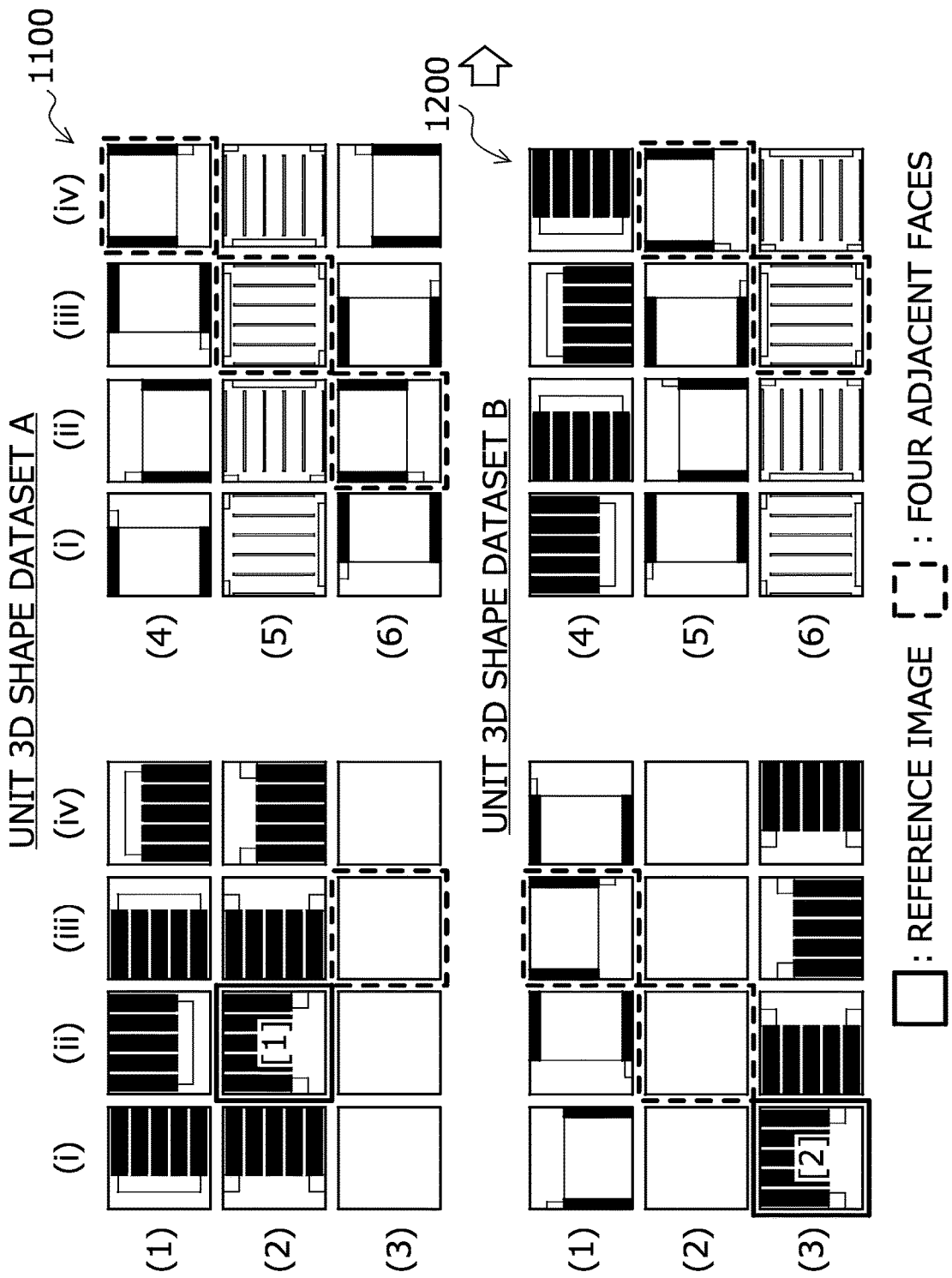
FIG. 14 is an explanatory diagram illustrating a second processing example of aligning the orientations of unit 3D shape datasets (part 1)
Figure 15:
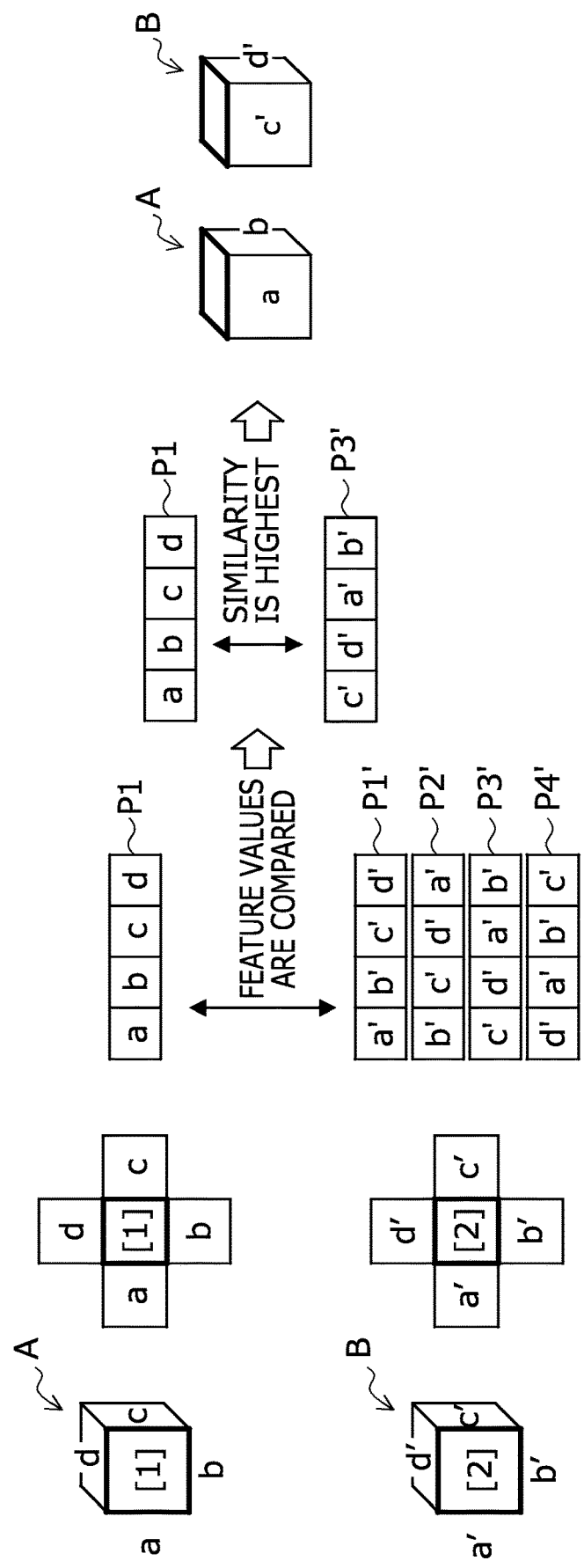
FIG. 15 is an explanatory diagram illustrating the second processing example of aligning the orientations of the unit 3D shape datasets (part 2)

FIGS. 14 and 15 are explanatory diagrams illustrating a second processing example of aligning the orientations of unit 3D shape datasets. FIG. 14 illustrates the first plurality of images 1100 and the second plurality of images 1200. The first plurality of images 1100 include images of the unit 3D shape dataset A captured from each direction of each of the x, y, and z axes among both directions (positive and negative directions) (1) to (6) of the x, y, and z axes with the unit 3D shape dataset A rotated around the above axis by 90 degrees. The second plurality of images 1200 include images of the unit 3D shape dataset B captured from each direction of each of the x, y, and z axes among both directions (positive and negative directions) (1) to (6) of the x, y, and z axes with the unit 3D shape dataset B rotated around the above axis by 90 degrees.

First, the first identification unit 604 selects a first reference image from the first plurality of images 1100. For example, the first identification unit 604 expresses a feature value F of the unit 3D shape dataset A by using the following formula (13). The number of columns is equal to the number n of feature values per face. The number of rows is equal to the number of images (4×6 faces) included in the first plurality of images 1100.

$$F = \begin{bmatrix} a_{(1)(i)\_1} & \cdots & a_{(1)(i)\_n} \\ \vdots & \ddots & \vdots \\ a_{(6)(iv)\_1} & \cdots & a_{(6)(iv)\_n} \end{bmatrix} \tag{13}$$

In the above formula (13), for example, $a_{(1)(i)\_1}$ denotes a value of a feature value a1 in the image A (1)-(i), $a_{(1)(i)\_n}$ denotes a value of a feature value an in the image A (1)-(i), $a_{(6)(iv)\_1}$ denotes a value of the feature value a1 in the image A (6)-(iv), and $a_{(6)(iv)\_n}$ denotes a value of the feature value an in the image A (6)-(iv).

Next, the first identification unit 604 calculates an average feature value (center of gravity) of the unit 3D shape dataset A (third 3D shape dataset) by using the following formula (14).

$$F_{ave} = \text{average } F = [a_{ave\ \#1}, \ldots, a_{ave\ \#n}] \tag{14}$$

In the above formula (14), for example, $a_{ave\ \#1}$ is an average value of the feature value a1, and indicates an average value of $a_{(1)(i)\#1}$ to $a_{(6)(iv)\_1}$ in the feature value F of the unit 3D shape dataset A. $a_{ave\ \#n}$ is an average value of the feature value an, and indicates an average value of $a_{(1)(i)\_n}$ to $a_{(6)(iv)\_n}$ in the feature value F of the unit 3D shape dataset A.

The first identification unit 604 calculates a distance $d_{hk}$ between the feature value of each face (image) in the feature value F and the average F by using the following formula (15). Here, h is "h=1, 2, . . . , 6" and k is (i), (ii), (iii), and (iv).

$$d_{hk} = //([a_{h(k)\#1}, \ldots, a_{h(k)\#n}] - [a_{ave\ \#1}, \ldots, a_{ave\ \#n}])// \tag{15}$$

In the above formula (15), $[a_{h(k)\#1}, \ldots, a_{ave\ \#n}]$ denotes the feature value of a k-th rotated image of a face h, and $[a_{av(k)\#1}, \ldots, a_{ave\ \#n}]$ denotes an average feature value (center of gravity) of the unit 3D shape dataset A (third 3D shape dataset).

The first identification unit 604 selects an image having the greatest feature among the first plurality of images 1100 as the first reference image by using the following formula (16).

$$\max([d_{1(i)}, d_{(ii)}, \ldots, d_{6(iv)}]) \tag{16}$$

Here, it is assumed that the image A (2)-(iv) is selected as the first reference image [1] among the first plurality of images 1100.

The first identification unit 604 identifies a second reference image from the second plurality of images 1200 based on a result of comparison between the selected first reference image [1] and each of the second plurality of images 1200. For example, the first identification unit 604 identifies, as the second reference image, an image having the highest similarity to the first reference image [1] among the second plurality of images 1200. Here, it is assumed that the image B (3)-(i) is identified as the second reference image [2] among the second plurality of images 1200.

Next, the first identification unit 604 identifies, among the first plurality of images 1100, a first combination of images of the unit 3D shape dataset A, in the orientation where the first reference image [1] is captured, captured from the other respective directions adjacent to the direction from which the first reference image [1] is captured. The first combination is a combination of images of the respective four faces adjacent to the face for the first reference image [1].

Here, it is assumed that a combination of images a, b, c, and d of the respective four faces adjacent to the face for the first reference image [1] is identified as the first combination among the first plurality of images 1100.

The first identification unit 604 identifies, among the second plurality of images 1200, a second combination of images of the unit 3D shape dataset B, in the orientation where the second reference image [2] is captured, captured from the other respective directions adjacent to the direction from which the second reference image [2] is captured. The second combination is a combination of images of the respective four faces adjacent to the face for the second reference image [2].

Here, it is assumed that a combination of images a', b', c', and d' of the respective four faces adjacent to the face for the second reference image [2] is identified as the second combination among the second plurality of images 1200.

In FIG. 15, the first identification unit 604 aligns the orientations of the unit 3D shape datasets A and B based on a result of comparison between the identified first combination of images and the identified second combination of images. For example, the first identification unit 604 determines four pairs of corresponding faces in the unit 3D shape datasets A and B based on a result of comparison between the identified first combination of images and the identified second combination of images.

In more detail, for example, the first identification unit 604 fixes a disposition pattern of the four adjacent faces of the first reference image W. An example in FIG. 15 assumes that a disposition pattern P1 of the images a, b, c, and d of the four adjacent faces of the first reference image [1] is fixed to "a, b, c, d".

Next, the first identification unit 604 specifies disposition pattern candidates for the four adjacent faces of the second reference image [2]. In the example of FIG. 15, "a', b', c', d'", "b', c', d', a'", "c', d', a', b'", and "d', a', b', c'" are specified as disposition pattern candidates P1' to P4' of the images a', b', c', and d' of the four adjacent faces of the second reference image [2].

The first identification unit 604 compares the disposition pattern P1 of the four adjacent faces of the first reference image [1] with each of the disposition pattern candidates P1" to P4° of the four adjacent faces of the second reference image [2], and identifies the disposition pattern candidate having the highest similarity to the disposition pattern P1. Here, it is assumed that the disposition pattern candidate P3' is identified as the disposition pattern candidate having the highest similarity to the disposition pattern P1.

In this case, the first identification unit 604 aligns the orientations of the unit 3D shape datasets A and B by, for example, adjusting the orientation of the unit 3D shape dataset B such that the corresponding faces in the disposition pattern P1 and the disposition pattern candidate P3' are oriented in the same direction. Here, the images a, b, c, and d (four faces) of the unit 3D shape dataset A correspond to the images c', d', a', and b' (four faces) of the unit 3D shape dataset B, respectively.

As methods for determining four pairs of corresponding faces in the unit 3D shape datasets A and B, for example, there are the following determination methods 1 and 2.

First, the determination method 1 will be described.

The first identification unit 604 calculates the similarity of the image a in the unit 3D shape dataset A to each of the images a', b', c', and d' in the unit 3D shape dataset B. As each image a', b', c', or d', there are four images (i) to (iv) each rotated by 90 degrees. The first identification unit 604 identifies the image having the highest calculated similarity as an image corresponding to the image a. Here, it is assumed that the image c'-(i) is identified as the image corresponding to the image a.

Next, the first identification unit 604 calculates the similarity of the image b in the unit 3D shape dataset A to each of the images a', b', and d' in the unit 3D shape dataset B. As each image a', b', or d', there are four images (i) to (iv) each rotated by 90 degrees. The first identification unit 604 identifies the image having the highest calculated similarity as an image corresponding to the image b. Here, it is assumed that the image d'-(i) is identified as the image corresponding to the image b.

Next, the first identification unit 604 calculates the similarity of the image c in the unit 3D shape dataset A to each of the images a' and b' in the unit 3D shape dataset B. As each image a' or b', there are four images (i) to (iv) each rotated by 90 degrees. The first identification unit 604 identifies the image having the highest calculated similarity as an image corresponding to the image c. Here, it is assumed that the image a'-(i) is identified as the image corresponding to the image c.

Next, the first identification unit 604 calculates the similarity of the image d in the unit 3D shape dataset A to each image b' in the unit 3D shape dataset B. As each image b', there are four images (i) to (iv) each rotated by 90 degrees. The first identification unit 604 identifies the image having the highest calculated similarity as an image corresponding to the image d. Here, it is assumed that the image b'-(i) is identified as the image corresponding to the image d.

In this case, the first identification unit 604 determines that the images a, b, c, and d in the unit 3D shape dataset A respectively correspond to the image c'-(i), d'-(i), a'-(i), and b'-(i) in the unit 3D shape dataset B. The first identification unit 604 determines that the faces for the respective images a, b, c, and d in the unit 3D shape dataset A respectively correspond to the faces for the respective images c', d', a', and b' in the unit 3D shape dataset B.

In the determination method 1, the first identification unit 604 calculates the image similarities of the four faces adjacent to the reference face (first reference image) of the unit 3D shape dataset A to the four faces adjacent to the reference face (second reference image) of the unit 3D shape dataset B in a round-robin manner one after another, based on the feature values of the respective images of the concerned unit 3D shape dataset A or B, as described above. The first identification unit 604 determines the four pairs of corresponding faces in the unit 3D shape datasets A and B by identifying each pair of the faces having the highest similarity one after another.

Next, the determination method 2 will be described.

In the determination method 2, the first identification unit 604 expresses a disposition pattern of the four faces adjacent to the reference face of each of the unit 3D shape datasets A and B based on the feature values of the respective images of the concerned unit 3D shape dataset A or B by using a feature vector of the images. The first identification unit 604 compares the feature vectors expressing the disposition patterns between the unit 3D shape datasets A and B, identifies the disposition patterns having the shortest distance therebetween, and determines the four pairs of corresponding faces in the unit 3D shape datasets A and B.

For example, the first identification unit 604 calculates a feature vector Vec_A expressing a disposition pattern P1 of the four adjacent faces of the first reference image [1] based on the feature values of the respective images of the unit 3D shape dataset A. The feature vector Vec_A is expressed by, for example, "Vec_A=(the feature value of the image a, the feature value of the image b, the feature value of the image c, the feature value of the image d)".

The first identification unit 604 calculates feature vectors Vec_B1 to B4 expressing disposition pattern candidates P1' to P4' of the four adjacent faces of the second reference image [2] based on the feature values of the respective images of the unit 3D shape dataset B. The feature vector Vec_B1 is expressed by, for example, "Vec_B1=(the feature value of the image a', the feature value of the image b', the feature value of the image c', the feature value of the image d')".

The feature vector Vec_B2 is expressed, for example, "Vec_B2=(the feature value of the image b', the feature value of the image c', the feature value of the image d', the feature value of the image a')". The feature vector Vec_B3 is expressed, for example, by "Vec_B3=(the feature value of the image c', the feature value of the image d', the feature value of the image a', the feature value of the image b')". The feature vector Vec_B4 is expressed by, for example, "Vec_B4=(the feature value of the image d', the feature value of the image a', the feature value of the image b', the feature value of the image c')".

The first identification unit 604 calculates a distance between the feature vector Vec_A and each of the feature vectors Vec_B1 to B4, The distance between the feature vectors corresponds to a similarity between the four adjacent faces and the four adjacent faces. Next, the first identification unit 604 identifies the feature vector $Vec\_B_{min}$ having the shortest calculated distance among the feature vectors Vec_B1 to B4. The first identification unit 604 determines the four pairs of corresponding faces in the unit 3D shape datasets A and B based on the identified feature vector $Vec\_B_{min}$.

As an example, the feature vector $Vec\_B_{min}$ is assumed to be the "feature vector Vec_B1". In this case, the first identification unit 604 determines that the faces for the respective images a, b, c, and d of the unit 3D shape dataset A respectively correspond to the faces for the respective images a', b', c', and d' of the unit 3D shape dataset B.

As described above, the first identification unit 604 is capable of aligning the orientations of the unit 3D shape dataset A and the unit 3D shape dataset B by identifying the correspondence relationship between the four adjacent faces adjacent to the reference face in the unit 3D shape dataset A and the four adjacent faces adjacent to the reference face in the unit 3D shape dataset B.

The first identification unit 604 may determine whether or not the similarity between the four faces in the unit 3D shape dataset A and the corresponding four faces in the unit 3D shape dataset B is equal to or higher than a threshold. The threshold may be arbitrarily set. When the similarity between the four faces and the four faces is equal to or higher than the threshold, the first identification unit 604 may align the orientations of the unit 3D shape datasets A and B based on the correspondence relationship between the reference face and the four adjacent faces in the unit 3D shape dataset A and the reference face and the four adjacent faces in the unit 3D shape dataset B.

On the other hand, when the similarity between the four faces and the four faces is lower than the threshold, the first identification unit 604 may reselect the first reference image from the first plurality of images 1100. In this case, for example, the first identification unit 604 reselects the first reference image, and repeats the same processing until the similarity between the four faces in the unit 3D shape dataset A and the corresponding four faces in the unit 3D shape dataset B becomes equal to or higher than the threshold.

There may be a case where, even though all the images included in the first plurality of images 1100 are selected as the first reference image, the similarity between the four faces in the unit 3D shape dataset A and the corresponding four faces in the unit 3D shape dataset B is not equal to or higher than the threshold. In this case, the first identification unit 604 may set two adjacent faces (including the first reference image) in the six-face view as one block and perform the same processing.

Figure 16:
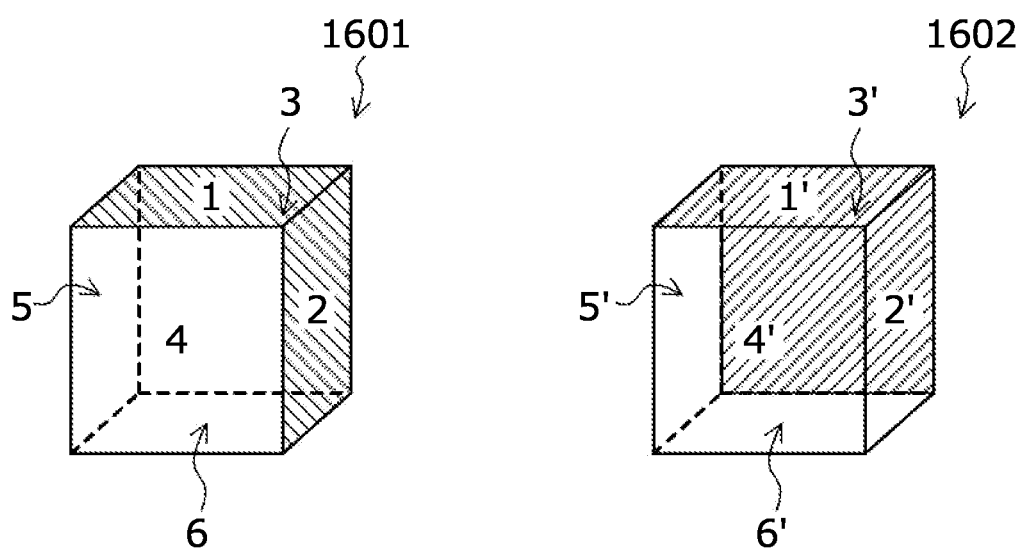
FIG. 16 is an explanatory diagram illustrating a processing example in a case where two adjacent faces are set as one block.

With reference to FIG. 16, description will be given of a case where two adjacent faces in the six-face views are set as one block (a reference face), and corresponding faces in the unit 3D shape datasets A and B are identified.

FIG. 16 is an explanatory diagram illustrating a processing example in a case where two adjacent faces are set as one block. In FIG. 16, a development diagram 1601 illustrates a certain six-face view (faces 1 to 6) of the unit 3D shape dataset A. A development diagram 1602 illustrates a certain six-face view (faces 1' to 6') of the unit 3D shape dataset B.

In the six-face view (faces 1 to 6) of the unit 3D shape dataset A, adjacent faces 1 and 2 (upper face and right face) are set as one block. In this case, the first identification unit 604 identifies two adjacent faces most similar to the two adjacent faces (two reference faces 1 and 2) in the unit 3D shape dataset A from the six-face view (faces 1' to 6') of the unit 3D shape dataset B.

Here, it is assumed that the faces 1' and 3' (upper face and back face) in the unit 3D shape dataset B are identified as two adjacent faces most similar to the two reference faces 1 and 2 of the unit 3D shape dataset A and therefore are determined as two reference faces of the unit 3D shape dataset B. In this case, the first identification unit 604 specifies the face 3 adjacent to the two reference faces 1 and 2 in the unit 3D shape dataset A. Then, the first identification unit 604 identifies, among the faces 2' and 5' adjacent to the two reference faces 1' and 3' in the unit 3D shape dataset B, the face having a higher similarity to the face 3 as a face corresponding to the face 3.

Here, it is assumed that the face 5' is identified as the face corresponding to the face 3. The first identification unit 604 calculates the similarity of the three faces 1, 2, and 3 in the unit 3D shape dataset A to the three faces 1', 3', and 5' in the unit 3D shape dataset B. When the similarity is equal to or higher than a threshold, the first identification unit 604 aligns the orientations of the unit 3D shape datasets A and B based on the correspondence relationship between the three faces 1, 2, and 3 in the unit 3D shape dataset A and the three faces 1', 3', and 5' in the unit 3D shape dataset B.

On the other hand, when the similarity is lower than the threshold, the first identification unit 604 changes the face adjacent to the two reference faces 1 and 2 in the unit 3D shape dataset A to the face 4, and identifies a face corresponding to the face 4 from the faces 2' and 5' adjacent to the two reference faces 1' and 3' in the unit 3D shape dataset B. The first identification unit 604 calculates the similarity between the three faces and the three faces and compares the calculated similarity with the threshold in the same manner.

When any of the similarities between the three faces and the three faces is not equal to or higher than the threshold, the first identification unit 604 may change the two adjacent faces to other two adjacent faces (including the first reference image) in the six-face view (faces 1 to 6) in the unit 3D shape dataset A and perform the same processing.

There is also a case where for any two adjacent faces in the six-face view (faces 1 to 6) of the unit 3D shape dataset A, the similarity of the three faces to the three faces in the unit 3D shape dataset B is not be equal to or higher than the threshold. In this case, the first identification unit 604 may set three adjacent faces (or four faces) in the six-face views as one block (reference face) and identify corresponding faces in the unit 3D shape datasets A and B.

(Specific Example of Method 3 for Aligning Orientations of Unit 3D Shape Datasets)

Next, a specific example of the method 3 for aligning the orientations of the third 3D shape dataset and the fourth 3D shape dataset will be described with reference to FIG. 17. Here, the third 3D shape dataset is referred to as a "unit 3D shape dataset A", and the first plurality of images are referred to as a "first plurality of images 1100". The fourth 3D shape dataset is referred to as a "unit 3D shape dataset B", and the second plurality of images are referred to as a "second plurality of images 1200".

Figure 17:
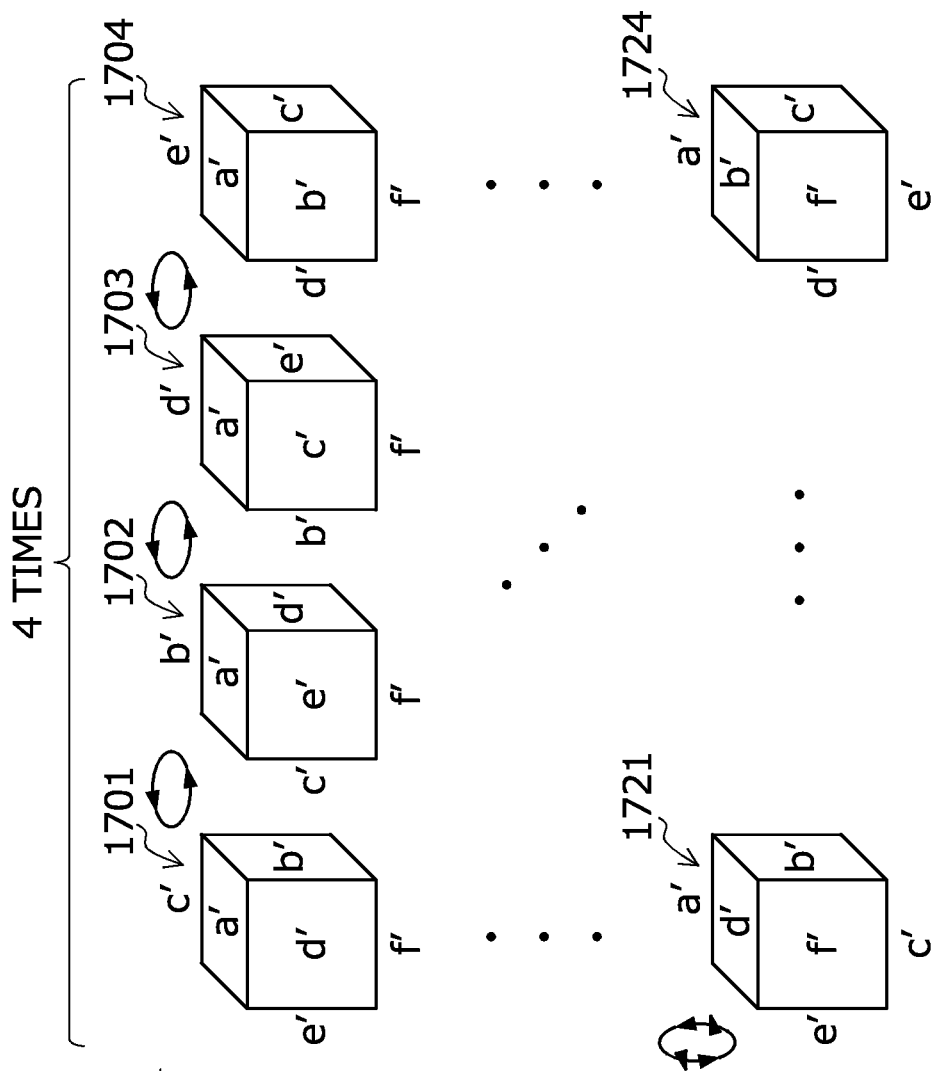
FIG. 17 is an explanatory diagram illustrating a third processing example of aligning the orientations of unit 3D shape datasets.

FIG. 17 is an explanatory diagram illustrating a third processing example of aligning the orientations of unit 3D shape datasets. In FIG. 17, first, the first identification unit 604 identifies, among the first plurality of images 1100 (see FIG. 11), a third combination 1700 of images of the unit 3D shape dataset A captured from the respective directions (1) to (6) with the unit 3D shape dataset A fixed. The third combination 1700 indicates a disposition pattern of the images of the respective faces in the six-face view of the unit 3D shape dataset A.

The first identification unit 604 identifies, among the second plurality of images 1200, fourth combinations 1701 to 1724 each including images of the unit 3D shape dataset B captured from the respective directions (1) to (6) with the unit 3D shape dataset B set in the corresponding one of the orientations rotated by 90 degrees around each of the x axis, the y axis, and the z axis. Each of the fourth combinations 1701 to 1724 indicates a disposition pattern of the images of the respective faces in the six-face view of the unit 3D shape dataset B, with the unit 3D shape dataset B set in the corresponding one of the orientations rotated by 90 degrees around each of the x axis, the y axis, and the z axis.

The first identification unit 604 aligns the orientations of the unit 3D shape datasets A and B based on a result of comparison between the identified third combination 1700 of the images and each of the fourth combinations 1701 to 1724 of the images.

For example, the first identification unit 604 compares the third combination 1700 of the images with each of the fourth combinations 1701 to 1724 of the images, and calculates the similarity between the faces (images) at same positions in the six-face views. The first identification unit 604 calculates a similarity (total similarity) between the third combination 1700 of the images and each of the fourth combinations 1701 to 1724 of the images by summing up the calculated similarities between the faces (for the six faces).

As an example, assumed is a case where the third combination 1700 of the images and the fourth combination 1701 of the images are compared. In this case, the first identification unit 604 calculates a similarity 1 between an image a and an image a' at the same positions in the six-face views. The first identification unit 604 calculates a similarity 2 between an image b and an image b' at the same positions in the six-face views. The first identification unit 604 calculates a similarity 3 between an image c and an image d at the same positions in the six-face views.

The first identification unit 604 calculates a similarity 4 between an image d and an image d' at the same positions in the six-face views. The first identification unit 604 calculates a similarity 5 between an image e and an image e' at the same positions in the six-face views. The first identification unit 604 calculates a similarity 6 between an image f and an image f at the same positions in the six-face views.

The first identification unit 604 sums up the calculated similarities 1 to 6 to calculate a total similarity 1 between the third combination 1700 of the images and the fourth combination 1701 of the images. Similarly, the first identification unit 604 calculates total similarities 2 to 24 between the third combination 1700 of the images and the respective fourth combinations 1702 to 1724 of the images.

Next, the first identification unit 604 identifies the fourth combination that has the highest calculated total similarity among the fourth combinations 1701 to 1724. For example, assumed is a case where the fourth combination 1701 is identified. In this case, the first identification unit 604 determines that the images a, b, c, and d in the unit 3D shape dataset A correspond to the images a', b', c', and d' in the unit 3D shape dataset B, respectively, from the correspondence relationship between the third combination 1700 and the fourth combination 1701. The first identification unit 604 determines that the faces for the respective images a, b, c, and d in the unit 3D shape dataset A respectively correspond to the faces for the respective images a', b', c', and d' in the unit 3D shape dataset B.

Here, although the total similarity between the third combination 1700 of the images and each of the fourth combinations 1701 to 1724 of the images is calculated by summing up the similarities between the faces (images) at the same positions in the six-face views, the configuration is not limited to this.

For example, the first identification unit 604 expresses a disposition pattern in the six-face view of each of the unit 3D shape datasets A and B based on the feature values of the respective images of the concerned unit 3D shape dataset A or B by using a feature vector of the images. The first identification unit 604 compares the feature vectors expressing the disposition patterns between the unit 3D shape datasets A and B, identifies the disposition patterns having the shortest distance, and aligns the orientations of the unit 3D shape datasets A and B.

In more detail, for example, the first identification unit 604 calculates a feature vector Vec_A expressing the third combination 1700 based on the feature values of the respective images of the unit 3D shape dataset A. The feature vector Vec_A is expressed by, for example, "Vec_A=(the feature value of the image a, the feature value of the image d, the feature value of the image b, the feature value of the image c, the feature value of the image e, the feature value of the image f)".

Next, the first identification unit 604 calculates feature vectors Vec_B1 to B24 expressing the respective fourth combinations 1701 to 1724 based on the feature values of the respective images of the unit 3D shape dataset B. The feature vector Vec_B2 is expressed by, for example, "Vec_B2=(the feature value of the image a', the feature value of the image e', the feature value of the image d', the feature value of the image b', the feature value of the image c', the feature value of the image f')".

The first identification unit 604 calculates a distance between the feature vector Vec_A and each of the feature vectors Vec_B1 to B24. The distance between the feature vectors corresponds to the similarity between the six-face views. Next, the first identification unit 604 identifies the feature vector $Vec\_B_{min}$ that has the shortest calculated distance among the feature vectors Vec_B1 to B24.

The first identification unit 604 aligns the orientations of the unit 3D shape datasets A and B based on the identified feature vector $Vec\_B_{min}$. For example, the first identification unit 604 determines that the fourth combination (disposition pattern in the six-face view) corresponding to the feature vector $Vec\_B_{min}$ is the unit 3D shape dataset B whose orientation is aligned with the orientation of the unit 3D shape dataset A in the third combination 1700.

In another method, the first identification unit 604 may calculate a similarity between the third combination 1700 of the images and each of the fourth combinations 1701 to 1724 of the images by using images of development diagrams of the six-face views. In this method, the first identification unit 604 fixes the unit 3D shape dataset A, rotates the unit 3D shape dataset B, and identifies the orientation of the unit 3D shape dataset B matching the orientation of the unit 3D shape dataset A from the similarity between features of the images of the development diagrams.

FIG. 18 is an explanatory diagram illustrating an example of development diagrams. In FIG. 18, a development diagram 1800 is an example of a development diagram of the six-face view of the unit 3D shape dataset A (corresponding to the third combination 1700 illustrated in FIG. 17). The development diagram 1800 is the example of the development diagram of the six-face view of the unit 3D shape dataset A (corresponding to the third combination 1700 illustrated in FIG. 17). Development diagrams 1801 to 1824 are an example of development diagrams of the six-face views of the unit 3D shape dataset B (corresponding to the fourth combinations 1701 to 1724 illustrated in FIG. 17).

By using each of the development diagrams as one image, the first identification unit 604 calculates a similarity between the development diagram 1800 and each of the development diagrams 1801 to 1824. Next, the first identification unit 604 identifies the development $diagram_{max}$ having the highest calculated similarity among the development diagrams 1801 to 1824. The first identification unit 604 aligns the orientations of the unit 3D shape dataset A and the unit 3D shape dataset B based on the identified development diagram$_{max}$.

For example, the first identification unit 604 determines that the fourth combination (disposition pattern in the six-face view) corresponding to the development diagram$_{max}$ is the unit 3D shape dataset B whose orientation is aligned with the orientation of the unit 3D shape dataset A of the third combination 1700.

(Various Processing Procedures of Model Generation Apparatus 201)

Next, various processing procedures of the model generation apparatus 201 will be described with reference to FIGS. 19 to 30. First, a pre-preparation processing procedure of the model generation apparatus 201 will be described with reference to FIG. 19.

Figure 19:
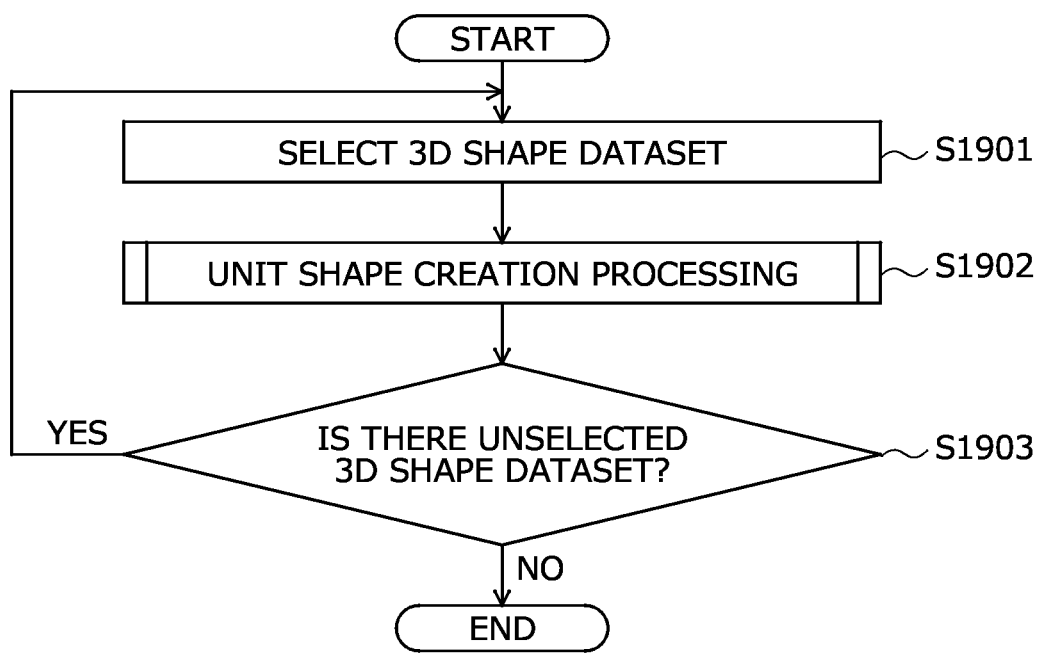
FIG. 19 is a flowchart illustrating an example of a pre-preparation processing procedure of the model generation apparatus.

FIG. 19 is a flowchart illustrating an example of the pre-preparation processing procedure of the model generation apparatus 201. First, in the flowchart in FIG. 19, the model generation apparatus 201 refers to the 3D shape DB 220 and selects an unselected 3D shape dataset yet to be selected (step S1901).

Next, the model generation apparatus 201 executes unit shape creation processing for the selected 3D shape dataset (step S1902). A specific processing procedure of the unit shape creation processing will be described later with reference to FIG. 20. The model generation apparatus 201 refers to the 3D shape DB 220 to determine whether or not there is an unselected 3D shape dataset yet to be selected (step S1903).

When there is an unselected 3D shape dataset (step S1903: Yes), the model generation apparatus 201 returns to step S1901. On the other hand, when there is no unselected 3D shape dataset (step S1903: No), the model generation apparatus 201 ends the series of processes according to this flowchart.

In this way, the model generation apparatus 201 is capable of creating the unit 3D shape dataset of each of the 3D shape datasets registered in the 3D shape DB 220 as pre-preparation. For example, each created unit 3D shape dataset may be held in the 3D shape DB 220 in association with the 3D shape dataset based on which the unit 3D shape dataset is created.

Next, the specific processing procedure of the unit shape creation processing in step S1902 illustrated in FIG. 19 will be described with reference to FIG. 20.

Figure 20:
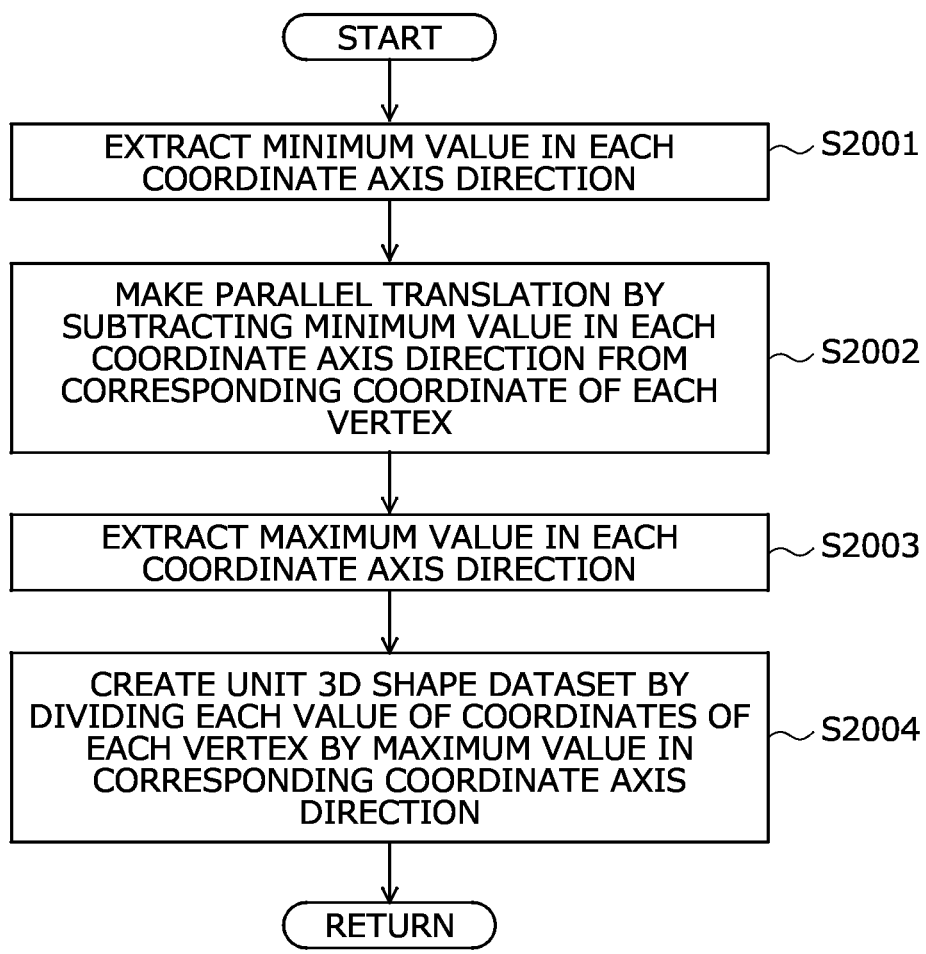
FIG. 20 is a flowchart illustrating an example of a specific processing procedure of unit shape creation processing.

FIG. 20 is a flowchart illustrating an example of the specific processing procedure of the unit shape creation processing. In the flowchart in FIG. 20, first, the model generation apparatus 201 extracts the minimum value in each of the coordinate axis directions from the coordinates of vertices in a 3D shape dataset (step S2001). The model generation apparatus 201 subtracts the extracted minimum value in each of the coordinate axis directions from the corresponding value of the coordinates of each vertex and thereby translates the 3D shape dataset (step S2002).

Next, the model generation apparatus 201 extracts the maximum value in each of the coordinate axis directions from the coordinates of the vertices of the 3D shape dataset after the parallel translation (step S2003). The model generation apparatus 201 divides each value of the coordinates of each vertex in the 3D shape dataset after the parallel translation by the extracted maximum value in the corresponding coordinate axis direction to create a unit 3D shape dataset (step S2004), and returns to the step in which the unit shape creation processing is invoked.

In this way, the model generation apparatus 201 is capable of normalizing the 3D shape dataset while maintaining the dimensional relationship among the parts in each of the coordinate axis directions.

Next, a standard shape registration processing procedure of the model generation apparatus 201 will be described with reference to FIG. 21. Standard shape registration processing is processing of registering a standard shape dataset in the standard shape DB 230 in advance before designing a target object.

Figure 21:
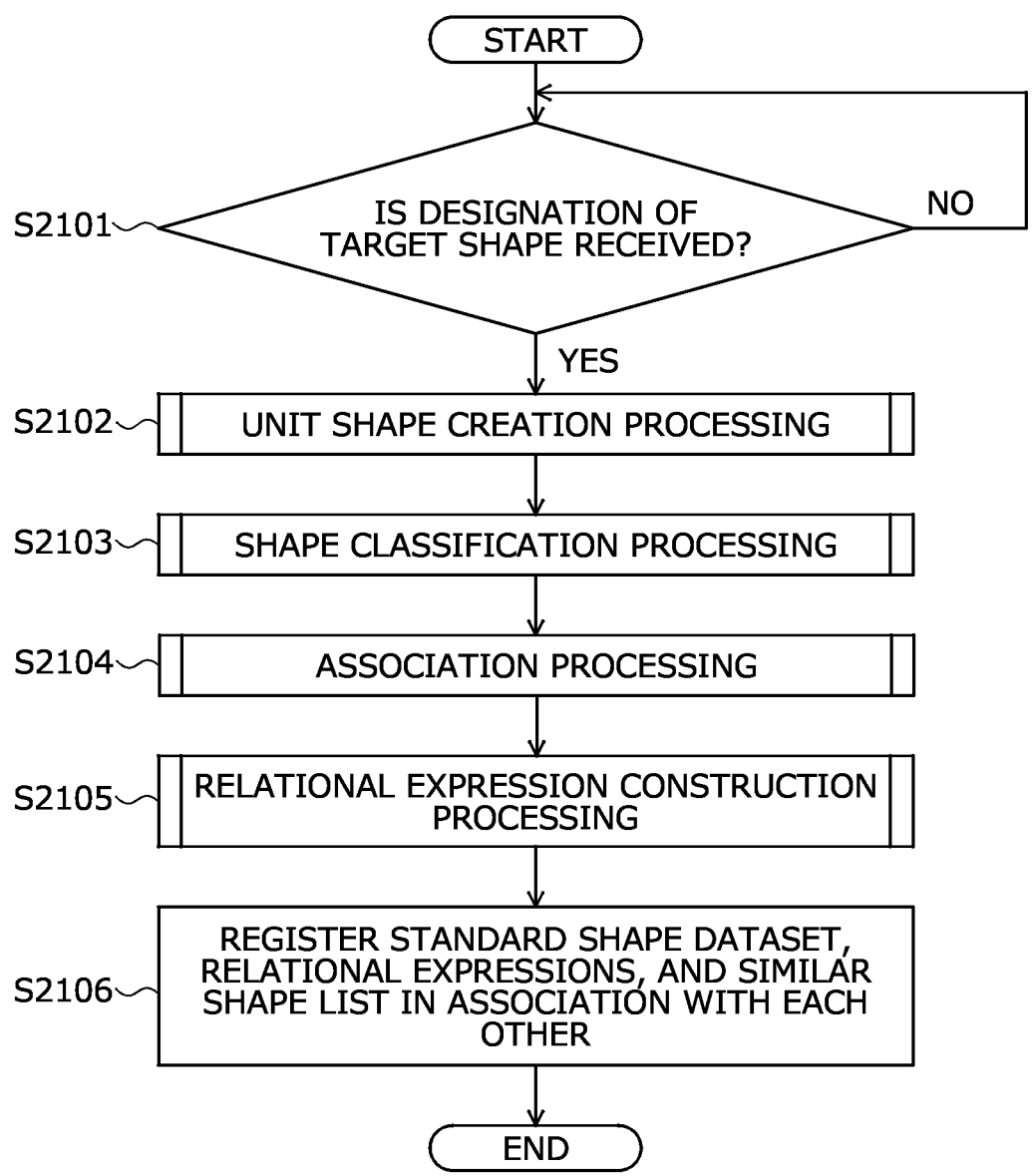
FIG. 21 is a flowchart illustrating an example of a standard shape registration processing procedure of the model generation apparatus.

FIG. 21 is a flowchart illustrating an example of the standard shape registration processing procedure of the model generation apparatus 201. In the flowchart in FIG. 21, first, the model generation apparatus 201 determines whether or not designation of a target shape is received (step S2101). The target shape designated in this step is a 3D shape dataset designated for classifying the 3D shape datasets registered in the 3D shape DB 220, and is designated from the 3D shape DB 220, for example.

The model generation apparatus 201 waits for reception of designation of a target shape (step S2101: No). When the designation of a target shape is received (step S2101: Yes), the model generation apparatus 201 executes the unit shape creation processing for the target shape (step S2102).

A specific processing procedure of the unit shape creation processing for the target shape is similar to the processing procedure illustrated in FIG. 20, and thus illustration and description thereof is omitted herein. When the unit 3D shape dataset of the target shape is already created, the model generation apparatus 201 may skip step S2102.

Next, the model generation apparatus 201 executes shape classification processing of classifying multiple 3D shape datasets based on the created unit 3D shape dataset (step S2103). A specific processing procedure of the shape classification processing will be described later with reference to FIG. 22.

The model generation apparatus 201 executes association processing of specifying a part-to-part correspondence relationship among the 3D shape datasets classified into a group (step S2104). A specific processing procedure of the association processing will be described later with reference to FIG. 23.

Next, the model generation apparatus 201 executes relational expression construction processing of constructing relational expressions among dimensions of different parts in the 3D shape datasets classified into the group (step S2105). A specific processing procedure of the relational expression construction processing will be described later with reference to FIG. 27.

The model generation apparatus 201 sets the unit 3D shape dataset of each of the 3D shape datasets in the group as a standard shape dataset, registers the standard shape dataset, the constructed relational expressions, and the similar shape list in association with each other in the standard shape DB 230 (step S2106), and ends the series of processes according to this flowchart.

In this way, the model generation apparatus 201 is capable of building a DB containing the standard shape datasets (unit 3D shape datasets) and a parametric model (relational expressions) of the 3D shapes grouped based on the standard shape datasets.

Next, the specific processing procedure of the shape classification processing in step S2103 illustrated in FIG. 21 will be described with reference to FIG. 22. Here, the unit 3D shape dataset of the target shape created in step S2102 illustrated in FIG. 21 is referred to as a "unit target shape".

Figure 22:
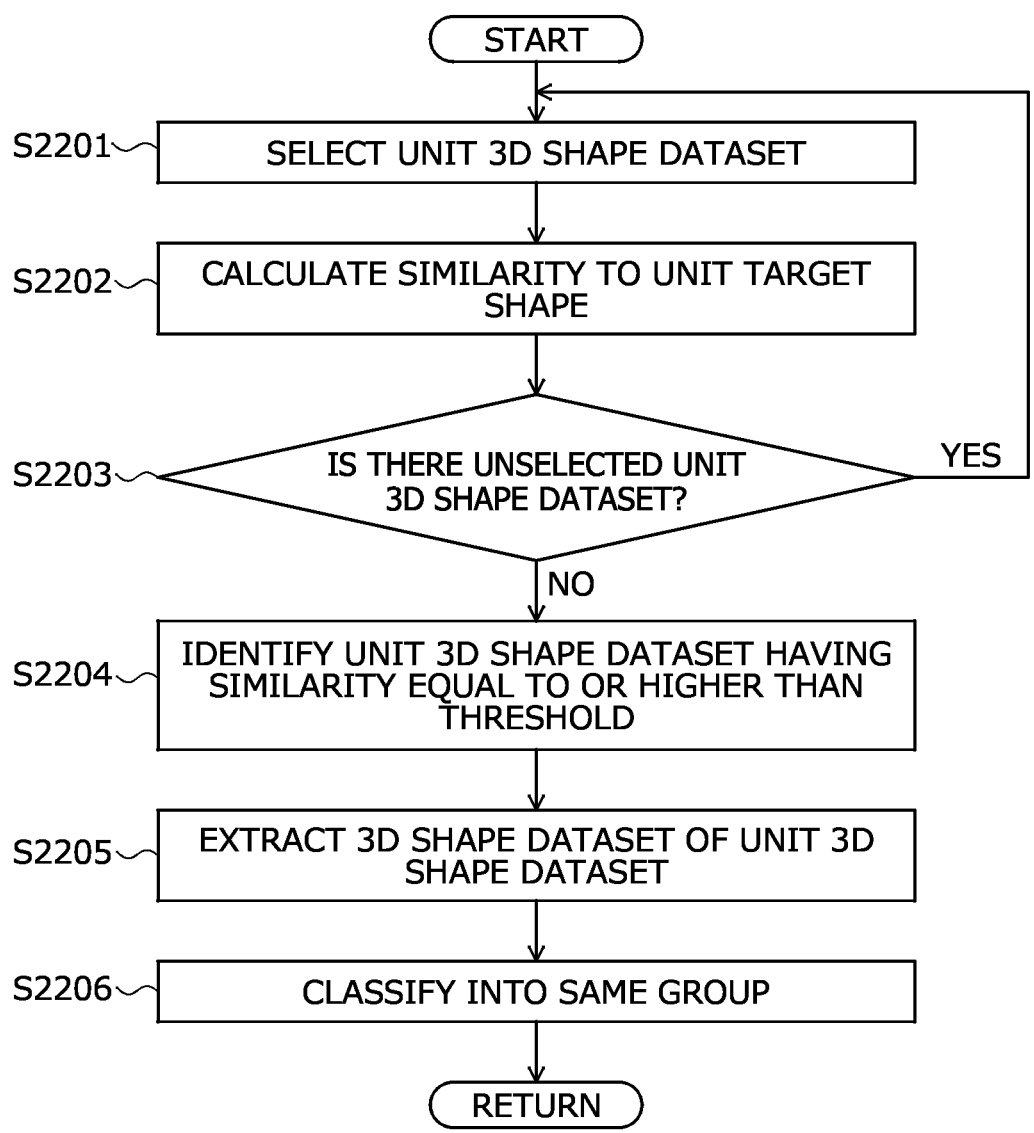
FIG. 22 is a flowchart illustrating an example of a specific processing procedure of shape classification processing.

FIG. 22 is a flowchart illustrating an example of the specific processing procedure of the shape classification processing. In the flowchart in FIG. 22, first, the model generation apparatus 201 selects an unselected unit 3D shape dataset among the unit 3D shape datasets of the 3D shape datasets in the 3D shape DB 220 (step S2201).

The model generation apparatus 201 calculates the similarity between the selected unit 3D shape dataset and the created unit target shape (step S2202). Next, the model generation apparatus 201 determines whether or not there is an unselected unit 3D shape dataset yet to be selected among the unit 3D shape datasets of the 3D shape datasets in the 3D shape DB 220 (step S2203).

When there is an unselected unit 3D shape dataset (step S2203: Yes), the model generation apparatus 201 returns to step S2201. On the other hand, when there is no unselected unit 3D shape dataset (step S2203: No), the model generation apparatus 201 identifies the unit 3D shape datasets each having the calculated similarity equal to or higher than the threshold (step S2204).

Next, the model generation apparatus 201 extracts the 3D shape datasets corresponding to the identified unit 3D shape datasets from the 3D shape DB 220 (step S2205). The model generation apparatus 201 classifies the extracted 3D shape datasets into the same group (step S2206), and returns to the step in which the shape classification processing is invoked.

In this way, the model generation apparatus 201 is capable of classifying the 3D shape datasets whose unit 3D shape datasets are similar to that of the target 3D shape dataset into the same group. For example, not only the same shape or similar shapes but also shapes partially different in dimensions may be classified into the same group. Such grouping close to human sensitivity may improve versatility for making a new design.

Next, the specific processing procedure of the association processing in step S2104 illustrated in FIG. 21 will be described with reference to FIG. 23.

Figure 23:
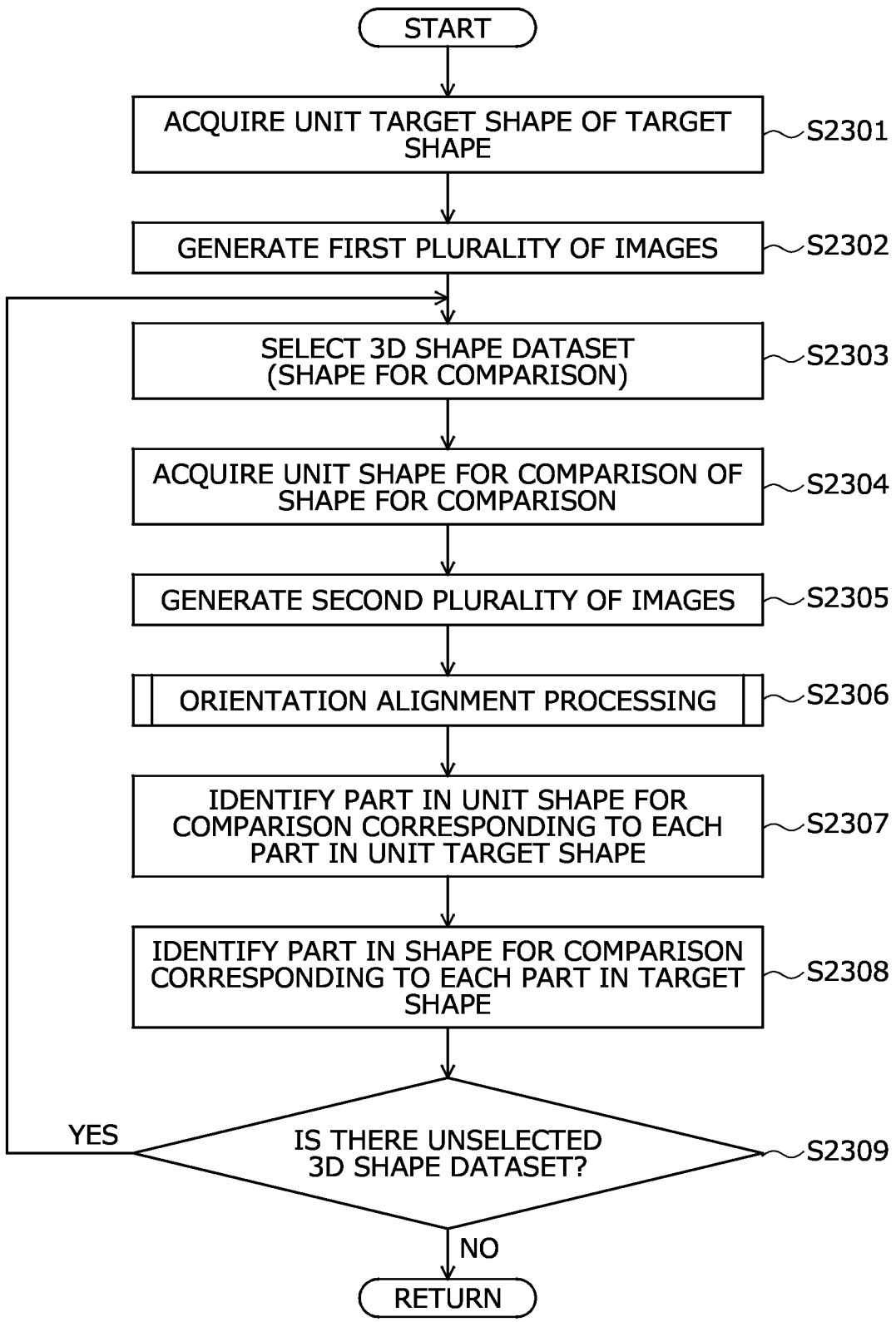
FIG. 23 is a flowchart illustrating an example of a specific processing procedure of association processing.

FIG. 23 is a flowchart illustrating an example of the specific processing procedure of the association processing. In the flowchart in FIG. 23, first, the model generation apparatus 201 acquires a unit target shape (unit 3D shape dataset) of a target shape (step S2301). The target shape corresponds to the first 3D shape dataset described above. The unit target shape corresponds to the third 3D shape dataset described above.

The model generation apparatus 201 generates a first plurality of images by capturing images of the unit target shape from each of both directions (positive and negative directions) of each of the x axis, the y axis, and the z axis, while rotating the unit target shape around the above axis by 90 degrees (step S2302).

Next, the model generation apparatus 201 selects an unselected 3D shape dataset yet to be selected from the 3D shape datasets classified into the group in step S2103 (step S2303). The 3D shape dataset selected in this step corresponds to the second 3D shape dataset described above. In the following description, the 3D shape dataset selected in step S2303 may be referred to as a "shape for comparison".

The model generation apparatus 201 acquires the unit 3D shape dataset of the selected 3D shape dataset (step S2304). The unit 3D shape dataset acquired in this step corresponds to the fourth shape dataset described above. In the following description, the unit 3D shape dataset acquired in step S2304 may be referred to as a "unit shape for comparison".

The model generation apparatus 201 generates a second plurality of images by capturing images of the unit shape for comparison from each of both directions (positive and negative directions) of each of the x axis, the y axis, and the z axis, while rotating the unit shape for comparison around the above axis by 90 degrees (step S2305).

The model generation apparatus 201 executes orientation alignment processing of aligning the orientations of the unit target shape and the unit shape for comparison (step S2306). A specific processing procedure of the orientation alignment processing will be described later with reference to FIGS. 24 to 26.

Next, the model generation apparatus 201 identifies a part in the unit shape for comparison in the aligned orientation corresponding to each part of the unit target shape in the aligned orientation (step S2307). The model generation apparatus 201 identifies a part (second portion) in the shape for comparison corresponding to each part (first portion) in the target shape based on the identified result (step S2308).

Next, the model generation apparatus 201 determines whether or not there is an unselected 3D shape dataset yet to be selected from the 3D shape datasets classified into the group in step S2103 (step S2309). When there is an unselected 3D shape dataset (step S2309: Yes), the model generation apparatus 201 returns to step S2303.

On the other hand, when there is no unselected 3D shape dataset (step S2309: No), the model generation apparatus 201 returns to the step in which the association processing is invoked. In this way, the model generation apparatus 201 is capable of identifying a correspondence relationship between each part (first portion) in the target shape and each part (second portion) in the shape for comparison.

Next, the specific processing procedure of the orientation alignment processing in step S2306 illustrated in FIG. 23 will be described with reference to FIGS. 24 to 26. Here, the orientation alignment processing in step S2306 will be described by taking, as examples, first orientation alignment processing and second orientation alignment processing, First, a specific processing procedure of the first orientation alignment processing will be described. The first orientation alignment processing corresponds to the method 1 for aligning the orientations of the third 3D shape dataset (unit target shape) and the fourth 3D shape dataset (unit shape for comparison) as described above.

Figure 24:
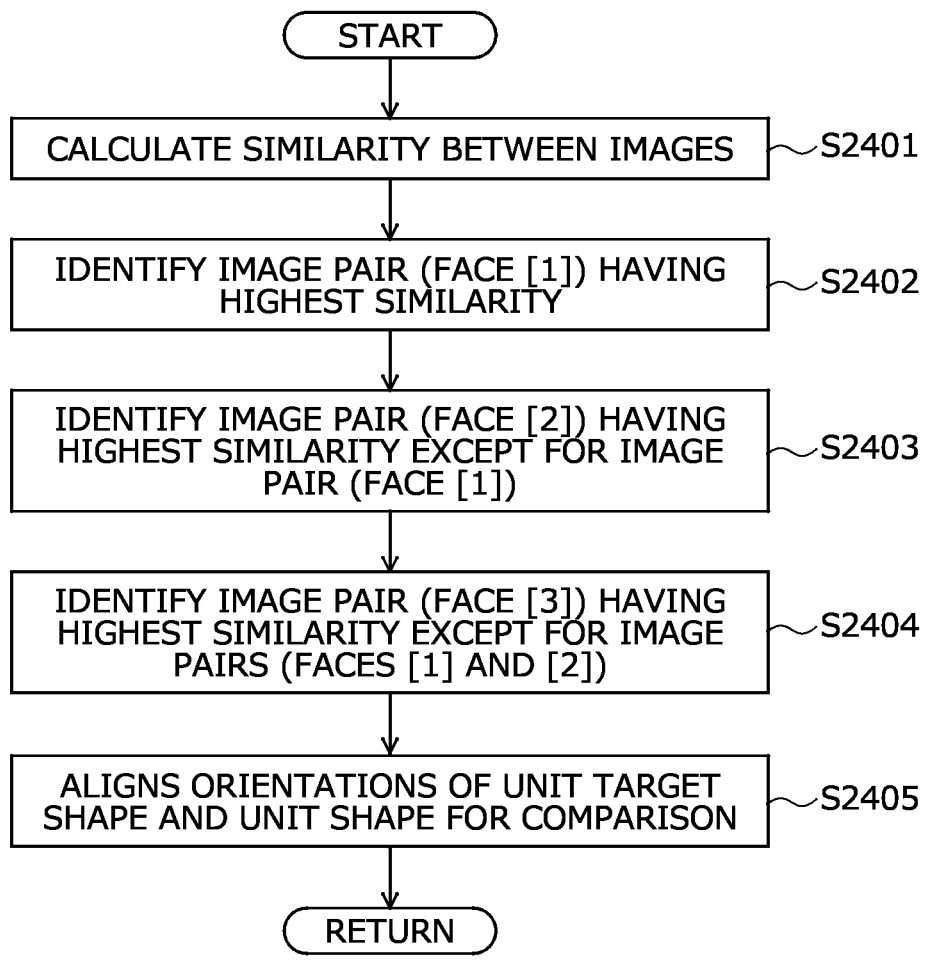
FIG. 24 is a flowchart illustrating an example of a specific processing procedure of first orientation alignment processing.

FIG. 24 is a flowchart illustrating an example of the specific processing procedure of the first orientation alignment processing. In the flowchart in FIG. 24, first, the model generation apparatus 201 compares each of the first plurality of images with each of the second plurality of images, and calculates a similarity between the images (step S2401).

The model generation apparatus 201 identifies an image pair (face [1]) having the highest similarity based on the calculated similarities between the images (step S2402). The model generation apparatus 201 identifies an image pair (face [2]) having the highest similarity except for the identified image pair (face [1]) based on the calculated similarities between the images (step S2403).

The model generation apparatus 201 identifies an image pair (face [1] having the highest similarity except for the identified image pairs (faces [1] and [2]) based on the calculated similarities between the images (step S2404). The model generation apparatus 201 aligns the orientations of the unit target shape and the unit shape for comparison based on the identified image pairs (faces [1], [2], and [3]) (step S2405), and returns to the step in which the first orientation alignment processing is invoked.

In this way, the model generation apparatus 201 is capable of comparing the faces (24 images) in the unit target shape and the faces (24 images) in the unit shape for comparison in a round-robin manner to identify three pairs of corresponding faces in the unit 3D shape datasets, and thereby aligning the orientations of the unit target shape and the unit shape for comparison.

Next, a specific processing procedure of the second orientation alignment processing will be described next. The second orientation alignment processing corresponds to the method 2 for aligning the orientations of the third 3D shape dataset (unit target shape) and the fourth 3D shape dataset (unit shape for comparison) as described above.

Figure 25:
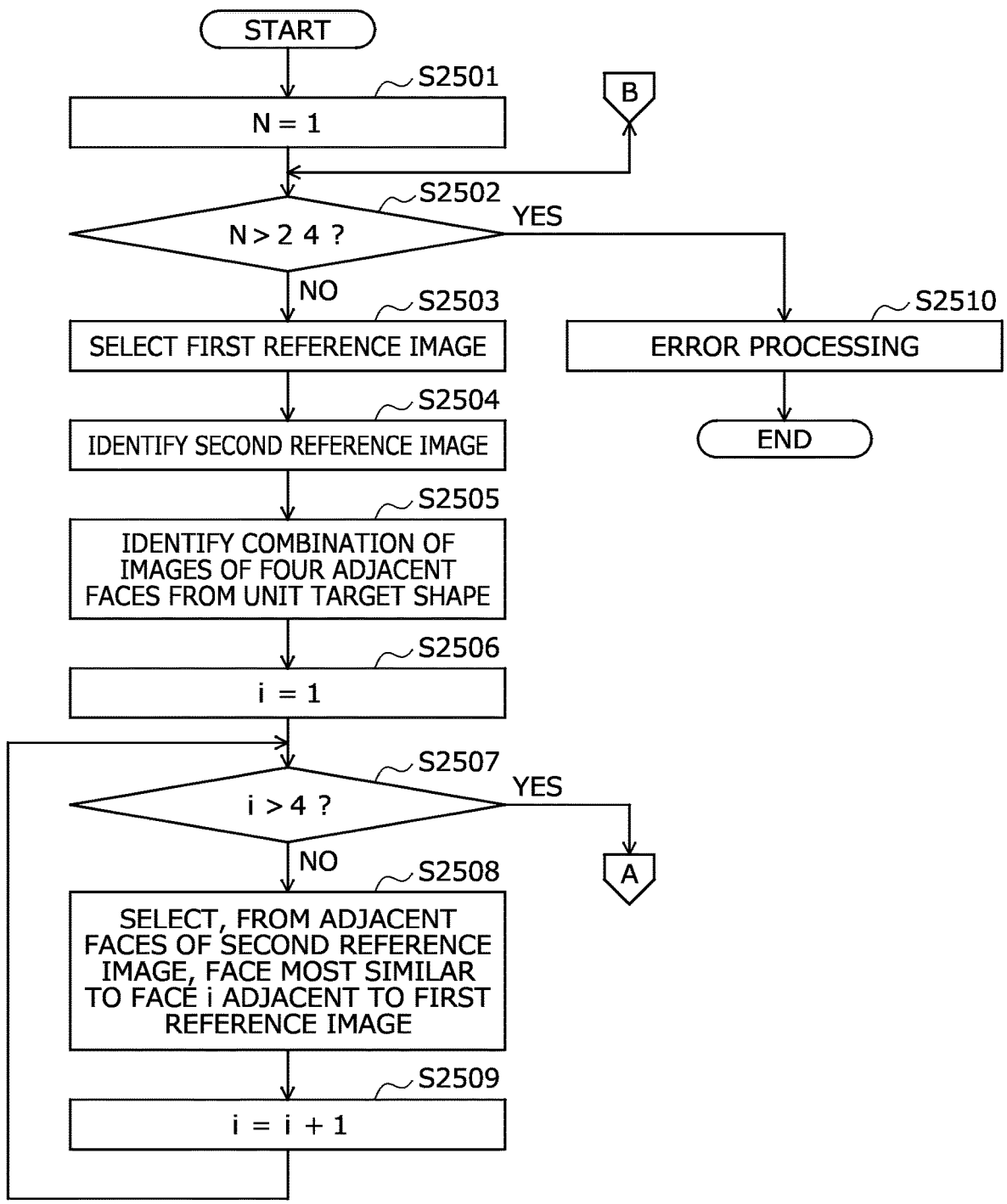
FIG. 25 is a flowchart illustrating an example of a specific processing procedure of second orientation alignment processing (part 1)
Figure 26:
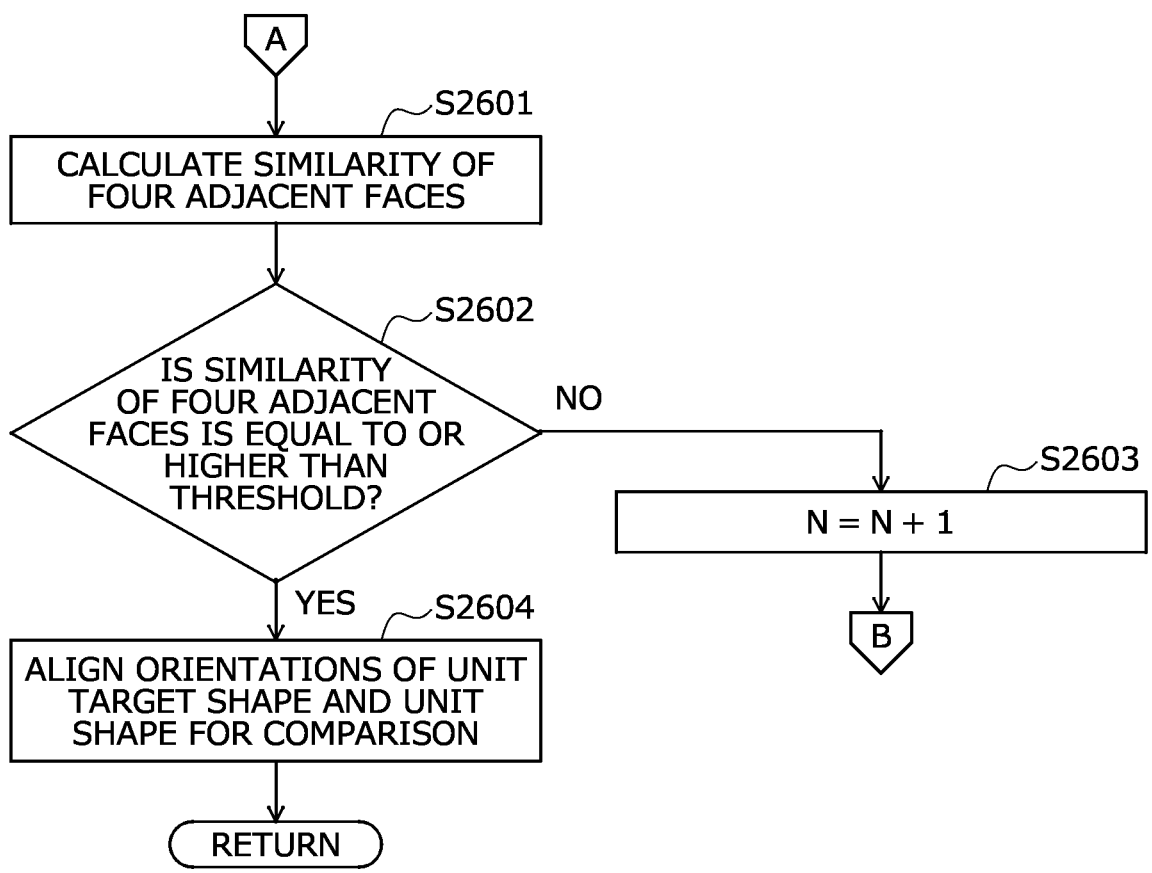
FIG. 26 is a flowchart illustrating the example of the specific processing procedure of the second orientation alignment processing (part 2)

FIGS. 25 and 26 present a flowchart illustrating an example of the specific processing procedure of the second orientation alignment processing. First, in the flowchart in FIG. 25, the model generation apparatus 201 sets N to "N=1" (step S2501), and determines whether or not N is "N=24" (step S2502).

When N is not "N>24" (step S2502: No), the model generation apparatus 201 selects, as a first reference image, an image having the N-th greatest feature from the first plurality of images (step S2503). The model generation apparatus 201 identifies an image having the highest similarity to the selected first reference image from the second plurality of images as a second reference image (step S2504).

The model generation apparatus 201 identifies a combination (first combination) of images of the respective four faces adjacent to the face for the first reference image from the unit target shape (step S2505). Next, the model generation apparatus 201 sets i to "i=1" (step S2506) and determines whether or not i is "i>4" (step S2507).

When i is not "i=4" (step S2507: No), the model generation apparatus 201 selects, from the faces adjacent to the second reference image, the face most similar to a face i adjacent to the first reference image (step S2508). The face i is a face for an i-th image in the first combination. Note that the already-selected face (image) is excluded from the selection target faces.

The model generation apparatus 201 increments i (step S2509) and returns to step S2507. In step S2507, when i is "i=4" (step S2507: Yes), the model generation apparatus 201 proceeds to step S2601 illustrated in FIG. 26, Thus, the model generation apparatus 201 is capable of identifying a combination (second combination) of images corresponding to the respective faces i (images) in the first combination from the second plurality of images.

In the flowchart in FIG. 26, first, the model generation apparatus 201 calculates a similarity between the four adjacent faces of the reference face (the first reference image) and the four adjacent faces of the reference face (the second reference image) based on the combination (first combination) of images identified in step S2505 and the faces (images) selected as corresponding to the respective faces i in step S2508 (step S2601).

The model generation apparatus 201 determines whether or not the calculated similarity between the four adjacent faces and the four adjacent faces is equal to or higher than a threshold (step S2602), When the similarity between the four adjacent faces and the four adjacent faces is lower than the threshold (step S2602: No), the model generation apparatus 201 increments N (step S2603), and returns to step S2502.

On the other hand, when the similarity between the four adjacent faces and the four adjacent faces is equal to or higher than the threshold (step S2602: Yes), the model generation apparatus 201 aligns the orientations of the unit target shape and the unit shape for comparison (step S2508) based on the combination of images identified in step S2505 and the faces (images) selected as corresponding to the respective faces i in step S2508 (step S2604), and returns to the step in which the second orientation alignment processing is invoked.

In this way, the model generation apparatus 201 is capable of comparing the four adjacent faces of the reference face (first reference image) of the unit target shape and the four adjacent faces of the reference face (second reference image) of the unit shape for comparison to identify the corresponding faces in the unit 3D shape datasets, and aligning the orientations of the unit target shape and the unit shape for comparison.

When N is "N=24" in step S2502 illustrated in FIG. 25 (step S2502: Yes), the model generation apparatus 201 executes error processing (step S2510), and ends the series of processes according to this flowchart. In the error processing, for example, an error message indicating that a parametric model fails to be constructed is output.

Here, although the error processing is executed when N is "N=24" in step S2502, the procedure is not limited thereto. For example, the model generation apparatus 201 may identify corresponding faces in the unit 3D shape datasets by using two adjacent faces (or three faces, four faces, and so on) in the six-face views as one block (reference face).

A specific processing procedure (exceptional orientation alignment processing) of identifying corresponding faces in the unit 3D shape datasets by using two adjacent faces in the six-face views as one block (reference face) and aligning the orientations of the unit 3D shape datasets will be described later with reference to FIG. 30.

Next, the specific processing procedure of the relational expression construction processing in step S2105 illustrated in FIG. 21 will be described with reference to FIG. 27.

Figure 27:
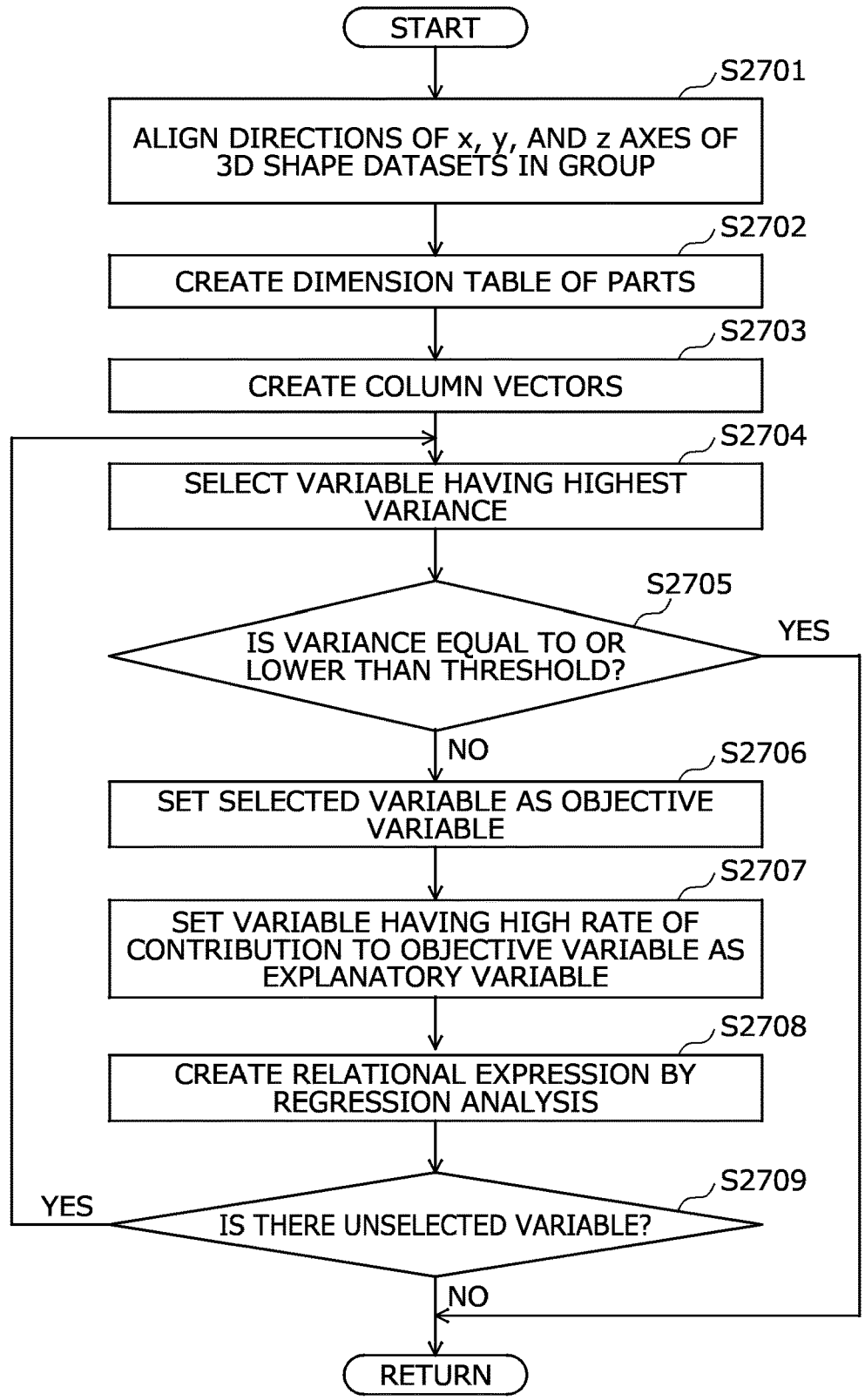
FIG. 27 is a flowchart illustrating an example of a specific processing procedure of relational expression construction processing.

FIG. 27 is a flowchart illustrating an example of the specific processing procedure of the relational expression construction processing. In the flowchart in FIG. 27, first, the model generation apparatus 201 aligns the orientations of the 3D shape datasets classified into the group in step S2103 by aligning the directions of the x axis, the y axis, and the z axis thereof based on the result in step S2306 (step S2701).

The model generation apparatus 201 extracts the dimension of each part in the 3D shape datasets in the group based on the result in step S2308, and thereby creates a dimension table of the parts in the 3D shape datasets in the group (step S2702). For each of the parts, the model generation apparatus 201 creates a column vector having the dimensions of the part in the respective 3D shape datasets as elements by referring to the created dimension table of the parts (step S2703).

The model generation apparatus 201 sets the created column vectors of the respective parts as variables and selects the variable having the highest variance (step S2704). The model generation apparatus 201 determines whether or not the variance of the selected variable is equal to or lower than a predetermined threshold (step S2705). The predetermined threshold may be arbitrarily set.

When the variance is equal to or lower than the predetermined threshold (step S2705: Yes), the model generation apparatus 201 returns to the step in which the relational expression construction processing is invoked.

On the other hand, when the variance is higher than the predetermined threshold (step S2705: No), the model generation apparatus 201 sets the selected variable as an objective variable (step S2706). Next, the model generation apparatus 201 sets a variable having a high rate of contribution to the objective variable as an explanatory variable by the stepwise method (step S2707).

The model generation apparatus 201 creates a relational expression among the dimensions of the different parts in the 3D shape datasets by regression analysis based on the created column vectors (step S2708). Next, the model generation apparatus 201 determines whether or not there is an unselected variable yet to be selected (step S2709).

When there is an unselected variable (step S2709: Yes), the model generation apparatus 201 returns to step S2704. On the other hand, when there is no unselected variable (step S2709: No), the model generation apparatus 201 returns to the step in which the relational expression construction processing is invoked.

In this way, the model generation apparatus 201 is capable of constructing relational expressions specifying dimensional relationships among different parts in the 3D shape datasets classified into the same group.

Next, a first design processing procedure of the model generation apparatus 201 will be described with reference to FIG. 28. First design processing is processing of generating design data on a target object by designating a target 3D shape dataset having a shape similar to the target object.

Figure 28:
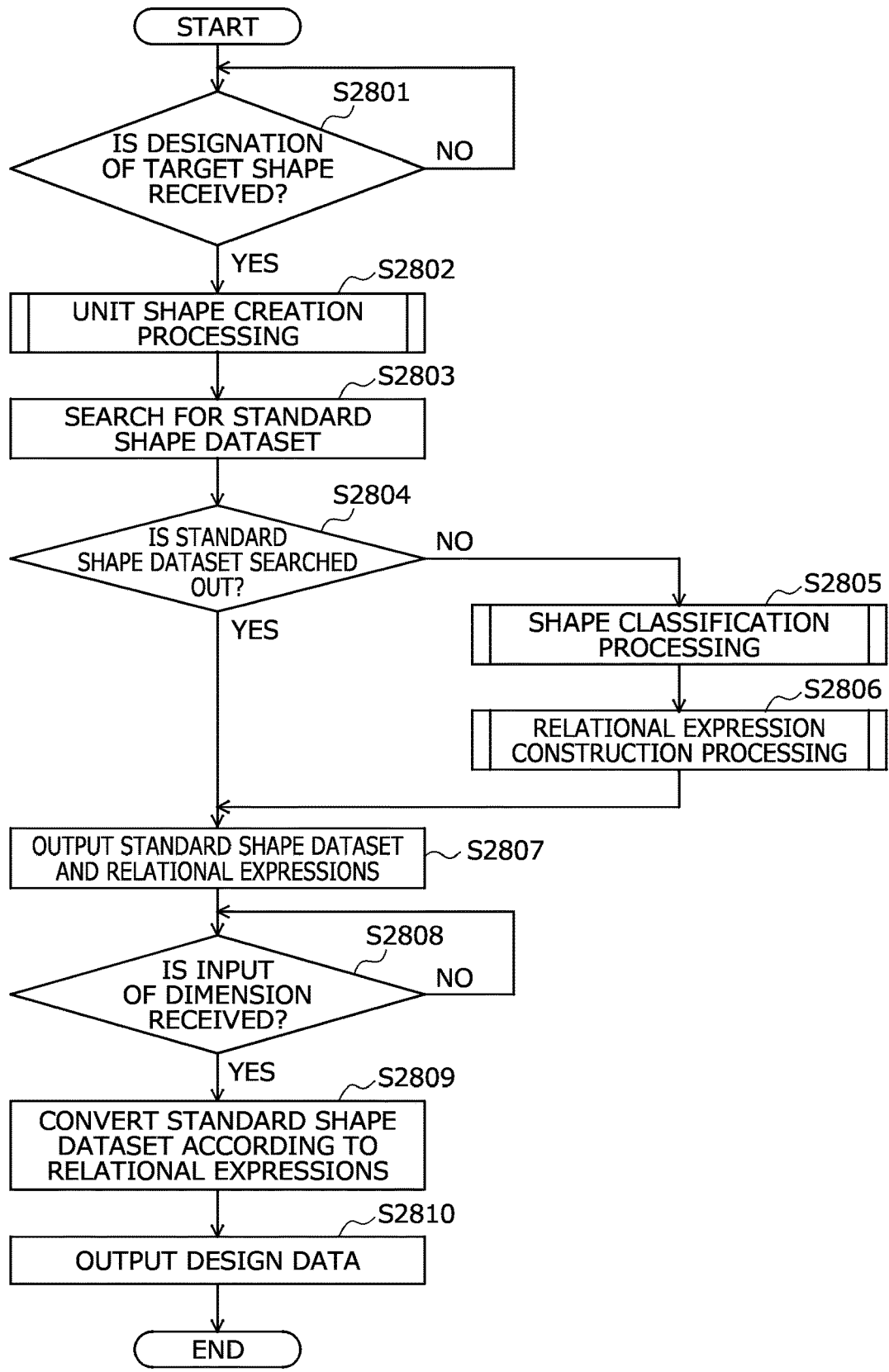
FIG. 28 is a flowchart illustrating an example of a first design processing procedure of the model generation apparatus.

FIG. 28 is a flowchart illustrating an example of the first design processing procedure of the model generation apparatus 201, In the flowchart in FIG. 28, first, the model generation apparatus 201 determines whether or not designation of a target shape is received (step S2801). The target shape designated in this step is a 3D shape dataset having a shape similar to a target object, and is designated from the 3D shape DB 220, for example.

The model generation apparatus 201 waits for reception of designation of a target shape (step S2801: No). When the designation of a target shape is received (step S2801: Yes), the model generation apparatus 201 executes the unit shape creation processing for the target shape (step S2802).

A specific processing procedure of the unit shape creation processing for the target shape is similar to the processing procedure illustrated in FIG. 20, and thus illustration and description thereof is omitted herein. When the unit 3D shape dataset of the target shape is already created, the model generation apparatus 201 may skip step S2802.

Next, the model generation apparatus 201 searches the standard shape DB 230 for a standard shape dataset similar to the unit 3D shape dataset of the target shape (step S2803). The model generation apparatus 201 determines whether or not the similar standard shape dataset is searched out (step S2804).

When the standard shape dataset is not searched out (step S2804: No), the model generation apparatus 201 executes the shape classification processing of classifying multiple 3D shape datasets (step S2805). Next, the model generation apparatus 201 executes the relational expression construction processing of constructing relational expressions among the dimensions of different parts in the 3D shape datasets classified into the group (step S2806), and proceeds to step S2807.

A specific processing procedure of the shape classification processing in step S2805 is similar to the processing procedure illustrated in FIG. 22, and thus illustration and description thereof is omitted herein. A specific processing procedure of the relational expression construction processing in step S2806 is similar to the processing procedure illustrated in FIG. 27, and thus illustration and description thereof is omitted herein.

When the standard shape dataset is searched out in step S2804 (step S2804: Yes), the model generation apparatus 201 outputs the searched-out standard shape dataset and the relational expressions for the standard shape dataset (step S2807). When the relational expressions are constructed in step S2806, the model generation apparatus 201 outputs the unit 3D shape dataset of any of the 3D shape datasets in the group as the standard shape dataset.

Next, the model generation apparatus 201 determines whether or not an input of a dimension of a specific part in the output standard shape dataset is received (step S2808). The specific part in the standard shape dataset corresponds to a specific part in the 3D shape dataset based on which the standard shape dataset is created. The dimension of the specific part corresponds to a design requirement related to the target object.

The model generation apparatus 201 waits for an input of a dimension of a specific part (step S2808: No). When the input of a dimension of a specific part is received (step S2808: Yes), the model generation apparatus 201 converts the standard shape dataset according to the relational expressions based on the input dimension of the specific part to generate the design data on the target object (step S2809).

The model generation apparatus 201 outputs the generated design data (step S2810), and ends the series of processes according to this flowchart. In step S2807, the model generation apparatus 201 may output the 3D shape datasets grouped according to the standard shape dataset.

In this way, when a designer makes a new design and designates a target shape and a dimension of a specific part, it is possible to automatically generate design data on a target object in accordance with the relational expressions (parametric relationship) based on the standard shape dataset.

Next, a second design processing procedure of the model generation apparatus 201 will be described with reference to FIG. 29. Second design processing is processing of generating design data on a target object by using an assembly composed of standard components (standard shape datasets).

Figure 29:
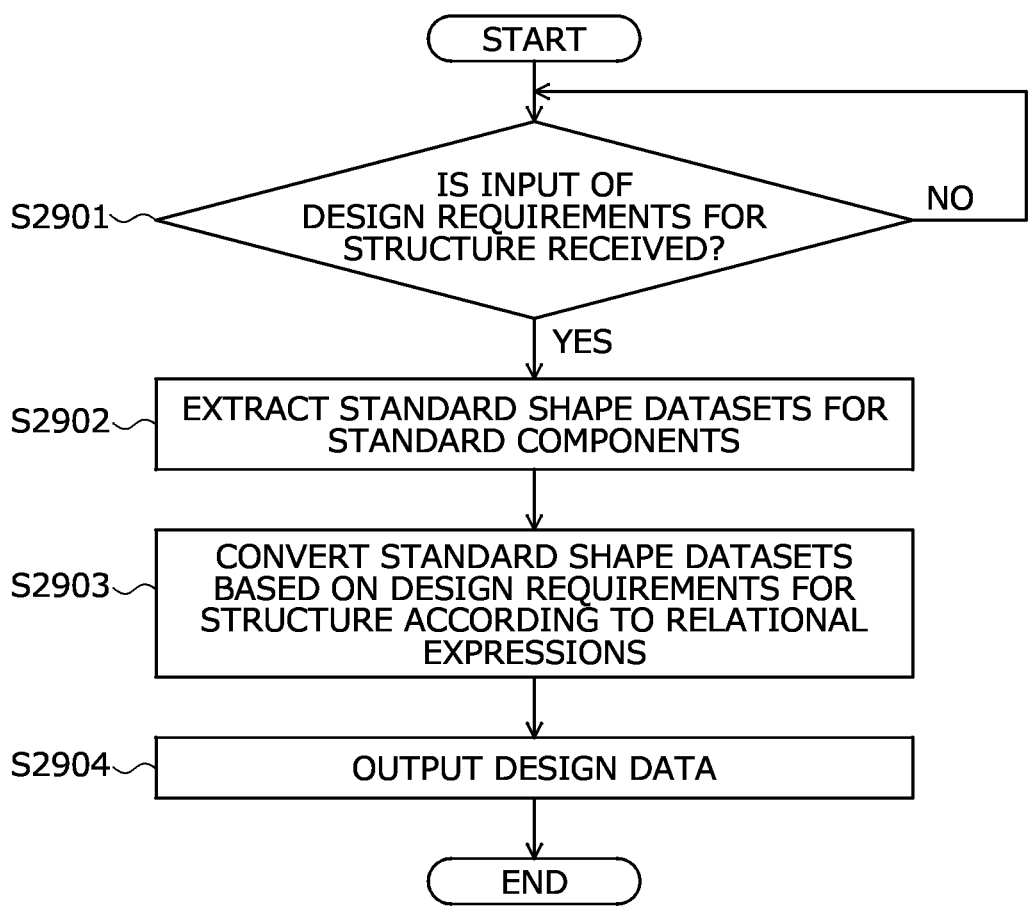
FIG. 29 is a flowchart illustrating an example of a second design processing procedure of the model generation apparatus.

FIG. 29 is a flowchart illustrating an example of the second design processing procedure of the model generation apparatus 201. In the flowchart in FIG. 29, first, the model generation apparatus 201 determines whether or not an input of design requirements for a structure is received (step S2901). The design requirements for a structure contain, for example, information specifying dimensions of the structure being design target (for example, dimensions of specific parts in standard components for constituting the structure) and a constraint condition between components. The constraint condition between components specifies, for example, parts whose dimensions are to be changed in conjunction with each other in the components, or the like.

The model generation apparatus 201 waits for an input of design requirements for a structure (step S2901: No). When the input of design requirements for a structure is received (step S2901: Yes), the model generation apparatus 201 extracts, from the standard shape DB 230, the standard shape datasets matching standard components for constituting the structure (step S2902).

The model generation apparatus 201 converts each of the extracted standard shape datasets based on the design requirements for the structure in accordance with the relational expressions for the concerned standard shape dataset to thereby generate the design data on the structure (step S2903). The model generation apparatus 201 outputs the generated design data (step S2904), and ends the series of processes according to this flowchart.

In this way, the model generation apparatus 201 is capable of automatically generating design data on a target object by using an assembly composed of standard components (standard shape datasets).

(Specific Procedure of Exceptional Orientation Alignment Processing)

The specific processing procedure (exceptional orientation alignment processing) of identifying corresponding faces in the unit 3D shape datasets by using two adjacent faces in the six-face views as one block (reference face) and aligning the orientations of the unit 3D shape datasets will be described with reference to FIG. 30. Here, the description will be given by taking certain two adjacent faces in a six-face view of a unit target shape as an example.

Figure 30:
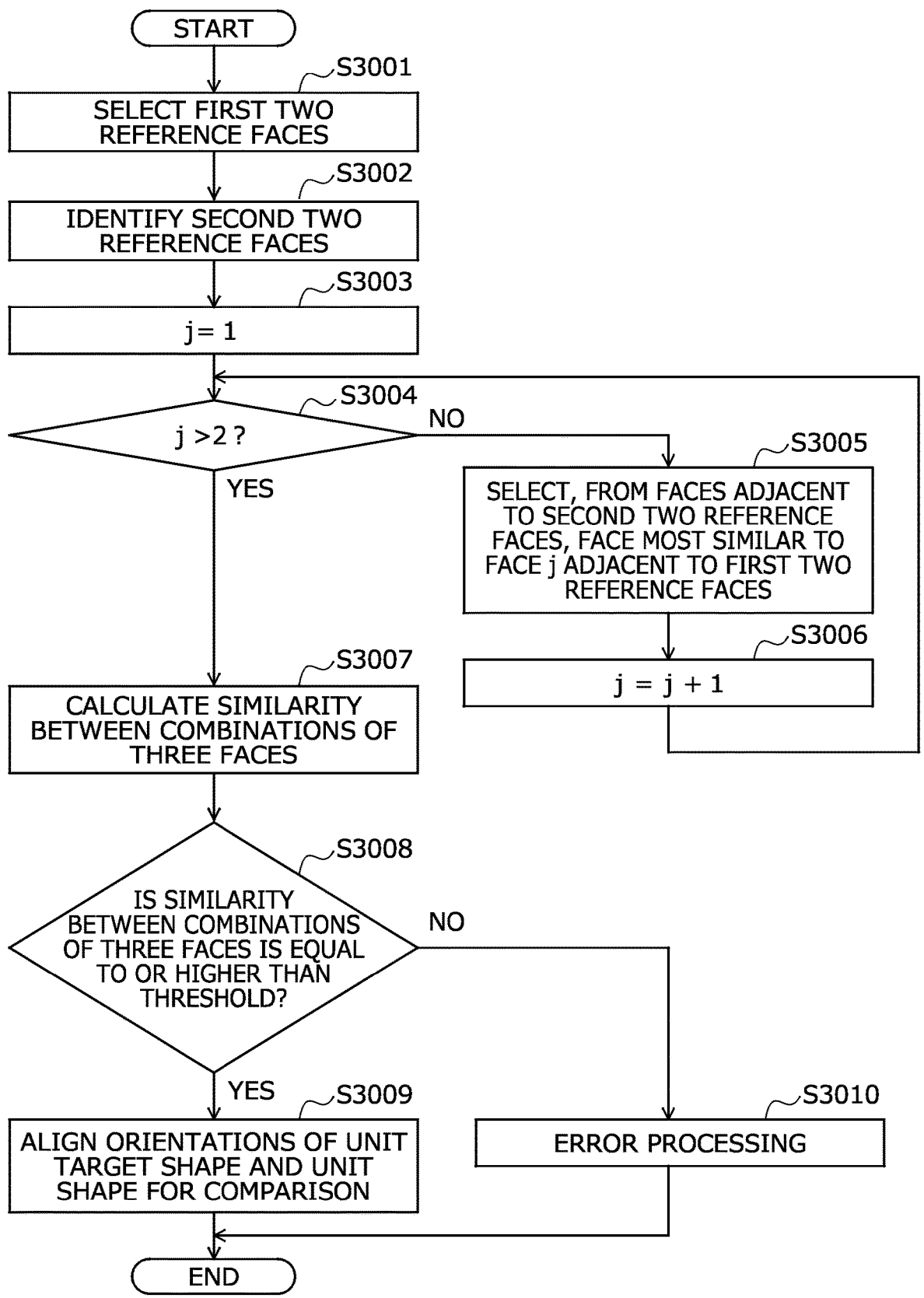
FIG. 30 is a flowchart illustrating an example of a specific procedure of an exceptional orientation alignment processing.

FIG. 30 is a flowchart illustrating an example of the specific procedure of the exceptional orientation alignment processing. In the flowchart in FIG. 30, first, the model generation apparatus 201 selects images of two adjacent faces as first two reference faces from the first plurality of images (step S3001). The model generation apparatus 201 identifies, as second two reference faces, images of two adjacent faces having the highest similarity to the selected first two reference faces among the second plurality of images (step S3002).

Next, the model generation apparatus 201 sets j to "j=1" (step S3003), and determines whether or not j is "j>2" (step S3004).

When j is not "j=2" (step S3004: No), the model generation apparatus 201 selects the face most similar to a face j adjacent to the first two reference faces from the faces adjacent to the second two reference faces (step S3005). Note that the already-selected face (image) is excluded from the selection target faces.

The model generation apparatus 201 increments j (step S3006) and returns to step S3004. When j is "j=2" in step S3004 (step S3004: Yes), the model generation apparatus 201 calculates the similarity between combinations of three faces (the two reference faces+the two faces adjacent to the two reference faces) based on the first two reference faces, the two faces j adjacent to the first two reference faces, the second two reference faces, and the two faces (images) selected as corresponding to the two faces j (step S3007).

The model generation apparatus 201 determines whether or not the calculated similarity between the combinations of three faces is equal to or higher than a threshold (step S3008). When the similarity between the combinations of three faces is equal to or higher than the threshold (step S3008: Yes), the model generation apparatus 201 aligns the orientations of the unit target shape and the unit shape for comparison based on the first two reference faces, the two faces j adjacent to the first two reference faces, the second two reference faces, and the two faces selected as corresponding to the two faces j (step S3009), and ends the series of processes according to this flowchart.

In this way, the model generation apparatus 201 is capable of comparing the combination of three faces of the unit target shape (the first two reference faces and the two adjacent faces thereof) with the combination of three faces of the unit shape for comparison (the second two reference faces and the two adjacent faces thereof) to identify the corresponding faces in the unit 3D shape datasets, and aligning the orientations of the unit target shape and the unit shape for comparison.

When the similarity between the combinations of three faces is lower than the threshold in step S3008 (step S3008: No), the model generation apparatus 201 executes the error processing (step S3010), and ends the series of processes according to this flowchart.

Here, although the error processing is executed in step S3008 when the similarity between the combinations of three faces is lower than the threshold, the procedure is not limited thereto. For example, the model generation apparatus 201 may select unselected two adjacent faces yet to be selected in the six-face view of the unit target shape, and may execute the processing in step S3001 and the subsequent steps.

EXAMPLE

Next, Example of determining the same parts in multiple 3D shape datasets will be described.

Figure 31:
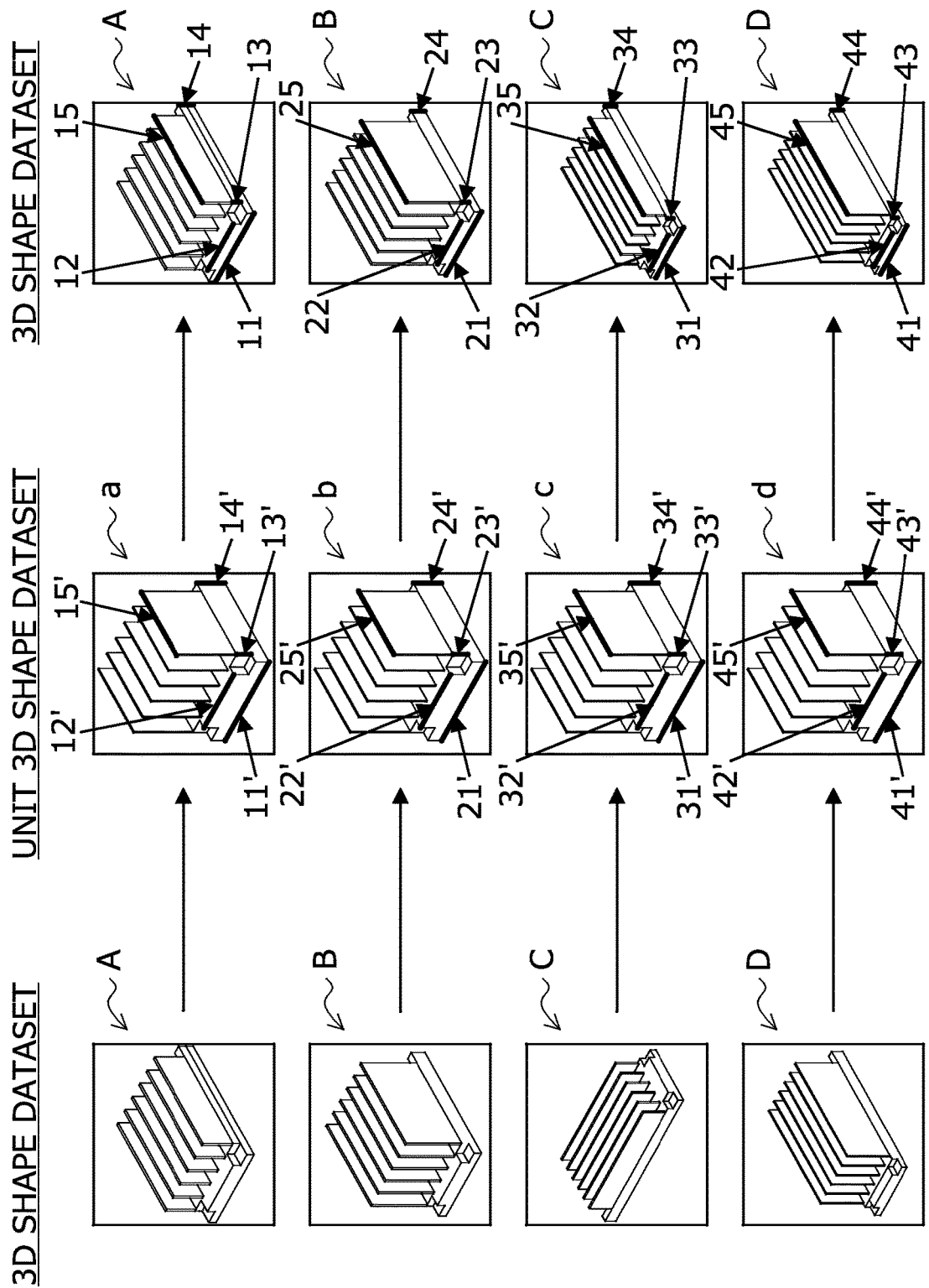
FIG. 31 is an explanatory diagram illustrating a processing example in a case of determining the same parts in multiple 3D shape datasets.

FIG. 31 is an explanatory diagram illustrating a processing example in a case of determining the same parts in multiple 3D shape datasets. In FIG. 31, 3D shape datasets A, B, C, and D are multiple 3D shape datasets classified into the same group based on the unit 3D shape datasets, and have similar parametric relationships.

The model generation apparatus 201 acquires unit 3D shape datasets a, b, c, and d of the respective 3D shape datasets A, B, C, and D. The model generation apparatus 201 aligns the orientations of the unit 3D shape datasets a, b, c, and d by using the captured images of the acquired unit 3D shape datasets a, b, c, and d. The model generation apparatus 201 extracts information (start point and end point) on each of some edges (parts) in each of the unit 3D shape datasets a, b, c, and d from the unit 3D shape dataset a, b, c, or d.

For example, the model generation apparatus 201 extracts information (start point and end point) on each of some edges (for example, edges 11' to 15') in the unit 3D shape dataset a from the unit 3D shape dataset a. The model generation apparatus 201 extracts information (start point and end point) on each of some edges (for example, edges 21' to 25') in the unit 3D shape dataset b from the unit 3D shape dataset b. The model generation apparatus 201 extracts information (start point and end point) on each of some edges (for example, edges 31' to 35' in the unit 3D shape dataset c from the unit 3D shape dataset c. The model generation apparatus 201 extracts information (start point and end point) on each of some edges (for example, the edges 41' to 45') in the unit 3D shape dataset d from the unit 3D shape dataset d.

The model generation apparatus 201 expresses each of the edges in each unit 3D shape dataset a, b, c, or d by a vector having the start point and the end point of the edge as elements. The model generation apparatus 201 compares the vectors of the respective edges between the unit 3D shape datasets a, b, c, and d to calculate the distances between the vectors. The model generation apparatus 201 determines edges between which the calculated distance is the shortest as the same parts.

For example, among the edges 21' to 25' in the unit 3D shape dataset b, the edge 21' is assumed to be the edge having the shortest distance to the edge 11' in the unit 3D shape dataset a. Among the edges 31' to 35' in the unit 3D shape dataset c, the edge 31' is assumed to be the edge having the shortest distance to the edge 11' in the unit 3D shape dataset a. Among the edges 41' to 45' in the unit 3D shape dataset d, the edge 41' is assumed to be the edge having the shortest distance to the edge 11' in the unit 3D shape dataset a. In this case, the model generation apparatus 201 determines the edges 11', 21', 31', and 41' in the respective unit 3D shape datasets a, b, c, and d as the same parts.

The model generation apparatus 201 is capable of identifying the part-to-part correspondence relationships between each 3D shape dataset A, B, C, or D and the corresponding unit 3D shape dataset a, b, c, or d, when the corresponding parts before and after the conversion are associated with each other in advance, for example. For example, for the edges 11 to 15 in the 3D shape dataset A, the model generation apparatus 201 determines that the edge 11 corresponds to the edge 11', the edge 12 corresponds to the edge 12', the edge 13 corresponds to the edge 13', the edge 14 corresponds to the edge 14', and the edge 15 corresponds to the edge 15'.

The model generation apparatus 201 identifies corresponding edges in the 3D shape datasets A, B, C, and D based on the correspondence relationships among the edges in the unit 3D shape datasets a, b, c, and d. For example, the model generation apparatus 201 determines the edges 11, 21, 31, and 41 in the respective 3D shape datasets A, B, C, and D as the same parts from the correspondence relationship among the edges 11', 21', 31', and 41' in the respective unit 3D shape datasets a, b, c, and d.

As a result, a dimension table 3200 as illustrated in FIG. 32 may be created.

FIG. 32 is an explanatory diagram illustrating a specific example of the dimension table. In FIG. 32, the dimension table 3200 specifies the dimensions of parts (for example, parts 1 to 5) in the 3D shape datasets A, B, C, and D. For example, the part 1 corresponds to the edges 11, 21, 31, and 41 in the respective 3D shape datasets A, B, C, and D.

For example, the model generation apparatus 201 may derive relational expressions specifying dimensional relationships among parts by analyzing the dimensional relationships among the parts by regression analysis or the like with reference to the dimension table 3200.

As described above, the model generation apparatus 201 according to the present embodiment is capable of acquiring the third and fourth 3D shape datasets for the first and second 3D shape datasets, respectively, the third and fourth 3D shape datasets generated by changing the sizes of the first and second 3D shape datasets in each of the directions of the multiple axes according to the specific rule, and generating the first plurality of images of the third 3D shape dataset and the second plurality of images of the fourth 3D shape dataset captured from both directions of the multiple axes. For example, the third 3D shape dataset is a unit 3D shape dataset generated by normalizing the first 3D shape dataset in each of components in the directions of the multiple axes. For example, the fourth 3D shape dataset is a unit shape dataset generated by normalizing the second 3D shape dataset in each of components in the directions of the multiple axes. For example, the first 3D shape dataset and the second 3D shape dataset are 3D shape datasets classified into the same group based on the third 3D shape dataset (unit 3D shape dataset) and the fourth 3D shape dataset (unit 3D shape dataset). The model generation apparatus 201 is capable of identifying a second portion in the second 3D shape dataset corresponding to a first portion in the first 3D shape dataset by aligning the orientations of the first 3D shape dataset and the second 3D shape dataset based on a result of comparison between the first plurality of images and the second plurality of images.

Thus, the model generation apparatus 201 is capable of identifying parts having a correspondence relationship between the 3D shape datasets grouped based on the parametric relationships.

The model generation apparatus 201 is capable of generating the first plurality of images by capturing images of the third 3D shape dataset from each of both directions of each of the multiple axes while rotating the third 3D dataset around the above axis by a predetermined angle α. The model generation apparatus 201 is capable of generating the second plurality of images by capturing images of the fourth 3D shape dataset from each of both directions of each of the multiple axes while rotating the fourth 3D dataset around the above axis by the predetermined angle α.

Thus, assuming that the design will be made using the three axes x, y, and z, the model generation apparatus 201 is capable of generating images of a unit 3D shape dataset captured from the positive and negative directions of each of the axes. Assuming that there is a case where a direction from which a target object is designed differs among designers, the model generation apparatus 201 is capable of generating images of a target object captured from various directions while rotating the target object around each of the axes by the predetermined angle α.

The model generation apparatus 201 is capable of comparing each of the first plurality of images with each of the second plurality of images to calculate the similarity between the images, identifying correspondence relationships between images included in the first plurality of images and images included in the second plurality of images based on the calculated similarities between the images, and aligning the orientations of the first 3D shape dataset and the second 3D shape dataset based on the identified correspondence relationships to thereby identify the second portion corresponding to the first portion.

Thus, the model generation apparatus 201 is capable of comparing the faces (for example, 24 images) in the third 3D shape dataset and the faces (for example, 24 images) in the fourth 3D shape dataset in a round-robin manner to identify three pairs of corresponding faces in the unit 3D shape datasets, and aligning the orientations of the third 3D shape dataset and the fourth 3D shape dataset.

The model generation apparatus 201 is capable of selecting the first reference image from the first plurality of images and identifying the second reference image from the second plurality of images based on a result of comparison between the selected first reference image and each of the second plurality of images. The model generation apparatus 201 is capable of identifying, among the first plurality of images, the first combination of images of the third 3D shape dataset in the orientation where the first reference image is captured, captured from other respective directions different from the direction from which the first reference image is captured, and identifying, among the second plurality of images, the second combination of images of the fourth 3D shape dataset in the orientation where the second reference image is captured, captured from the other respective directions different from the direction from which the second reference image is captured. For example, the first combination is a combination of images captured from the other respective directions adjacent to the direction from which the first reference image is captured. For example, the second combination is a combination of images captured from the other respective directions adjacent to the direction from which the second reference image is captured. The model generation apparatus 201 is capable of identifying the second portion corresponding to the first portion by aligning the orientations of the first 3D shape dataset and the second 3D shape dataset based on a result of comparison between the identified first combination of images and the identified second combination of images.

Thus, the model generation apparatus 201 is capable of comparing the four faces adjacent to the reference face (first reference image) of the third 3D shape dataset with the four faces adjacent to the reference face (second reference image) of the fourth 3D shape dataset to identify corresponding faces in the unit 3D shape datasets, and aligning the orientations of the third 3D shape dataset and the fourth 3D shape dataset.

The model generation apparatus 201 is capable of generating the first plurality of images by capturing images of the third 3D shape dataset from both directions of each of the multiple axes, and generating the second plurality of images by capturing images of the fourth 3D shape dataset from each of both directions of each of the multiple axes while rotating the fourth 3D shape dataset around the above axis by a predetermined angle α. The model generation apparatus 201 is capable of identifying, among the first plurality of images, the third combination of images of the third 3D shape dataset captured from both directions of the multiple axes while the third 3D shape dataset is fixed, identifying, among the second plurality of images, the fourth combination of images of the fourth 3D shape dataset in each of orientations rotated around each of the multiple axes by the predetermined angle α, the fourth combination of images captured from both directions of the multiple axes, and aligning the orientations of the first 3D shape dataset and the second 3D shape dataset based on a result of comparison between the identified third combination of images and the identified fourth combination of images, thereby identifying the second portion corresponding to the first portion.

Thus, by rotating the fourth 3D shape dataset while the third 3D shape dataset is fixed, the model generation apparatus 201 is capable of identifying the orientation of the fourth 3D shape dataset matching the orientation of the third 3D shape dataset based on the similarities between the faces at the same positions in the six-face views.

The model generation apparatus 201 is capable of extracting the dimension of the first portion from the first 3D shape dataset and extracting the dimension of the second portion corresponding to the first portion from the second 3D shape dataset.

Thus, the model generation apparatus 201 is capable of creating the dimension table for deriving the dimensional relationships among different parts in the 3D shape datasets grouped based on the parametric relationships.

The model generation apparatus 201 is capable of identifying the dimensional relationships among the different parts in the 3D shape datasets in the same group based on the extracted dimension of the first portion and the extracted dimension of the second portion.

Thus, the model generation apparatus 201 is capable of deriving the dimensional relationships among the different parts in the 3D shape datasets grouped based on the parametric relationships.

From these, using the model generation apparatus 201, it is possible to make a new design of a target object by using the standard shape dataset to which the parametric model (the relational expressions among the dimensions of parts) is added. This makes it possible to reduce man-hours for designing a 3D shape. In making a new design, the dimension of each part is changed according to the parametric model, so that design errors may be reduced, Searching for a standard shape dataset to be used for making a new design based on the unit 3D shape datasets makes it possible to easily search for the standard shape dataset suitable for a design intention.

The identification method described in the present embodiment may be implemented by a computer such as a personal computer or a workstation executing a program prepared in advance. The identification program is recorded on a computer-readable recording medium such as a hard disk, a flexible disk, a CD-ROM, a DVD, or a USB memory, and is executed by being read by the computer from the recording medium. The identification program may be distributed via a network such as the Internet.

The model generation apparatus 201 (the information processing apparatus 101) described in the present embodiment may also be implemented by an integrated circuit (IC) for specific application, such as a standard cell or a structured application-specific integrated circuit (ASIC), or by a programmable logic device (PLD), such as a field-programmable gate array (FPGA).

Regarding the above-described embodiment, the following supplementary notes are further disclosed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an identification program causing a computer to execute a process comprising:
   identifying parts having a correspondence relationship between data sets grouped based on parametric relationships, the identifying including:
      acquiring a third shape dataset and a fourth shape dataset, respectively generated by changing sizes of a first shape dataset and a second shape dataset in each of directions of a plurality of coordinate axes according to a specific rule;
      generating a first plurality of images and a second plurality of images by capturing the third shape dataset and the fourth shape dataset, respectively, from both directions of the respective plurality of coordinate axes;
      aligning orientations of the first shape dataset and the second shape dataset based on a result of comparison between the first plurality of images and the second plurality of images; and
      identifying, based on the aligned first and second shape datasets, a second portion in the second shape dataset corresponding to a first portion in the first shape dataset; and
   generating, based on the identified parts, a model comprising the correspondence relationship in the identified parts, wherein
   the generating includes
   generating the first plurality of images by capturing images of the third shape dataset from both directions of the plurality of coordinate axes, and
   generating the second plurality of images by capturing images of the fourth shape dataset from each of both directions of each of the plurality of coordinate axes, while rotating the fourth shape dataset around the above coordinate axis by a predetermined angle, and the identifying includes identifying, among the first plurality of images, a third combination of images of the third shape dataset captured from both directions of the plurality of coordinate axes while fixing the third shape dataset, identifying, among the second plurality of images, a fourth combination of images of the fourth shape dataset in each of orientations rotated around each of the plurality of coordinate axes by the predetermined angle, the fourth combination of images captured from both directions of the plurality of coordinate axes, and identifying the second portion corresponding to the first portion by aligning the orientations of the first shape dataset and the second shape dataset based on a result of comparison between the identified third combination of images and the identified fourth combination of images.

2. The non-transitory computer-readable recording medium according to claim 1, wherein the generating includes generating the first plurality of images by capturing images of the third shape dataset from each of both directions of each of the plurality of coordinate axes, while rotating the third shape dataset around the above coordinate axis by a predetermined angle, and generating the second plurality of images by capturing images of the fourth shape dataset from each of both directions of each of the plurality of coordinate axes, while rotating the fourth shape dataset around the above coordinate axis by the predetermined angle.

3. The non-transitory computer-readable recording medium according to claim 1, wherein the identifying includes comparing each of the first plurality of images with each of the second plurality of images to calculate a similarity between the images, identifying correspondence relationships between images included in the first plurality of images and images included in the second plurality of images based on the calculated similarities between the images, and identifying the second portion corresponding to the first portion by aligning the orientations of the first shape dataset and the second shape dataset based on the identified correspondence relationships.

4. The non-transitory computer-readable recording medium according to claim 1, wherein the identifying includes selecting a first reference image from the first plurality of images, identifying a second reference image from the second plurality of images based on a result of comparison between the selected first reference image and each of the second plurality of images, identifying, among the first plurality of images, a first combination of images of the third shape dataset in an orientation where the first reference image is captured, the first combination of images captured from other respective directions different from a direction from which the first reference image is captured, identifying, among the second plurality of images, a second combination of images of the fourth shape dataset in an orientation where the second reference image is captured, the second combination of images captured from other respective directions different from a direction from which the second reference image is captured, and identifying the second portion corresponding to the first portion by aligning the orientations of the first shape dataset and the second shape dataset based on a result of comparison between the identified first combination of images and the identified second combination of images.

5. The non-transitory computer-readable recording medium according to claim 4, wherein the first combination is a combination of images captured from other respective directions adjacent to a direction from which the first reference image is captured, and the second combination is a combination of images captured from other respective directions adjacent to a direction from which the second reference image is captured.

6. The non-transitory computer-readable recording medium according to claim 1, wherein the process further comprising extracting a dimension of the first portion from the first shape dataset, and extracting a dimension of the identified second portion from the second shape dataset.

7. The non-transitory computer-readable recording medium according to claim 6, wherein the first shape dataset and the second shape dataset are shape datasets classified into a same group based on the third shape dataset and the fourth shape dataset, and the process further comprising identifying a dimensional relationship between different parts in the shape datasets in the group based on the extracted dimension of the first portion and the extracted dimension of the second portion.

8. The non-transitory computer-readable recording medium according to claim 1, wherein the third shape dataset is a unit shape dataset generated by normalizing the first shape dataset in each of components in the directions of the plurality of coordinate axes, and the fourth shape dataset is a unit shape dataset generated by normalizing the second shape dataset in each of the components in the directions of the plurality of coordinate axes.

9. An identifying method implemented by a computer, the identifying method comprising:

identifying parts having a correspondence relationship between data sets grouped based on parametric relationships, the identifying including:

acquiring a third shape dataset and a fourth shape dataset, respectively generated by changing sizes of a first shape dataset and a second shape dataset in each of directions of a plurality of coordinate axes according to a specific rule;

generating a first plurality of images and a second plurality of images by capturing the third shape dataset and the fourth shape dataset, respectively, from both directions of the respective plurality of coordinate axes;

aligning orientations of the first shape dataset and the second shape dataset based on a result of comparison between the first plurality of images and the second plurality of images; and identifying, based on the aligned first and second shape datasets, a second portion in the second shape dataset corresponding to a first portion in the first shape dataset; and generating, based on the identified parts, a model comprising the correspondence relationship in the identified parts, wherein the generating includes generating the first plurality of images by capturing images of the third shape dataset from both directions of the plurality of coordinate axes, and generating the second plurality of images by capturing images of the fourth shape dataset from each of both directions of each of the plurality of coordinate axes, while rotating the fourth shape dataset around the above coordinate axis by a predetermined angle, and the identifying includes identifying, among the first plurality of images, a third combination of images of the third shape dataset captured from both directions of the plurality of coordinate axes while fixing the third shape dataset, identifying, among the second plurality of images, a fourth combination of images of the fourth shape dataset in each of orientations rotated around each of the plurality of coordinate axes by the predetermined angle, the fourth combination of images captured from both directions of the plurality of coordinate axes, and identifying the second portion corresponding to the first portion by aligning the orientations of the first shape dataset and the second shape dataset based on a result of comparison between the identified third combination of images and the identified fourth combination of images.

10. An information processing apparatus comprising:
a memory, and
a processor coupled to the memory, the processor being configured to perform processing including:
  identifying parts having a correspondence relationship between data sets grouped based on parametric relationships, the identifying including:
    acquiring a third shape dataset and a fourth shape dataset, respectively generated by changing sizes of a first shape dataset and a second shape dataset in each of directions of a plurality of coordinate axes according to a specific rule;
    generating a first plurality of images and a second plurality of images by capturing the third shape dataset and the fourth shape dataset, respectively, from both directions of the respective plurality of coordinate axes;
    aligning orientations of the first shape dataset and the second shape dataset based on a result of comparison between the first plurality of images and the second plurality of images; and
    identifying, based on the aligned first and second shape datasets, a second portion in the second shape dataset corresponding to a first portion in the first shape dataset; and
  generating, based on the identified parts, a model comprising the correspondence relationship in the identified parts, wherein
  the generating includes
  generating the first plurality of images by capturing images of the third shape dataset from both directions of the plurality of coordinate axes, and
  generating the second plurality of images by capturing images of the fourth shape dataset from each of both directions of each of the plurality of coordinate axes, while rotating the fourth shape dataset around the above coordinate axis by a predetermined angle, and
  the identifying includes
  identifying, among the first plurality of images, a third combination of images of the third shape dataset captured from both directions of the plurality of coordinate axes while fixing the third shape dataset,
  identifying, among the second plurality of images, a fourth combination of images of the fourth shape dataset in each of orientations rotated around each of the plurality of coordinate axes by the predetermined angle, the fourth combination of images captured from both directions of the plurality of coordinate axes, and
  identifying the second portion corresponding to the first portion by aligning the orientations of the first shape dataset and the second shape dataset based on a result of comparison between the identified third combination of images and the identified fourth combination of images.

* * * * *